(12) United States Patent
Iiyama et al.

(10) Patent No.: US 8,537,268 B2
(45) Date of Patent: Sep. 17, 2013

(54) ZOOM LENS SYSTEM, IMAGING DEVICE AND CAMERA

(75) Inventors: Tomoko Iiyama, Osaka (JP); Keiki Yoshitsugu, Hyogo (JP)

(73) Assignee: Panasonic Corporation, Osaka (JP)

( * ) Notice: Subject to any disclaimer, the term of this patent is extended or adjusted under 35 U.S.C. 154(b) by 333 days.

(21) Appl. No.: 13/001,260

(22) PCT Filed: Jun. 23, 2009

(86) PCT No.: PCT/JP2009/002858
§ 371 (c)(1),
(2), (4) Date: Dec. 23, 2010

(87) PCT Pub. No.: WO2010/001547
PCT Pub. Date: Jan. 7, 2010

(65) Prior Publication Data
US 2011/0109787 A1 May 12, 2011

(30) Foreign Application Priority Data

Jul. 2, 2008 (JP) .................................. 2008-173965
Jul. 2, 2008 (JP) .................................. 2008-173967

(51) Int. Cl.
*H04N 5/225* (2006.01)
(52) U.S. Cl.
USPC .......................... 348/360; 348/335; 348/686
(58) Field of Classification Search
USPC ................. 348/335, 360, 361; 359/367–382, 359/686, 557
See application file for complete search history.

(56) References Cited

U.S. PATENT DOCUMENTS

| 5,668,668 | A | 9/1997 | Shibayama et al. |
| 5,721,642 | A | 2/1998 | Shibayama et al. |
| 5,798,871 | A | 8/1998 | Shibayama et al. |

(Continued)

FOREIGN PATENT DOCUMENTS

| JP | 08-248312 A | 9/1996 |
| JP | 2001-188172 A | 7/2001 |

(Continued)

OTHER PUBLICATIONS

International Search Report for PCT/JP2009/002858 dated Sep. 9, 2009.

*Primary Examiner* — Tuan Ho
(74) *Attorney, Agent, or Firm* — Pearne & Gordon LLP

(57) ABSTRACT

A zoom lens system, in order from an object side to an image side, comprising a first lens unit having negative optical power, a second lens unit having positive optical power, a third lens unit having positive optical power, and a fourth lens unit having positive optical power, wherein in zooming, the intervals between the respective lens units vary, the third lens unit comprises a plurality of lens elements, and the condition (I-1): $0.47 < |f_{31}/f_{G3}| < 1.00$ ($f_T/f_W > 2.0$, $f_{31}$: a focal length of a most object side lens element in the third lens unit, $f_{G3}$: a focal length of the third lens unit, $f_T$: a focal length of the entire system at a telephoto limit, $f_W$: a focal length of the entire system at a wide-angle limit) is satisfied, having a high resolution and a short overall optical length (overall length of lens system), and still having a view angle of 70° or greater at a wide-angle limit, which is satisfactorily adaptable for wide-angle image taking, and yet having a large aperture with an F-number of about 2.0 at a wide-angle limit; an imaging device; and a camera.

18 Claims, 53 Drawing Sheets

(56) References Cited

U.S. PATENT DOCUMENTS

| | | |
|---|---|---|
| 2002/0154908 A1 | 10/2002 | Itoh |
| 2003/0058548 A1 | 3/2003 | Itoh |
| 2003/0138245 A1 | 7/2003 | Watanabe |
| 2010/0328500 A1* | 12/2010 | Yoshitsugu et al. ....... 348/240.3 |
| 2011/0115946 A1* | 5/2011 | Saruwatari ................. 348/240.3 |
| 2011/0157715 A1* | 6/2011 | Ito ................................ 359/682 |

FOREIGN PATENT DOCUMENTS

| | | |
|---|---|---|
| JP | 2002-244043 A | 8/2002 |
| JP | 2002-365543 A | 12/2002 |
| JP | 2003-177316 A | 6/2003 |
| JP | 2006-301262 A | 11/2006 |

* cited by examiner

ZOOM LENS SYSTEM, IMAGING DEVICE AND CAMERA

TECHNICAL FIELD

The present invention relates to a zoom lens system, an imaging device and a camera. In particular, the present invention relates to: a zoom lens system having a high resolution and a short overall optical length (overall length of lens system), and still having a view angle of 70° or greater at a wide-angle limit, which is satisfactorily adaptable for wide-angle image taking, and yet having a large aperture with an F-number of about 2.0 at a wide-angle limit; an imaging device employing the zoom lens system; and a thin and very compact camera employing the imaging device.

BACKGROUND ART

With recent progress in the development of solid-state image sensors such as CCD (Charge Coupled Device) and CMOS (Complementary Metal-Oxide Semiconductor) having high pixel density, digital still cameras and digital video cameras (simply referred to as "digital cameras", hereinafter), which employ an imaging device including an imaging optical system of high optical performance corresponding to the solid-state image sensors having high pixel density, are rapidly spreading. Among the digital cameras having high optical performance, particularly compact digital cameras are increasingly demanded.

User's demands for compact digital cameras become diversified. Among these demands, there still exists a strong demand for a zoom lens system having a short focal length and a wide view angle at a wide-angle limit. As examples of such zoom lens system having a short focal length and a wide view angle at a wide-angle limit, there have conventionally been proposed various kinds of negative-lead type four-unit zoom lens systems in which a first lens unit having negative optical power, a second lens unit having positive optical power, a third lens unit having positive optical power, and a fourth lens unit having positive optical power are arranged in order from the object side to the image side.

Japanese Patent No. 3805212 discloses a zoom lens having at least two lens units including, in order from the object side, a first lens unit having negative refractive power and a second lens unit having positive refractive power, wherein zooming is performed by moving the second lens unit toward the object side so that the interval between the first lens unit and the second lens unit is narrower at a telephoto limit than at a wide-angle limit, and the first lens unit comprises, in order from the object side, two lens elements including a negative lens having an aspheric surface and a positive lens.

Japanese Patent No. 3590807 discloses a zoom lens comprising, in order from the object side, a first lens unit having negative refractive power, a second lens unit having positive refractive power, a third lens unit having positive refractive power, and a fourth lens unit having positive refractive power, wherein, in zooming from a wide-angle limit to a telephoto limit, the interval between the first lens unit and the second lens unit decreases, the interval between the second lens unit and the third lens unit varies, the axial intervals between the respective lenses constituting the second lens unit are fixed, and focusing from a distant object to a close object is performed by moving the second lens unit toward the image surface.

Japanese Patent No. 3943922 discloses a zoom lens comprising, in order from the object side, a first lens unit having negative refractive power, a second lens unit having positive refractive power, a third lens unit having positive refractive power, and a fourth lens unit having positive refractive power. The zoom lens disclosed in Japanese Patent No. 3943922 includes a negative lens having an aspheric concave surface facing an aperture diaphragm in the first lens unit having negative power, and the aspheric surface is shaped such that the axial refractive power decreases toward the outer circumference of the surface.

Meanwhile, Japanese Laid-Open Patent Publication No. 2001-188172 discloses, as an optical system relating to an extended projection optical system of a projection device, a retrofocus zoom lens including, in order from the screen side to the original image side, a first lens unit having negative refractive power, a second lens unit having positive refractive power, a third lens unit having positive refractive power, and a fourth lens unit having positive refractive power, wherein, in zooming from a wide-angle limit to a telephoto limit, overall length of entire lens system is longest at the telephoto limit.

CITATION LIST

Patent Literature

[PTL 1] Japanese Patent No. 3805212
[PTL 2] Japanese Patent No. 3590807
[PTL 3] Japanese Patent No. 3943922
[PTL 4] Japanese Laid-Open Patent Publication No. 2001-188172

SUMMARY OF THE INVENTION

Problems to be Solved by the Invention

However, the zoom lens systems disclosed in the respective patent literatures cannot meet the recent demands in terms of achieving a wider angle and a smaller size at the same time. Further, the zoom lens systems disclosed in the respective patent literatures cannot meet the recent demands for high spec in terms of F-number.

The object of the present invention is to provide: a zoom lens system having a high resolution and a short overall optical length (overall length of lens system), and still having a view angle of 70° or greater at a wide-angle limit, which is satisfactorily adaptable for wide-angle image taking, and yet having a large aperture with an F-number of about 2.0 at a wide-angle limit; an imaging device employing the zoom lens system; and a thin and very compact camera employing the imaging device.

Solution to the Problems (I) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, the intervals between the respective lens units vary, wherein the third lens unit comprises a plurality of lens elements, and wherein the following condition (I-1) is satisfied:

$$0.47 < |f_{31}/f_{G3}| < 1.00 \qquad \text{(I-1)}$$

(here, $f_T/f_W > 2.0$)

where,
$f_{3\,1}$ is a focal length of a most object side lens element in the third lens unit,
$f_{G3}$ is a focal length of the third lens unit,
$f_T$ is a focal length of the entire system at a telephoto limit, and
$f_W$ is a focal length of the entire system at a wide-angle limit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, wherein the third lens unit comprises a plurality of lens elements, and wherein the following condition (I-1) is satisfied:

$$0.47 < |f_{31}/f_{G3}| < 1.00 \qquad (I\text{-}1)$$

(here, $f_T/f_W > 2.0$)
where,
$f_{3\,1}$ is a focal length of a most object side lens element in the third lens unit,
$f_{G3}$ is a focal length of the third lens unit,
$f_T$ is a focal length of the entire system at a telephoto limit, and
$f_W$ is a focal length of the entire system at a wide-angle limit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, wherein the third lens unit comprises a plurality of lens elements, and wherein the following condition (I-1) is satisfied:

$$0.47 < |f_{31}/f_{G3}| < 1.00 \qquad (I\text{-}1)$$

(here, $f_T/f_W > 2.0$)
where,
$f_{3\,1}$ is a focal length of a most object side lens element in the third lens unit,
$f_{G3}$ is a focal length of the third lens unit,
$f_T$ is a focal length of the entire system at a telephoto limit, and
$f_W$ is a focal length of the entire system at a wide-angle limit.

(II) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (II-1) is satisfied:

$$2.0 < |f_{G3}/f_W| < 5.0 \qquad (II\text{-}1)$$

(here, $f_T/f_W > 2.0$)
where,
$f_{G3}$ is a focal length of the third lens unit,
$f_T$ is a focal length of the entire system at a telephoto limit, and
$f_W$ is a focal length of the entire system at a wide-angle limit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (II-1) is satisfied:

$$2.0 < |f_{G3}/f_W| < 5.0 \qquad (II\text{-}1)$$

(here, $f_T/f_W > 2.0$)
where,
$f_{G3}$ is a focal length of the third lens unit,
$f_T$ is a focal length of the entire system at a telephoto limit, and
$f_W$ is a focal length of the entire system at a wide-angle limit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (II-1) is satisfied:

$$2.0<|f_{G3}/f_W|<5.0 \qquad \text{(II-1)}$$

(here, $f_T/f_W>2.0$)
where,
$f_{G3}$ is a focal length of the third lens unit,
$f_T$ is a focal length of the entire system at a telephoto limit, and
$f_W$ is a focal length of the entire system at a wide-angle limit.

(III) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (III-1) is satisfied:

$$|\beta_{GW}|<1.0 \qquad \text{(III-1)}$$

(here, $f_T/f_W>2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (III-1) is satisfied:

$$|\beta_{3W}|<1.0 \qquad \text{(III-1)}$$

(here, $f_T/f_W>2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (III-1) is satisfied:

$$|\beta_{3W}|<1.0 \qquad \text{(III-1)}$$

(here, $f_T/f_W>2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

(IV) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, all the first lens unit, the second lens unit, the third lens unit, and the fourth lens unit move in a direction along an optical axis such that the intervals between the respective lens units vary, and wherein an aperture diaphragm is provided between the second lens unit and the third lens unit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, all the first lens unit, the second lens unit, the third lens unit, and the fourth lens unit move in a direction along an optical axis such that the intervals between the respective lens units vary, and wherein an aperture diaphragm is provided between the second lens unit and the third lens unit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, all the first lens unit, the second lens unit, the third lens unit, and the fourth lens unit move in a direction along an optical axis such that the intervals between the respective lens units vary, and wherein an aperture diaphragm is provided between the second lens unit and the third lens unit.

(V) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, all the first lens unit, the second lens unit, the third lens unit, and the fourth lens unit move in a direction along an optical axis such that the intervals between the respective lens units vary, and wherein in compensating image point movement caused by vibration of the entire system, any lens unit among the first lens unit, the second lens unit, the third lens unit and the fourth lens unit, or alternatively a sub lens unit consisting of a part of a lens unit moves in a direction perpendicular to the optical axis.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, all the first lens unit, the second lens unit, the third lens unit, and the fourth lens unit move in a direction along an optical axis such that the intervals between the respective lens units vary, and wherein in compensating image point movement caused by vibration of the entire system, any lens unit among the first lens unit, the second lens unit, the third lens unit and the fourth lens unit, or alternatively a sub lens unit consisting of a part of a lens unit moves in a direction perpendicular to the optical axis.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, all the first lens unit, the second lens unit, the third lens unit, and the fourth lens unit move in a direction along an optical axis such that the intervals between the respective lens units vary, and wherein in compensating image point movement caused by vibration of the entire system, any lens unit among the first lens unit, the second lens unit, the third lens unit and the fourth lens unit, or alternatively a sub lens unit consisting of a part of a lens unit moves in a direction perpendicular to the optical axis.

(VI) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, the intervals between the respective lens units vary, wherein in compensating image point movement caused by vibration of the entire system, any lens unit among the first lens unit, the second lens unit, the third lens unit and the fourth lens unit, or alternatively a sub lens unit consisting of a part of a lens unit moves in a direction perpendicular to the optical axis, and wherein an aperture diaphragm is provided between the second lens unit and the third lens unit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, wherein in compensating image point movement caused by vibration of the entire system, any lens unit among the first lens unit, the second lens unit, the third lens unit and the fourth lens unit, or alternatively a sub lens unit consisting of a part of a lens unit moves in a direction perpendicular to the optical axis, and wherein an aperture diaphragm is provided between the second lens unit and the third lens unit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, wherein in compensating image point movement caused by vibration of the entire system, any lens unit among the first lens unit, the second lens unit, the third lens unit and the fourth lens unit, or alternatively a sub lens unit consisting of a part of a lens unit moves in a direction perpendicular to the optical axis, and wherein an aperture diaphragm is provided between the second lens unit and the third lens unit.

(VII) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, the intervals between the respective lens units vary, and wherein the following condition (VII-1) is satisfied:

$$0.20 \leq (1-\beta_{2W})\beta_{3W} \leq 0.75 \quad \text{(VII-1)}$$

(here, $f_T/f_W > 2.0$)

where, $\beta_{2W}$ is a lateral magnification of the second lens unit at a wide-angle limit, $\beta_{3W}$ is a lateral magnification of the third lens unit at a wide-angle limit, $f_T$ is a focal length of the entire system at a telephoto limit, and $f_W$ is a focal length of the entire system at a wide-angle limit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, and wherein the following condition (VII-1) is satisfied:

$$0.20 \leq (1-\beta_{2W})\beta_{3W} \leq 0.75 \quad \text{(VII-1)}$$

(here, $f_T/f_W > 2.0$)

where, $\beta_{2W}$ is a lateral magnification of the second lens unit at a wide-angle limit, $\beta_{3W}$ is a lateral magnification of the third lens unit at a wide-angle limit, $f_T$ is a focal length of the entire system at a telephoto limit, and $f_W$ is a focal length of the entire system at a wide-angle limit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, and wherein the following condition (VII-1) is satisfied:

$$0.20 \leq (1-\beta_{2W})\beta_{3W} \leq 0.75 \quad \text{(VII-1)}$$

(here, $f_T/f_W > 2.0$)

where, $\beta_{2W}$ is a lateral magnification of the second lens unit at a wide-angle limit, $\beta_{3W}$ is a lateral magnification of the third lens unit at a wide-angle limit, $f_T$ is a focal length of the entire system at a telephoto limit, and $f_W$ is a focal length of the entire system at a wide-angle limit.

(VIII) One of the above-described objects is achieved by the following zoom lens system. That is, the present invention relates to:

a zoom lens system, in order from an object side to an image side, comprising a first lens unit having negative optical power, a second lens unit having positive optical power, a third lens unit having positive optical power, and a fourth lens unit having positive optical power, wherein in zooming, the intervals between the respective lens units vary, and wherein the following condition (VIII-1) is satisfied:

$$0.20 \leq (1-\beta_{2T})\beta_{3T} \leq 1.00 \quad \text{(VIII-1)}$$

(here, $f_T/f_W > 2.0$)

where, $\beta_{2T}$ is a lateral magnification of the second lens unit at a telephoto limit, $\beta_{3T}$ is a lateral magnification of the third lens unit at a telephoto limit, $f_T$ is a focal length of the entire system at a telephoto limit, and $f_W$ is a focal length of the entire system at a wide-angle limit.

One of the above-described objects is achieved by the following imaging device. That is, the present invention relates to:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, and wherein the following condition (VIII-1) is satisfied:

$$0.20 \leq (1-\beta_{2T})\beta_{3T} \leq 1.00 \quad \text{(VIII-1)}$$

(here, $f_T/f_W > 2.0$)

where, $\beta_{2T}$ is a lateral magnification of the second lens unit at a telephoto limit, $\beta_{3T}$ is a lateral magnification of the third lens unit at a telephoto limit, $f_T$ is a focal length of the entire system at a telephoto limit, and $f_W$ is a focal length of the entire system at a wide-angle limit.

One of the above-described objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, and wherein the following condition (VIII-1) is satisfied:

$$0.20 \leq (1-\beta_{2T})\beta_{3T} \leq 1.00 \quad \text{(VIII-1)}$$

(here, $f_T/f_W > 2.0$)

where, $\beta_{2T}$ is a lateral magnification of the second lens unit at a telephoto limit, $\beta_{3T}$ is a lateral magnification of the third lens unit at a telephoto limit, $f_T$ is a focal length of the entire system at a telephoto limit, and $f_W$ is a focal length of the entire system at a wide-angle limit.

Effects of the Invention

According to the present invention, it is possible to provide: a zoom lens system having a high resolution and a short overall optical length (overall length of lens system), and still having a view angle of 70° or greater at a wide-angle limit, which is satisfactorily adaptable for wide-angle image taking, and yet having a large aperture with an F-number of about 2.0 at a wide-angle limit; an imaging device employing the zoom lens system; and a thin and very compact camera employing the imaging device.

EMBODIMENTS OF THE INVENTION

Embodiments 1 to 11

FIGS. 1, 4, 7, 10, 13, 16, 19, 22, 25, 28 and 31 are lens arrangement diagrams of zoom lens systems according to Embodiments 1 to 11, respectively.

Each of FIGS. 1, 4, 7, 10, 13, 16, 19, 22, 25, 28 and 31 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having negative optical power, a second lens unit G2 having positive optical power, a third lens unit G3 having positive optical power, and a fourth lens unit having positive optical power. Then, in zooming, the individual lens units move in a direction along the optical axis such that intervals between the lens units, that is, the interval between the first lens unit and the second lens unit, the interval between the second lens unit and the third lens unit, and the interval between the third lens unit and the fourth lens unit should all vary. In the zoom lens system according to each embodiment, since these lens units are arranged in the desired optical power configuration, high optical performance is maintained and still size reduction is achieved in the entire lens system.

Further, in FIGS. 1, 4, 7, 10, 13, 16, 19, 22, 25, 28 and 31, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P equivalent to an optical low-pass filter or a face plate of an image sensor is provided.

Figure 1:
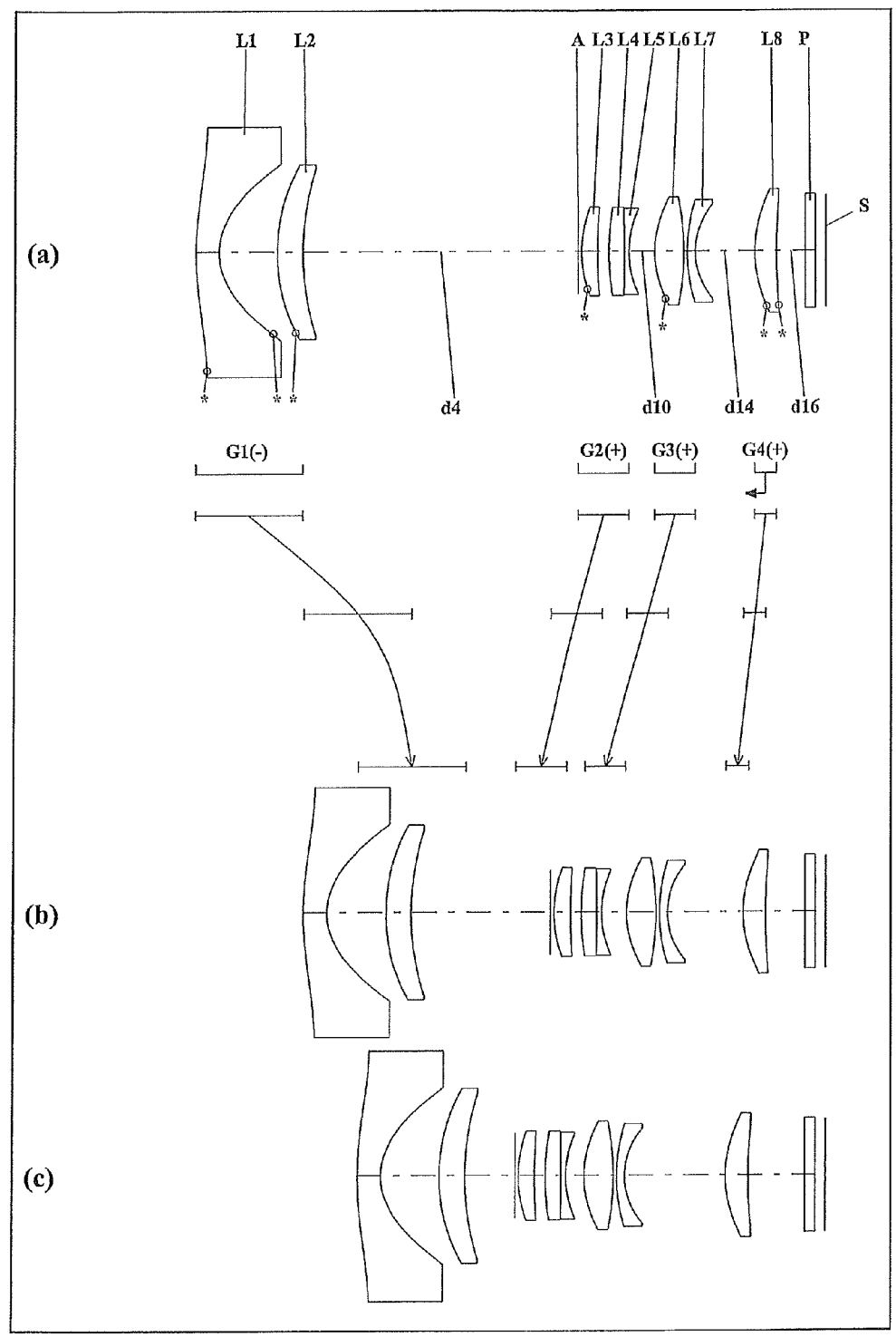
FIG. 1 is a lens arrangement diagram showing an infinity in-focus condition of a zoom lens system according to Embodiment 1 (Example 1).
Figure 2:
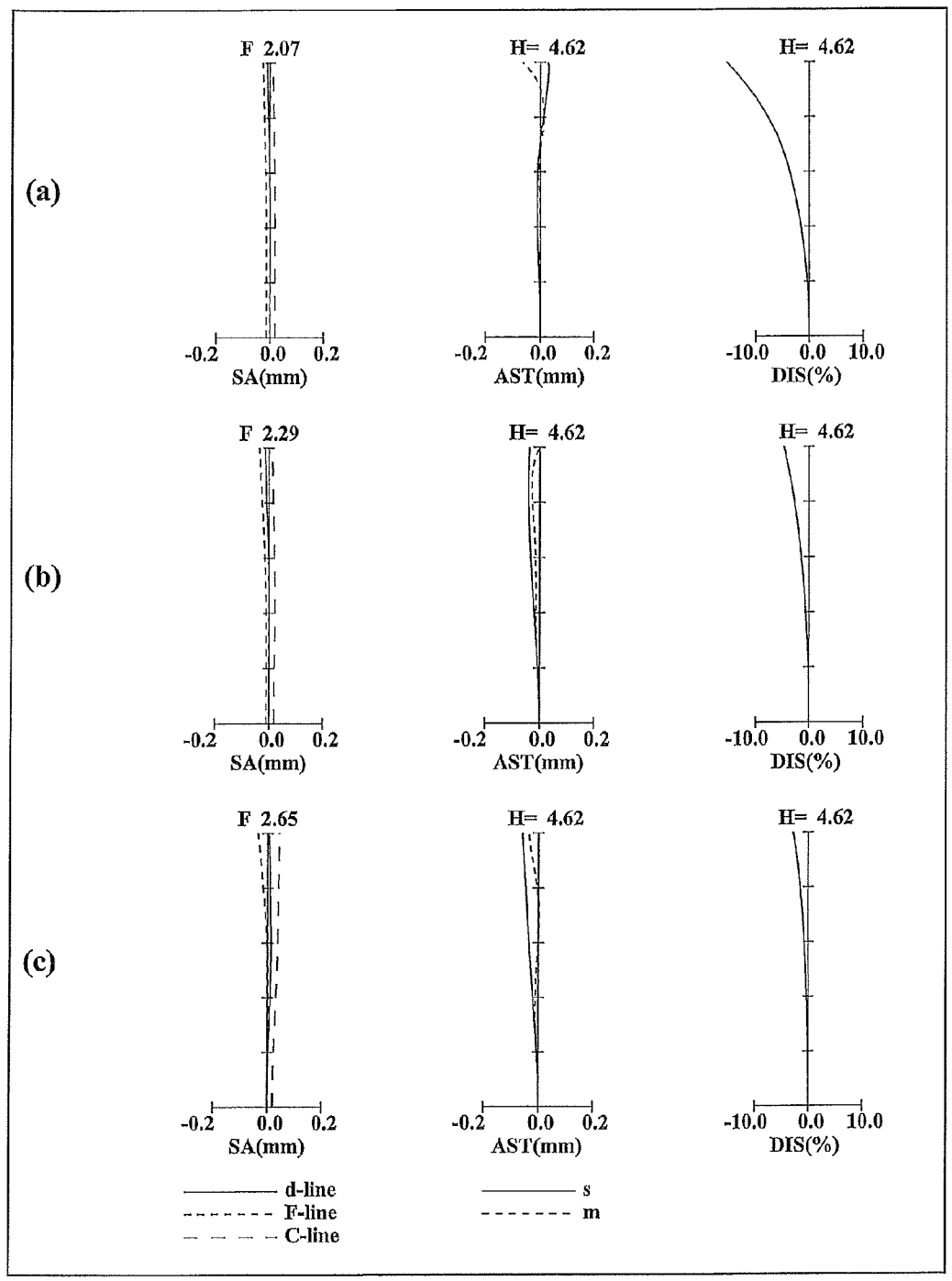
FIG. 2 is a longitudinal aberration diagram of an infinity in-focus condition of a zoom lens system according to Example 1.
Figure 3:
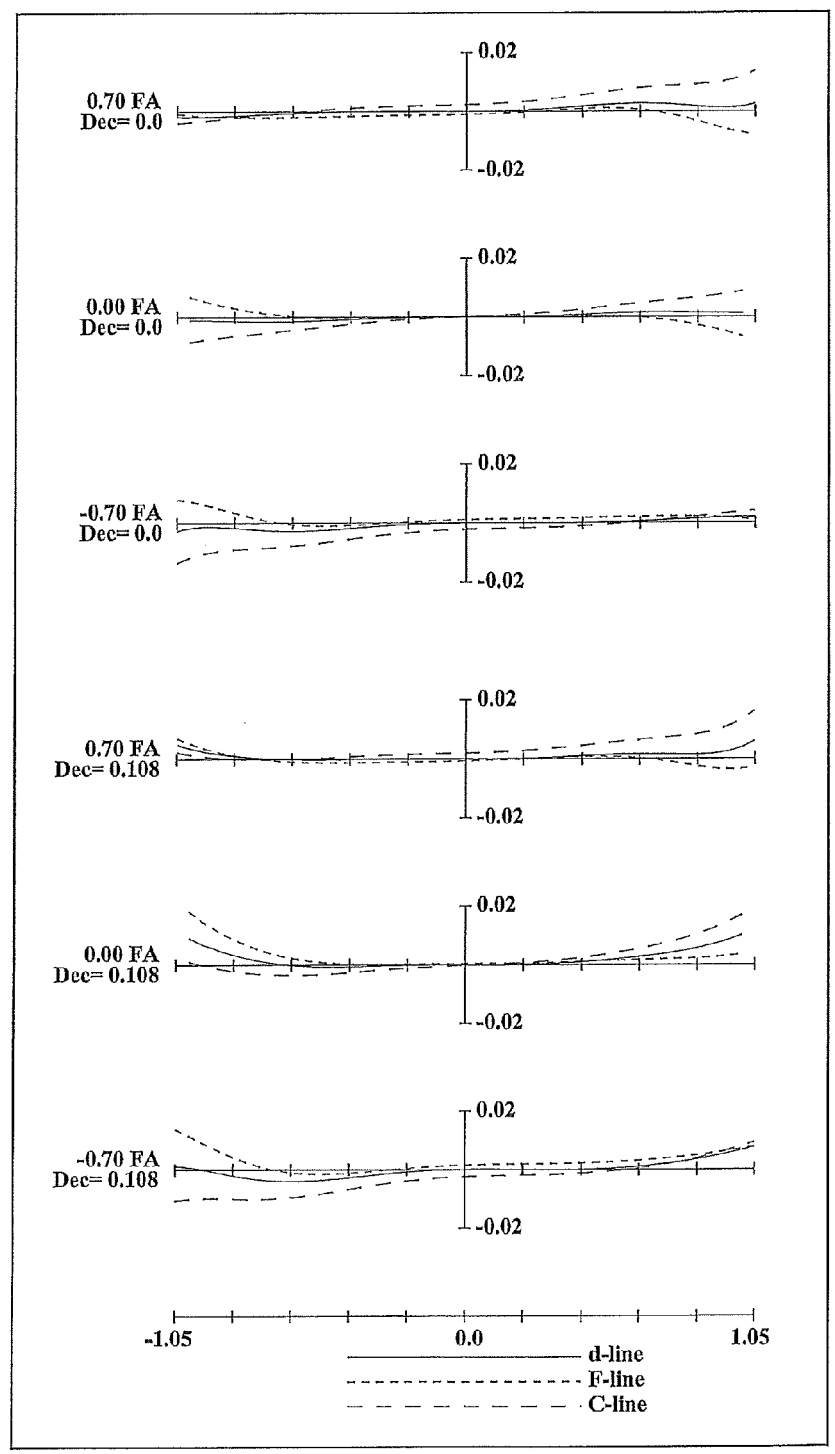
FIG. 3 is a lateral aberration diagram of a zoom lens system according to Example 1 at a telephoto limit in a basic state where image blur compensation is not performed and in a blur compensation state.
Figure 4:
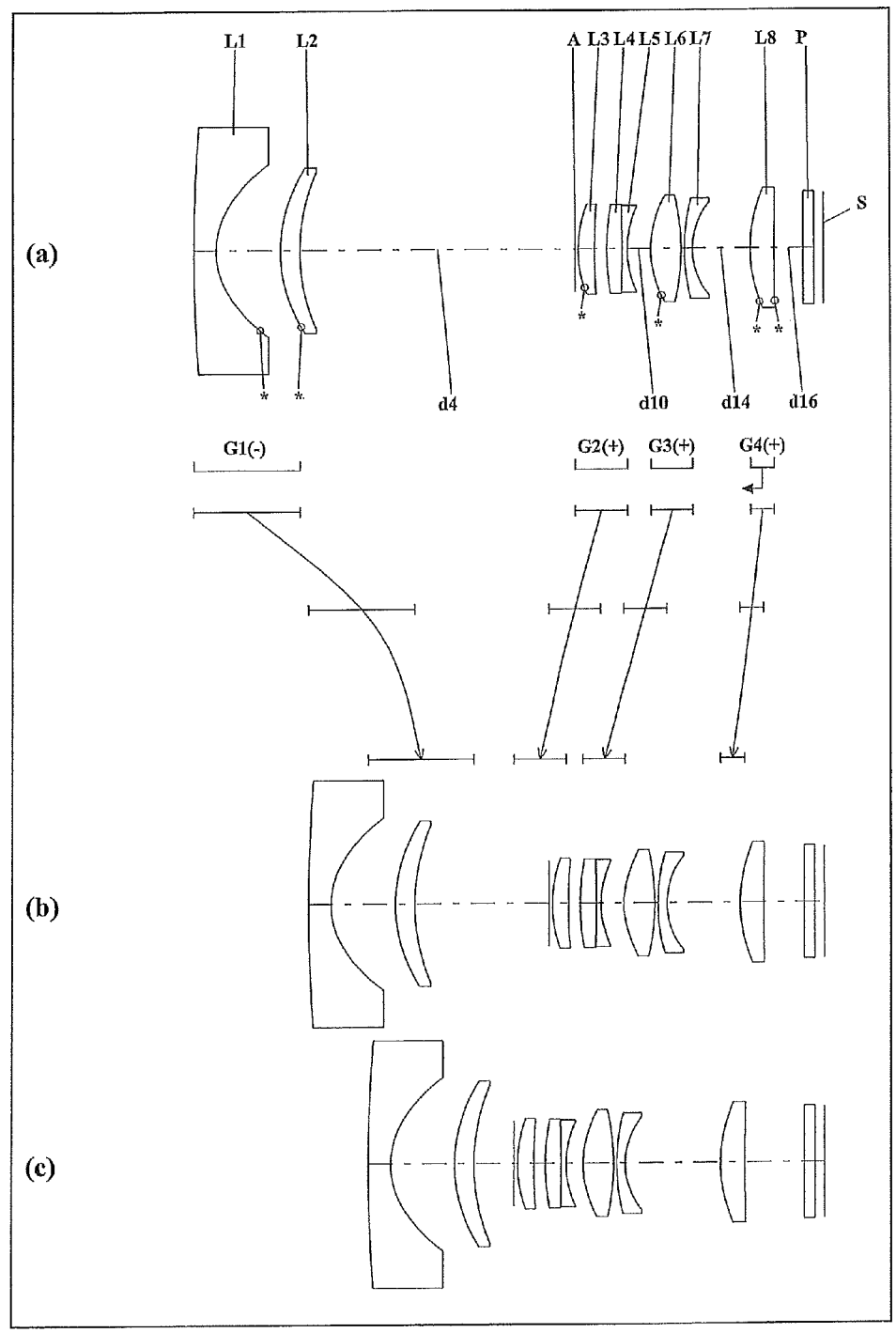
FIG. 4 is a lens arrangement diagram showing an infinity in-focus condition of a zoom lens system according to Embodiment 2 (Example 2).
Figure 5:
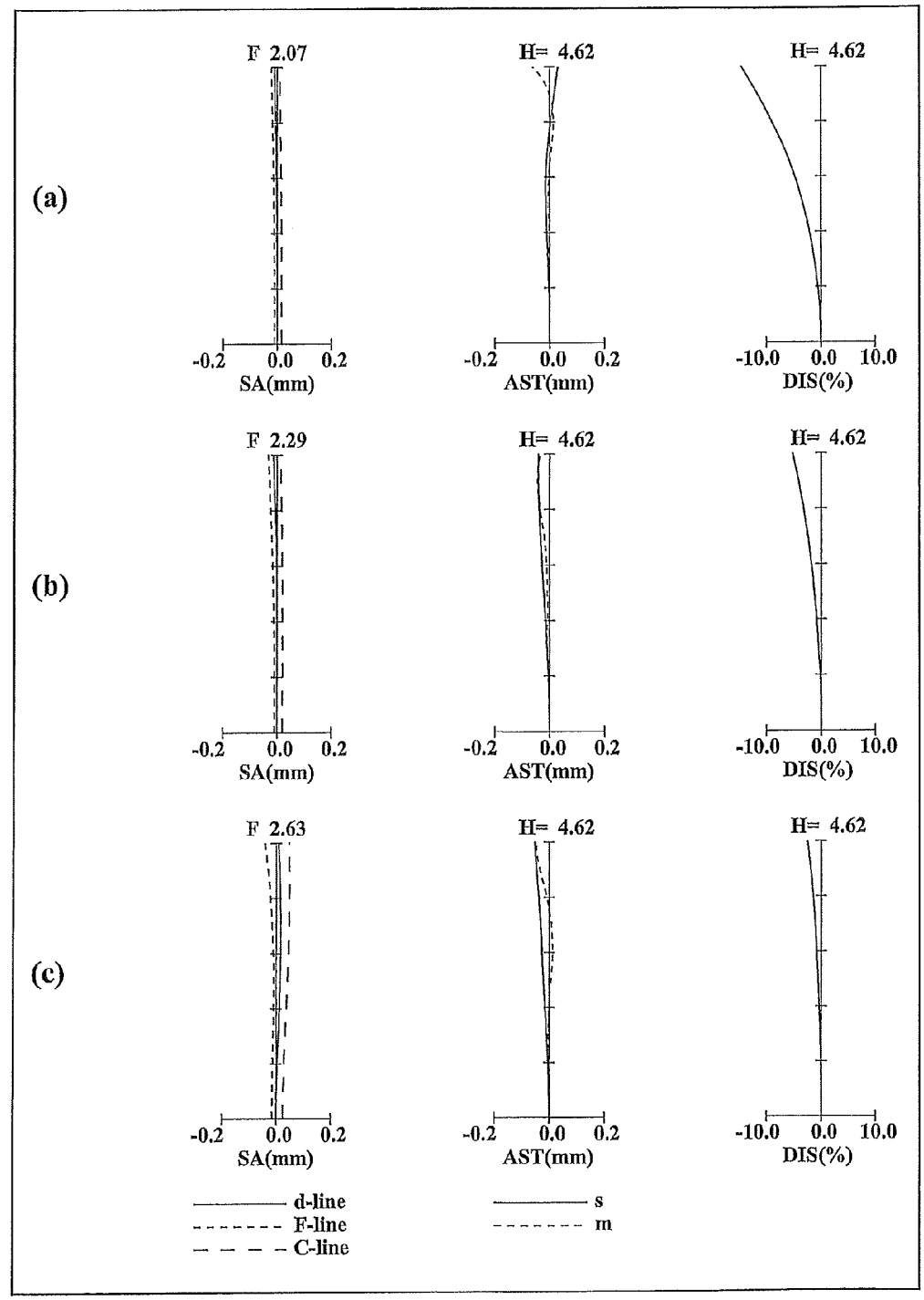
FIG. 5 is a longitudinal aberration diagram of an infinity in-focus condition of a zoom lens system according to Example 2.
Figure 6:
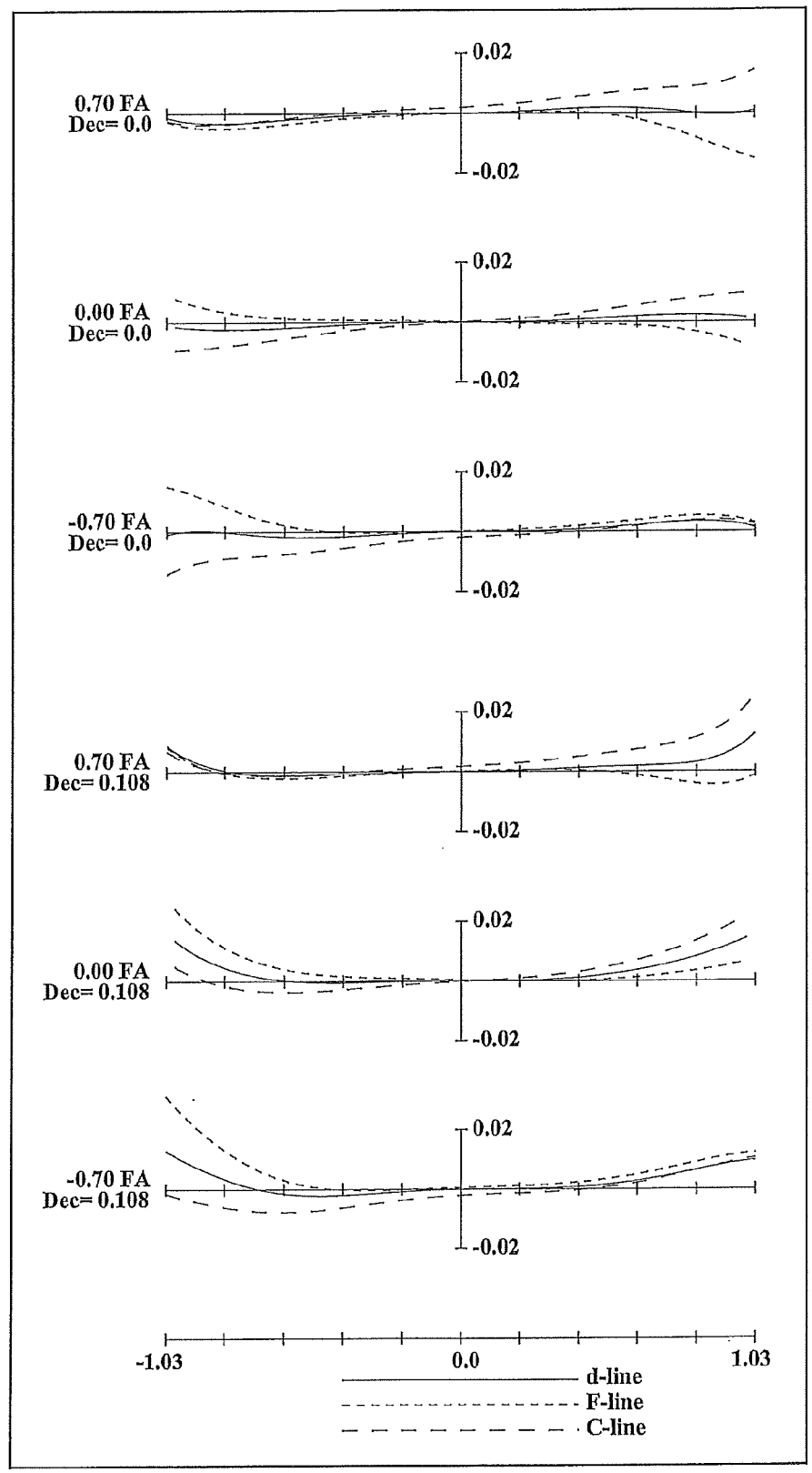
FIG. 6 is a lateral aberration diagram of a zoom lens system according to Example 2 at a telephoto limit in a basic state where image blur compensation is not performed and in a blur compensation state.

Further, in FIGS. 1 and 4, an aperture diaphragm A is provided on the object side relative to the second lens unit G2 (between the most image side lens surface of the first lens unit G1 and the most object side lens surface of the second lens unit G2). In zooming from a wide-angle limit to a telephoto limit at the time of image taking, the aperture diaphragm A moves along the optical axis integrally with the second lens unit G2. Further, in FIGS. 7, 10, 13, 16, 19, 22, 25, 28 and 31, an aperture diaphragm A is provided on the object side relative to the third lens unit G3 (between the most image side lens surface of the second lens unit G2 and the most object side lens surface of the third lens unit G3). In zooming from a wide-angle limit to a telephoto limit at the time of image taking, the aperture diaphragm A moves along the optical axis integrally with the third lens unit G3.

As shown in FIG. 1, in the zoom lens system according to Embodiment 1, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces. The second lens element L2 has an aspheric object side surface.

In the zoom lens system according to Embodiment 1, the second lens unit G2, in order from the object side to the image side, comprises: a positive meniscus third lens element L3 with the convex surface facing the object side; a bi-convex fourth lens element L4; and a bi-concave fifth lens element L5. Among these, the fourth lens element L4 and the fifth lens element L5 are cemented with each other. The third lens element L3 has an aspheric object side surface.

In the zoom lens system according to Embodiment 1, the third lens unit G3, in order from the object side to the image side, comprises: a bi-convex sixth lens element L6; and a negative meniscus seventh lens element L7 with the convex surface facing the object side. The sixth lens element L6 has an aspheric object side surface.

In the zoom lens system according to Embodiment 1, the fourth lens unit G4 comprises solely a positive meniscus eighth lens element L8 with the convex surface facing the object side. The eighth lens element L8 has two aspheric surfaces.

In the zoom lens system according to Embodiment 1, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side together with the aperture diaphragm A, and both the third lens unit G3 and the fourth lens unit G4 move to the object side. That is, in zooming, the individual lens units move along the optical axis such that the interval between the first lens unit G1 and the second lens unit G2 should decrease.

As shown in FIG. 4, in the zoom lens system according to Embodiment 2, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface. The second lens element L2 has an aspheric object side surface.

In the zoom lens system according to Embodiment 2, the second lens unit G2, in order from the object side to the image side, comprises: a positive meniscus third lens element L3 with the convex surface facing the object side; a bi-convex fourth lens element L4; and a bi-concave fifth lens element L5. Among these, the fourth lens element L4 and the fifth lens element L5 are cemented with each other. The third lens element L3 has an aspheric object side surface.

In the zoom lens system according to Embodiment 2, the third lens unit G3, in order from the object side to the image side, comprises: a bi-convex sixth lens element L6; and a negative meniscus seventh lens element L7 with the convex surface facing the object side. The sixth lens element L6 has an aspheric object side surface.

In the zoom lens system according to Embodiment 2, the fourth lens unit G4 comprises solely a positive meniscus eighth lens element L8 with the convex surface facing the object side. The eighth lens element L8 has two aspheric surfaces.

In the zoom lens system according to Embodiment 2, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side together with the aperture diaphragm A, and both the third lens unit G3 and the fourth lens unit G4 move to the object side. That is, in zooming from a wide-angle limit to a telephoto limit at the time of image taking, the individual lens units move along the optical axis such that the interval between the first lens unit G1 and the second lens unit G2 should decrease.

Figure 7:
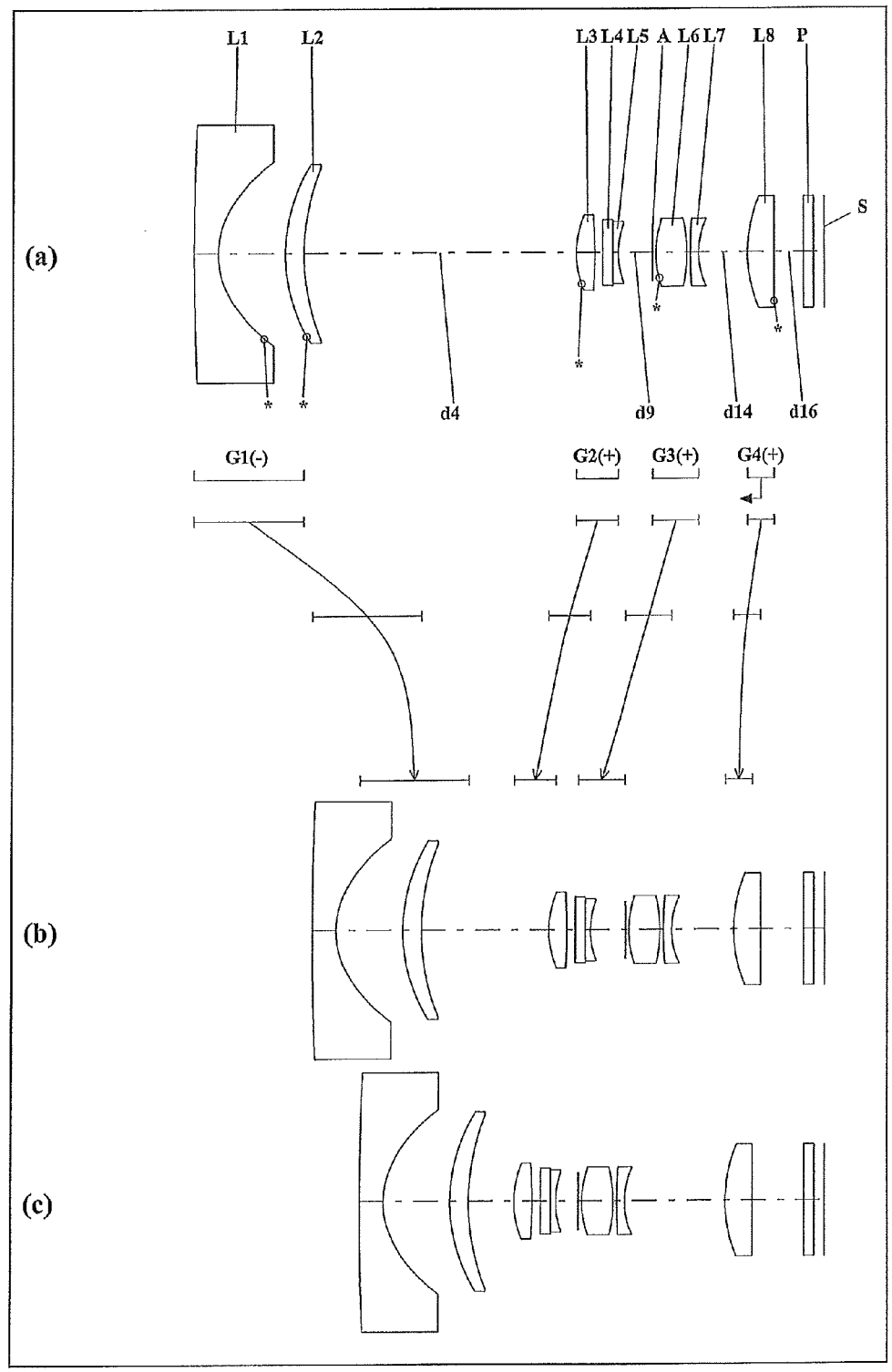
FIG. 7 is a lens arrangement diagram showing an infinity in-focus condition of a zoom lens system according to Embodiment 3 (Example 3).
Figure 8:
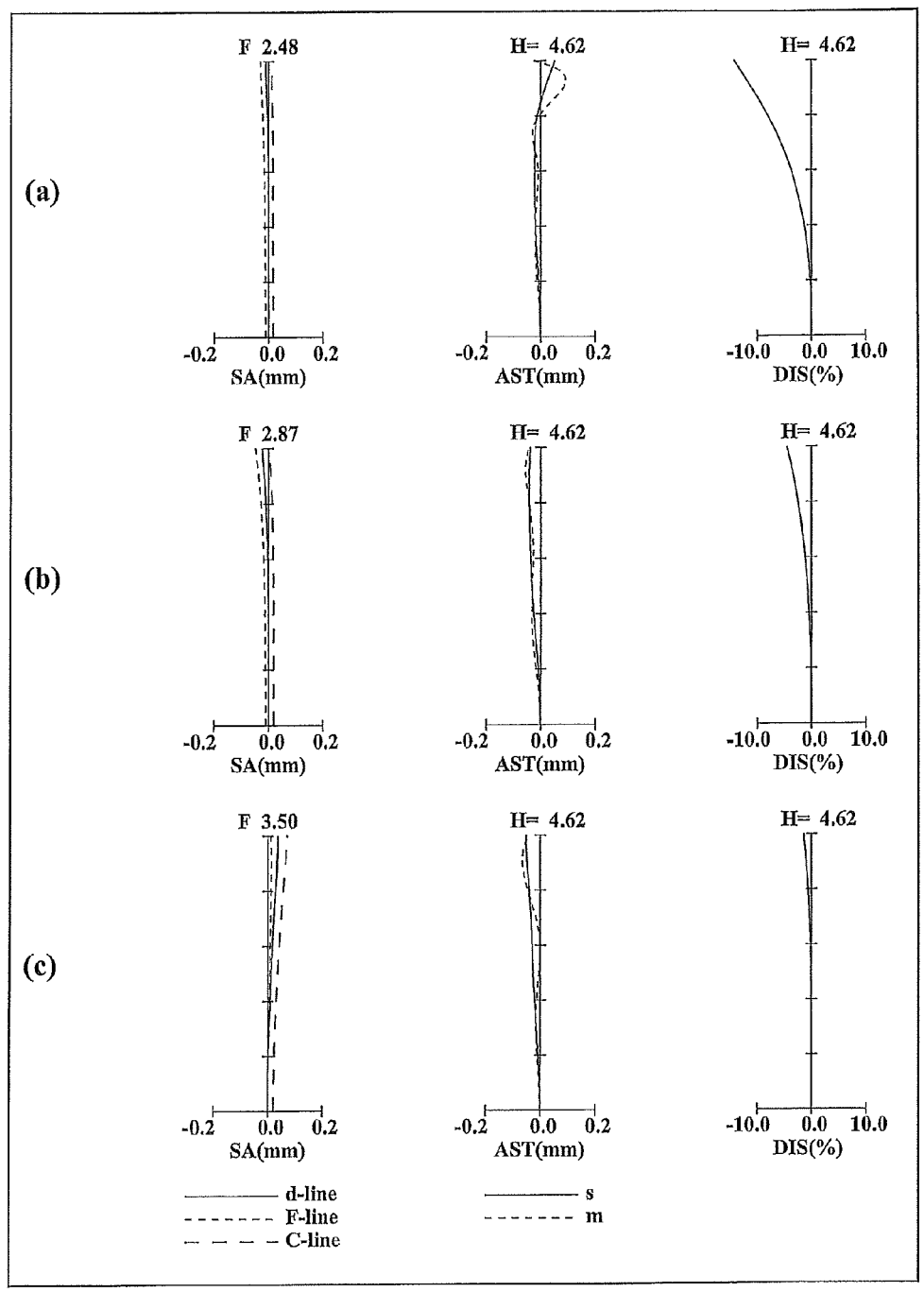
FIG. 8 is a longitudinal aberration diagram of an infinity in-focus condition of a zoom lens system according to Example 3.
Figure 9:
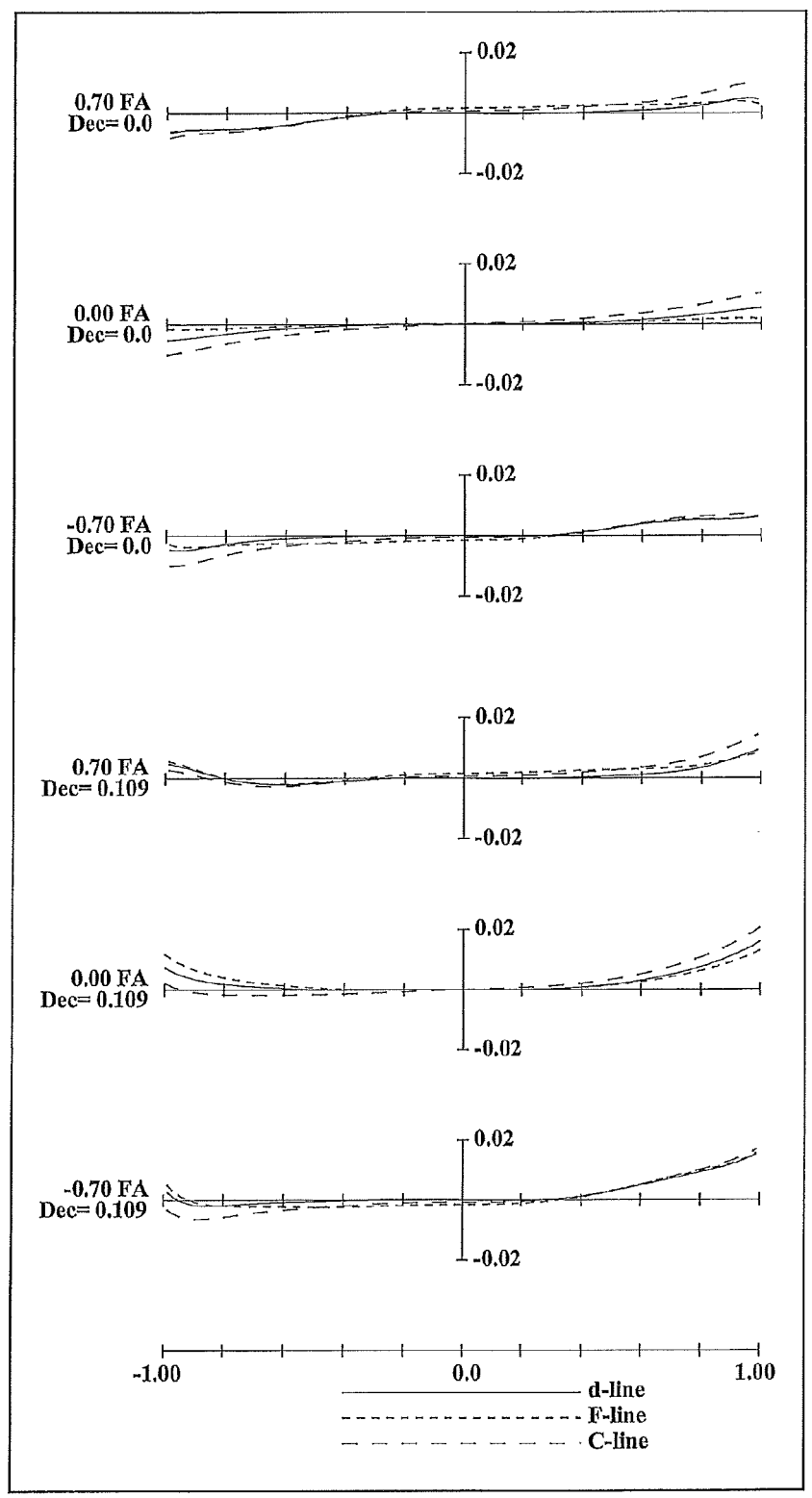
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface. The second lens element L2 has an aspheric object side surface.

In the zoom lens system according to Embodiment 3, the second lens unit G2, in order from the object side to the image side, comprises: a bi-convex third lens element L3; a bi-concave fourth lens element L4; and a negative meniscus fifth lens element L5 with the convex surface facing the object side. Among these, the fourth lens element L4 and the fifth lens element L5 are cemented with each other. The third lens element L3 has an aspheric object side surface.

In the zoom lens system according to Embodiment 3, the third lens unit G3, in order from the object side to the image side, comprises: a bi-convex sixth lens element L6; and a negative meniscus seventh lens element L7 with the convex surface facing the object side. The sixth lens element L6 has an aspheric object side surface.

In the zoom lens system according to Embodiment 3, the fourth lens unit G4 comprises solely a bi-convex eighth lens element L8. The eighth lens element L8 has an aspheric image side surface.

In the zoom lens system according to Embodiment 3, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 10:
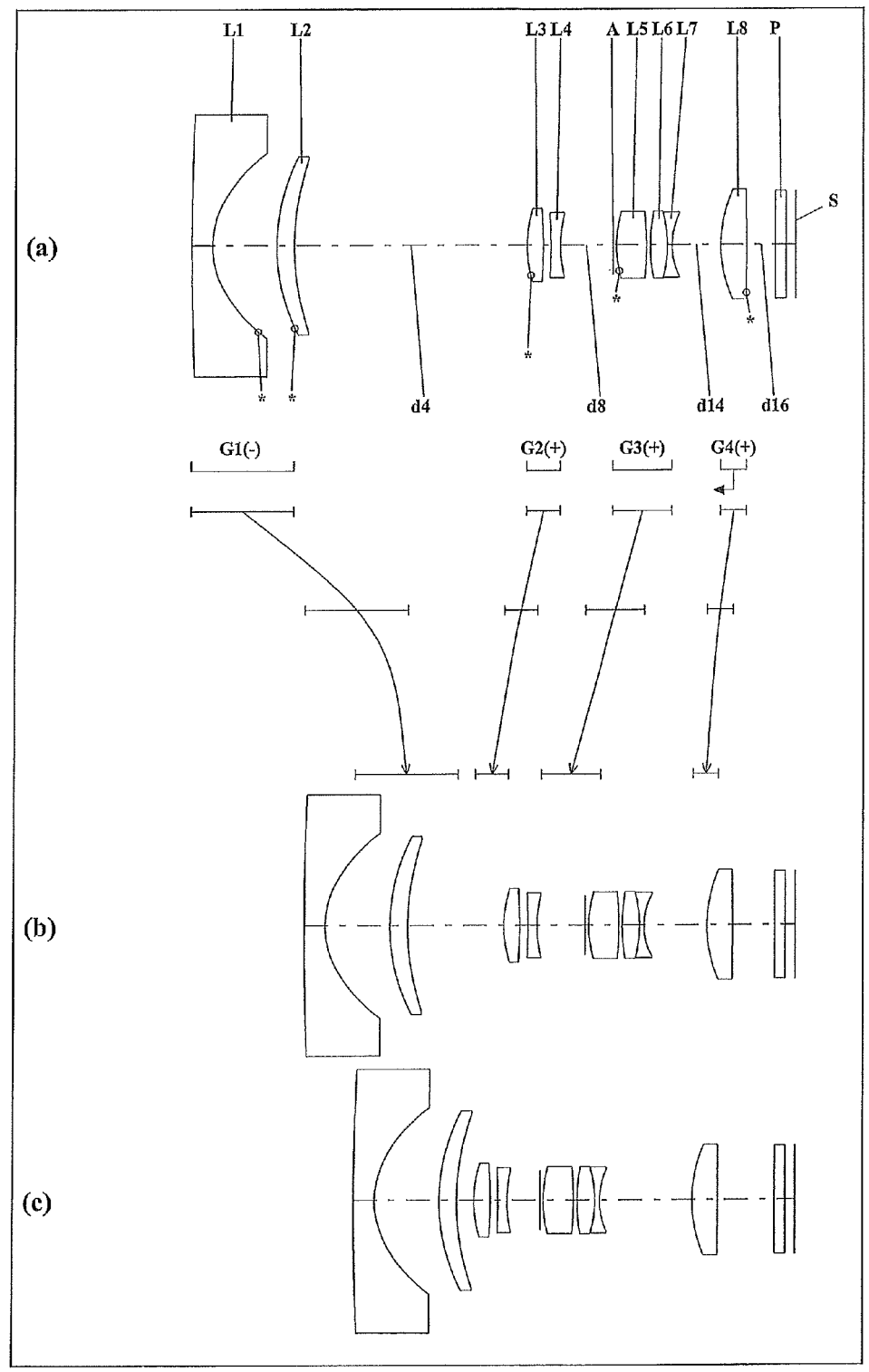
FIG. 10 is a lens arrangement diagram showing an infinity in-focus condition of a zoom lens system according to Embodiment 4 (Example 4).
Figure 11:
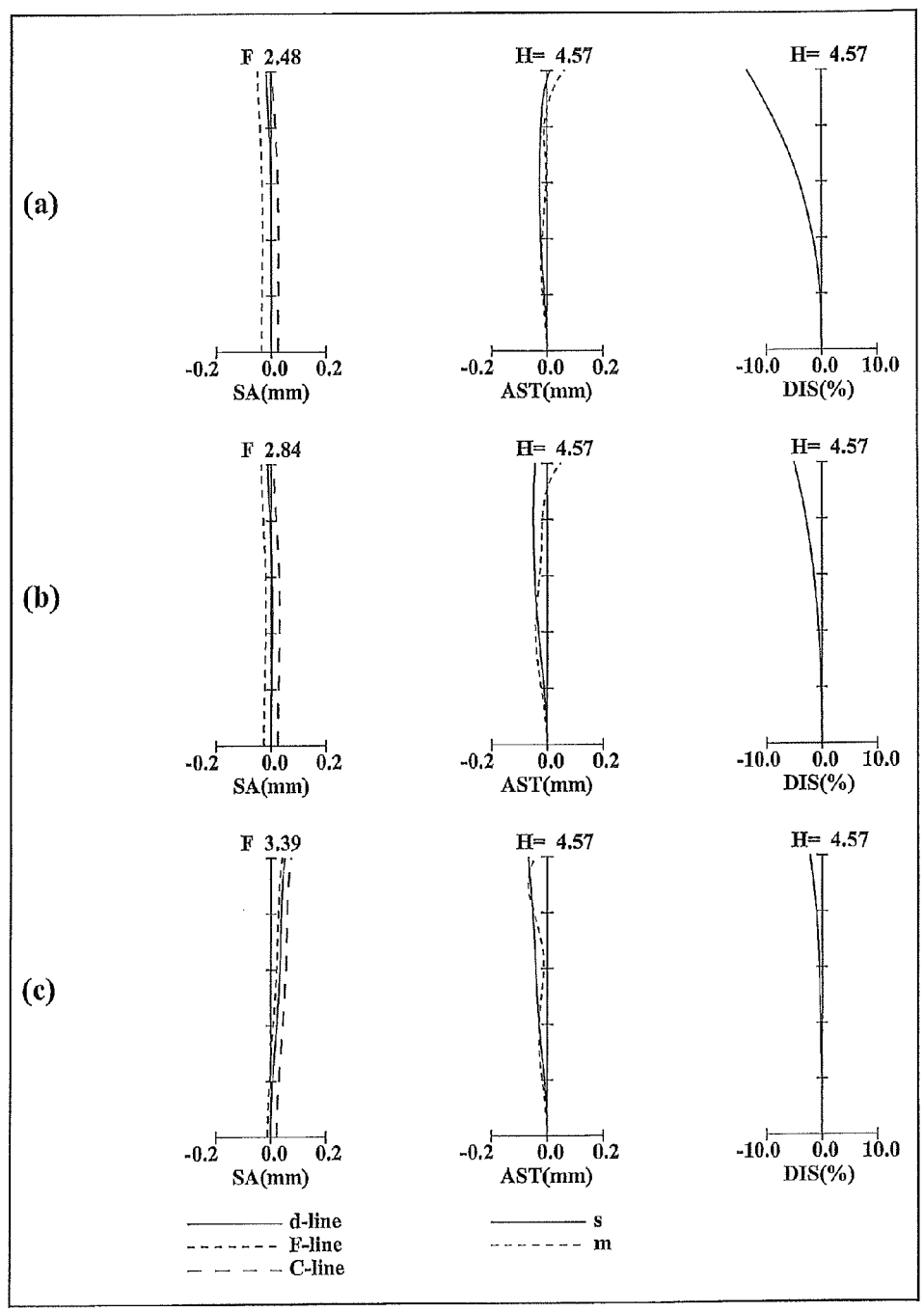
FIG. 11 is a longitudinal aberration diagram of an infinity in-focus condition of a zoom lens system according to Example 4.
Figure 12:
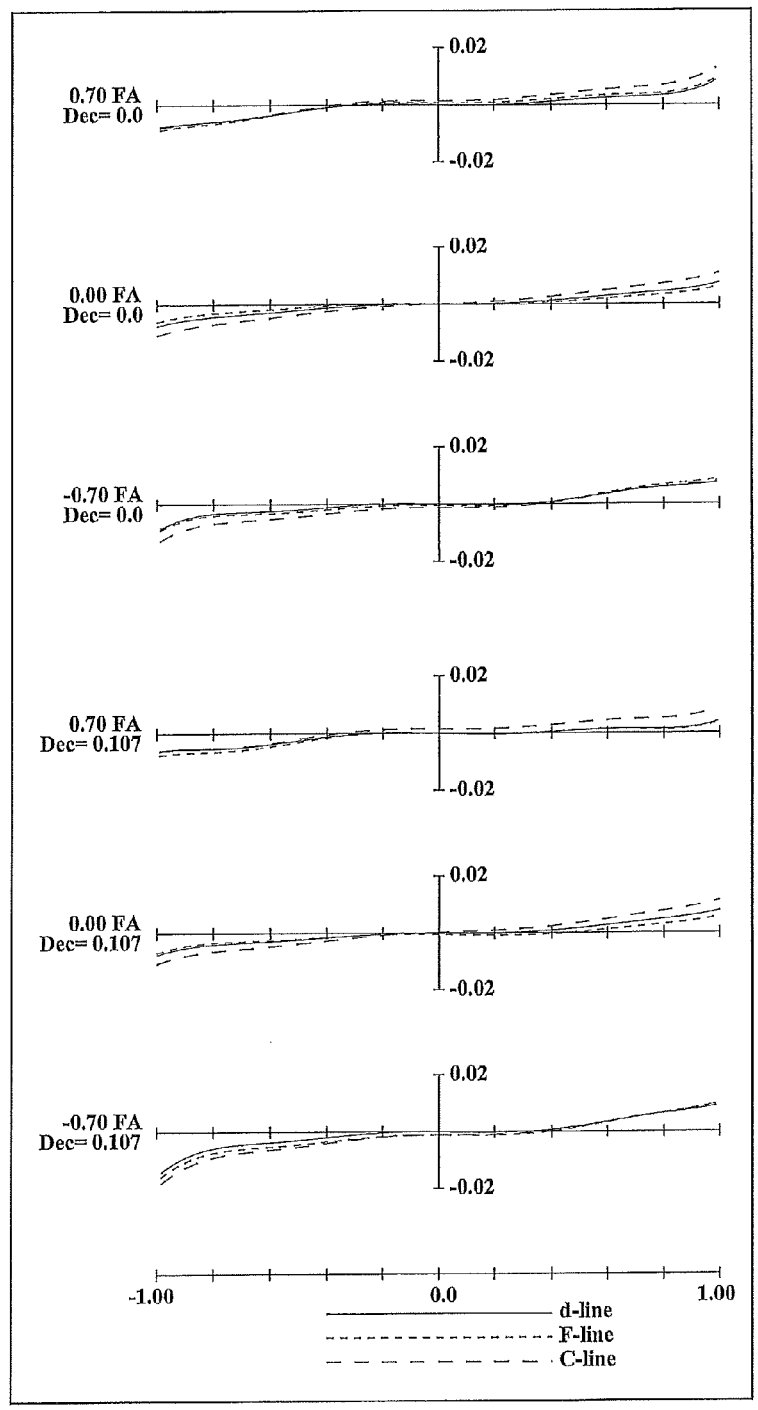
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface. The second lens element L2 has an aspheric object side surface.

In the zoom lens system according to Embodiment 4, the second lens unit G2, in order from the object side to the image side, comprises: a bi-convex third lens element L3; and a bi-concave fourth lens element L4. The third lens element L3 has an aspheric object side surface.

In the zoom lens system according to Embodiment 4, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. The fifth lens element L5 has an aspheric object side surface.

In the zoom lens system according to Embodiment 4, the fourth lens unit G4 comprises solely a bi-convex eighth lens element L8. The eighth lens element L8 has an aspheric image side surface.

In the zoom lens system according to Embodiment 4, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming, the individual lens units move along the optical axis such that the interval between the first lens unit G1 and the second lens unit G2 should decrease.

Figure 13:
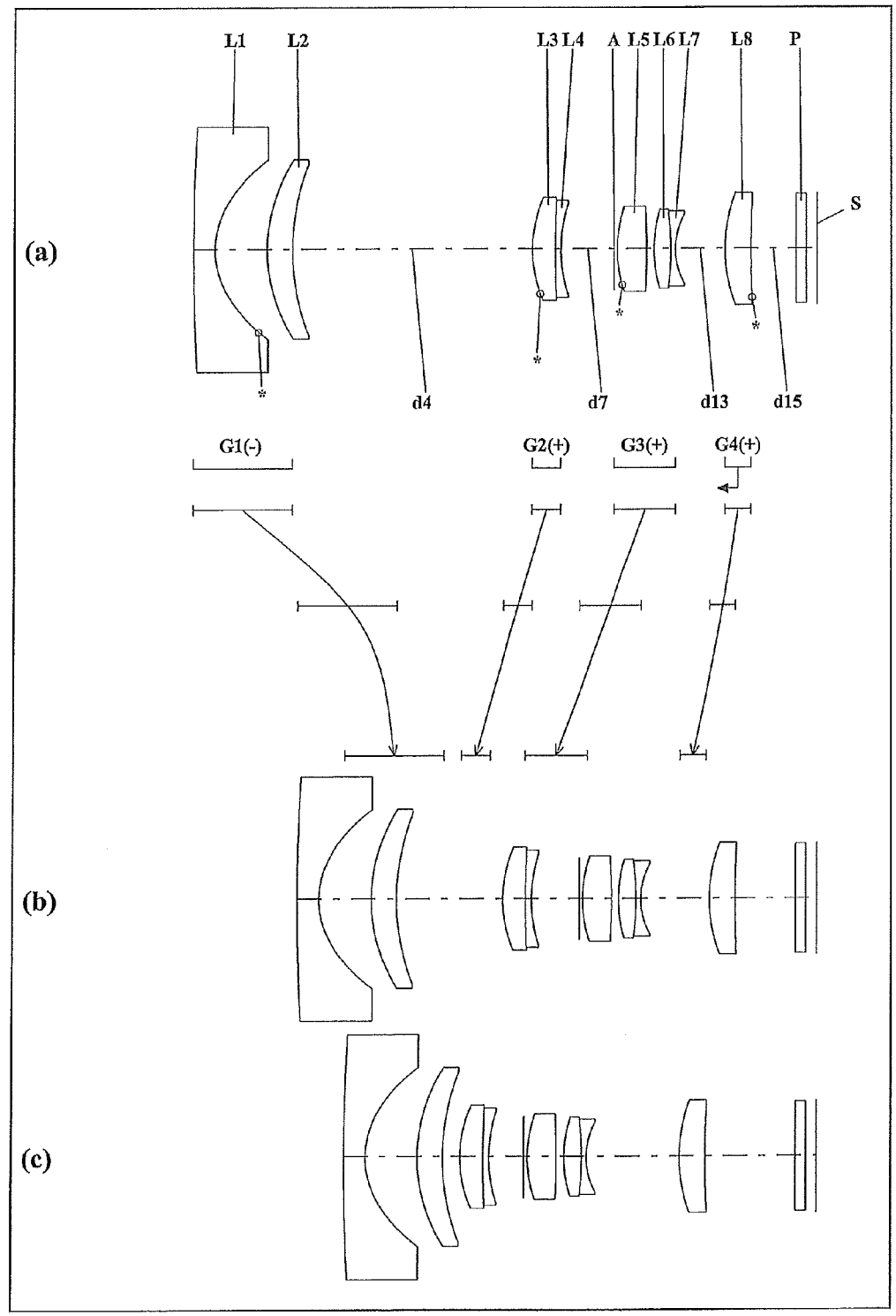
FIG. 13 is a lens arrangement diagram showing an infinity in-focus condition of a zoom lens system according to Embodiment 5 (Example 5).
Figure 14:
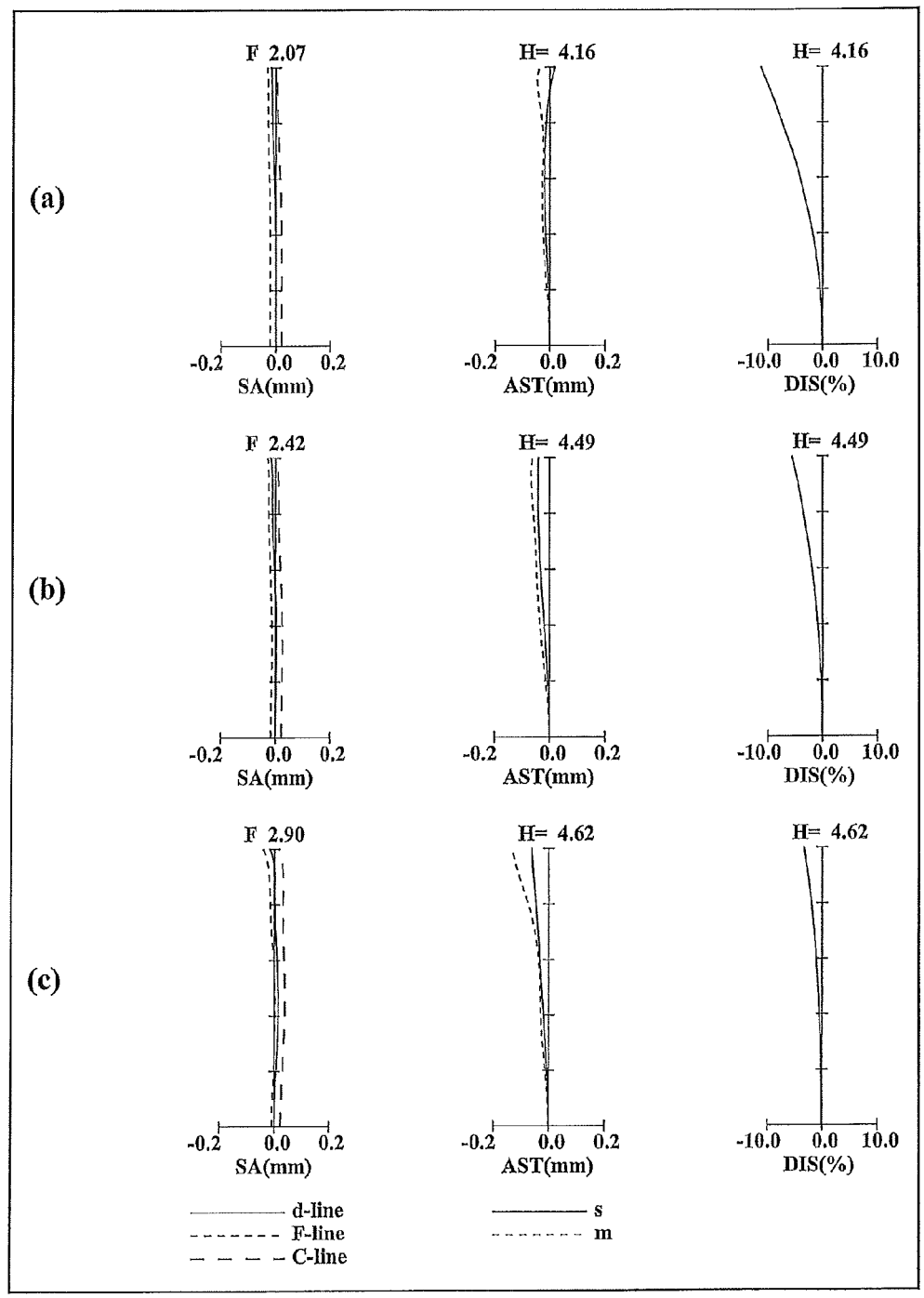
FIG. 14 is a longitudinal aberration diagram of an infinity in-focus condition of a zoom lens system according to Example 5.
Figure 15:
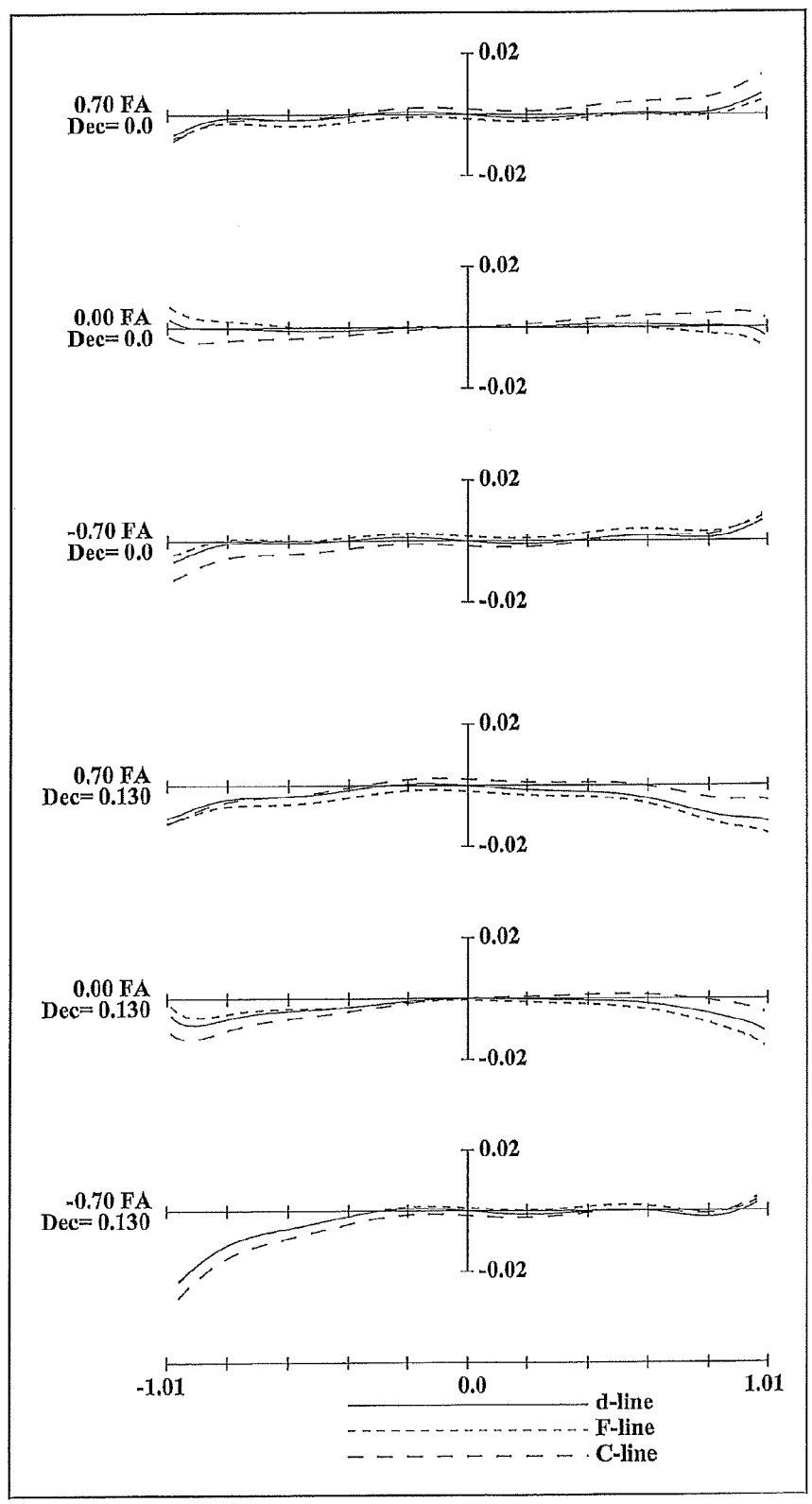
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 5, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. The third lens element L3 has an aspheric object side surface.

In the zoom lens system according to Embodiment 5, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. The fifth lens element L5 has an aspheric object side surface.

In the zoom lens system according to Embodiment 5, the fourth lens unit G4 comprises solely a positive meniscus eighth lens element L8 with the convex surface facing the object side. The eighth lens element L8 has an aspheric image side surface.

In the zoom lens system according to Embodiment 5, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming, the individual lens units move along the optical axis such that the interval between the first lens unit G1 and the second lens unit G2 should decrease.

Figure 16:
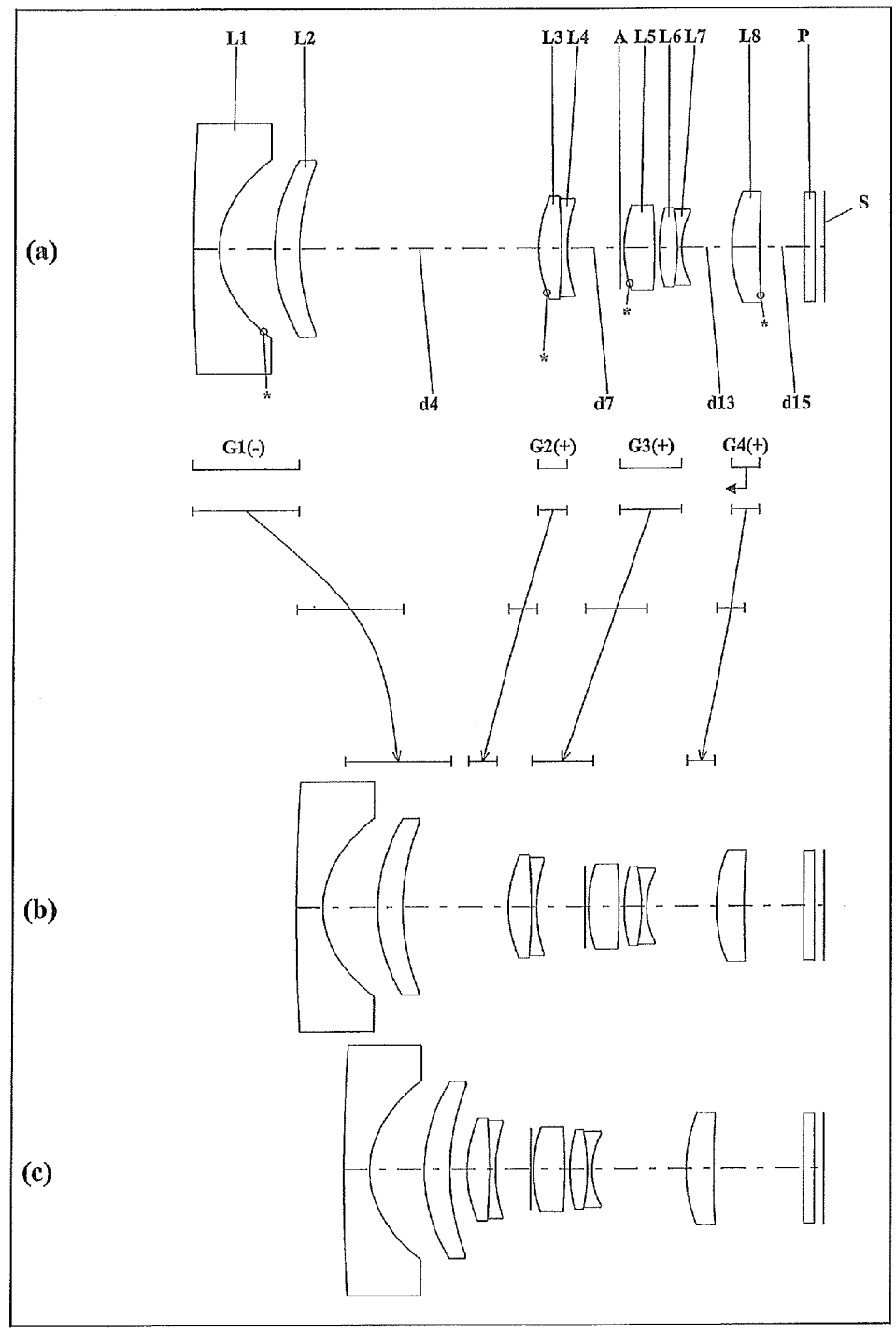
FIG. 16 is a lens arrangement diagram showing an infinity in-focus condition of a zoom lens system according to Embodiment 6 (Example 6).
Figure 17:
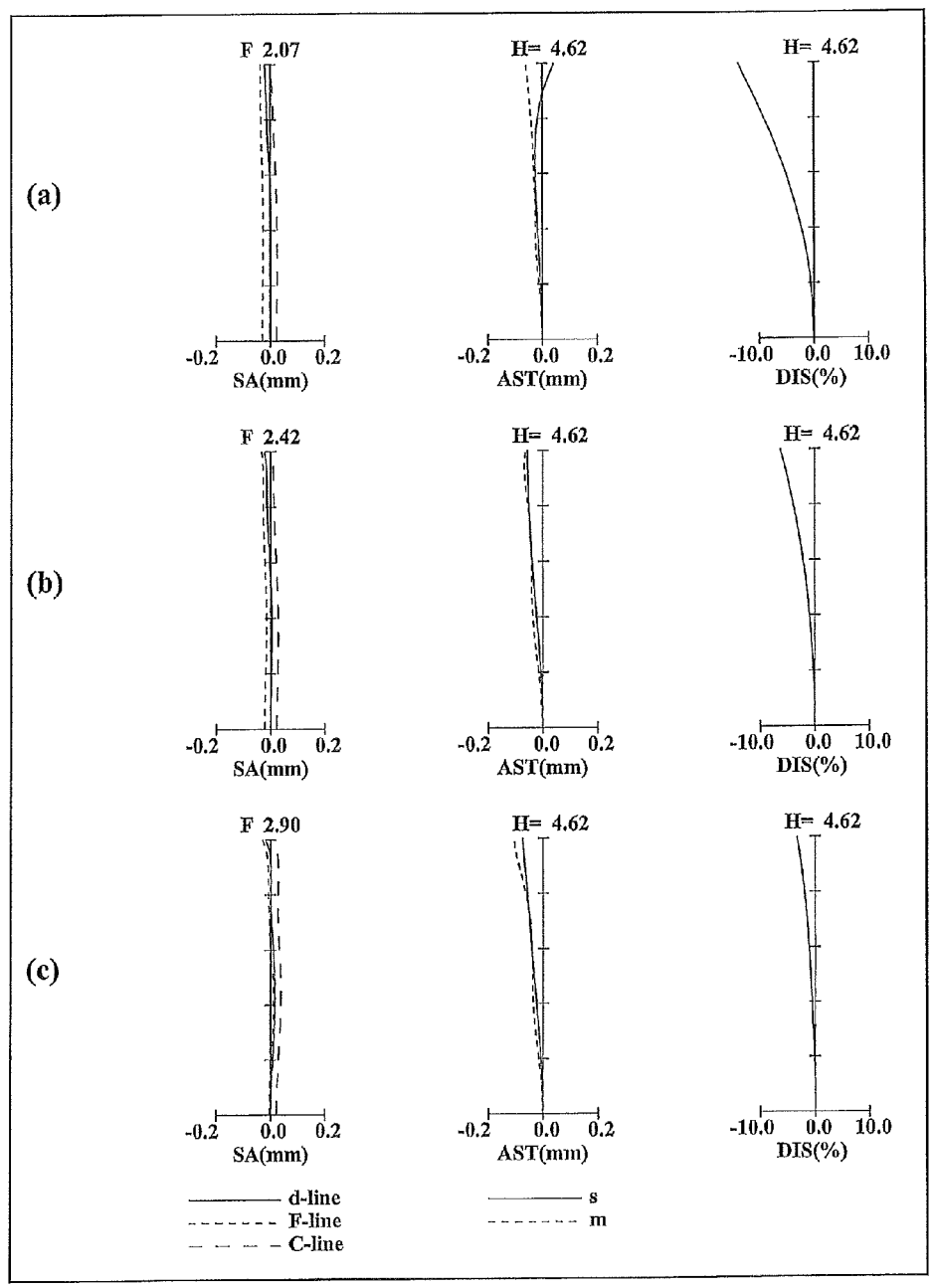
FIG. 17 is a longitudinal aberration diagram of an infinity in-focus condition of a zoom lens system according to Example 6.
Figure 18:
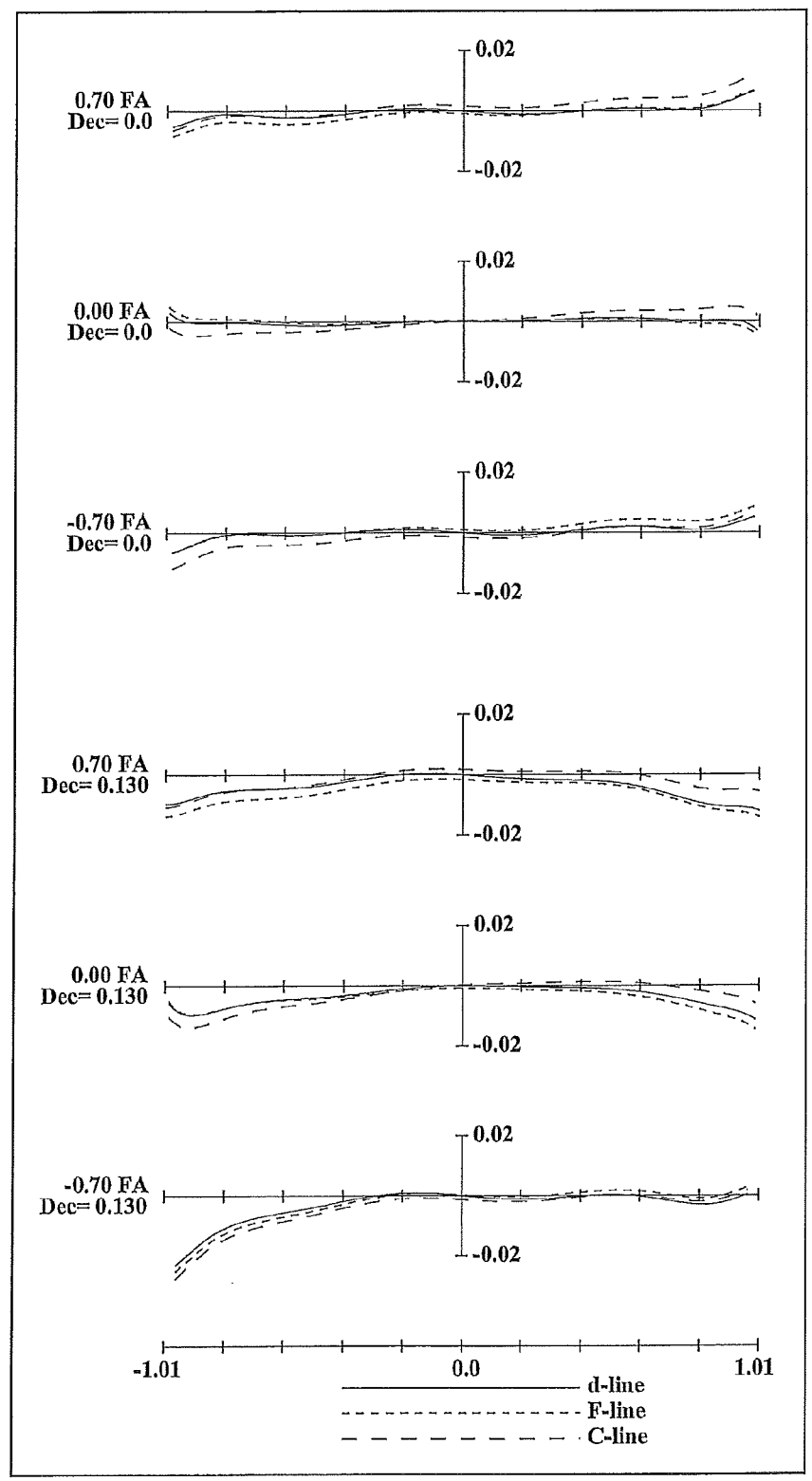
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 6, the second lens unit G2, in order from the object side to the image side, comprises: a bi-convex third lens element L3; and a bi-concave fourth lens element L4. The third lens element L3 and the fourth lens element L4 are cemented with each other. The third lens element L3 has an aspheric object side surface.

In the zoom lens system according to Embodiment 6, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. The fifth lens element L5 has an aspheric object side surface.

In the zoom lens system according to Embodiment 6, the fourth lens unit G4 comprises solely a positive meniscus eighth lens element L8 with the convex surface facing the object side. The eighth lens element L8 has an aspheric image side surface.

In the zoom lens system according to Embodiment 6, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 19:
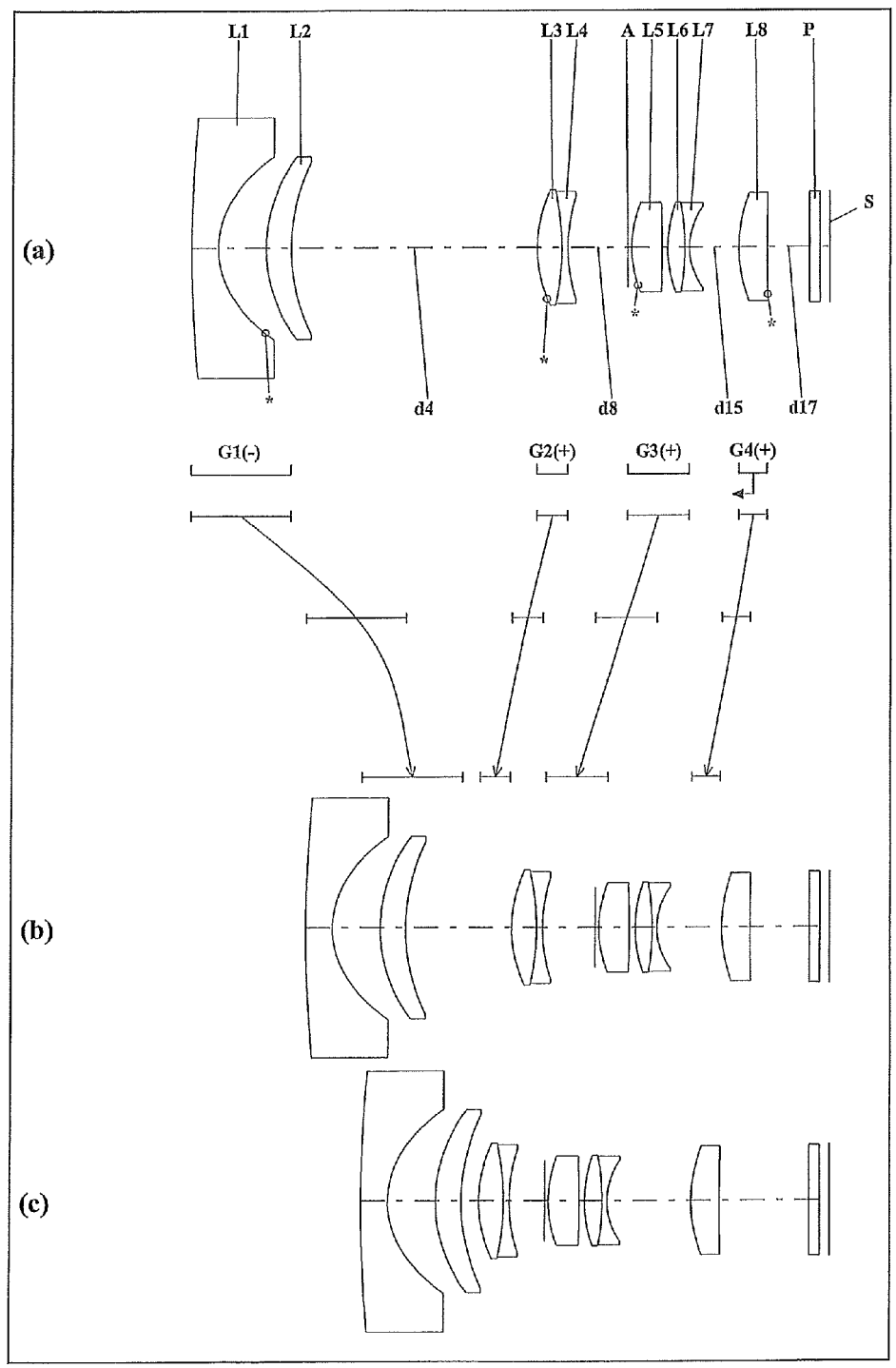
FIG. 19 is a lens arrangement diagram showing an infinity in-focus condition of a zoom lens system according to Embodiment 7 (Example 7).
Figure 20:
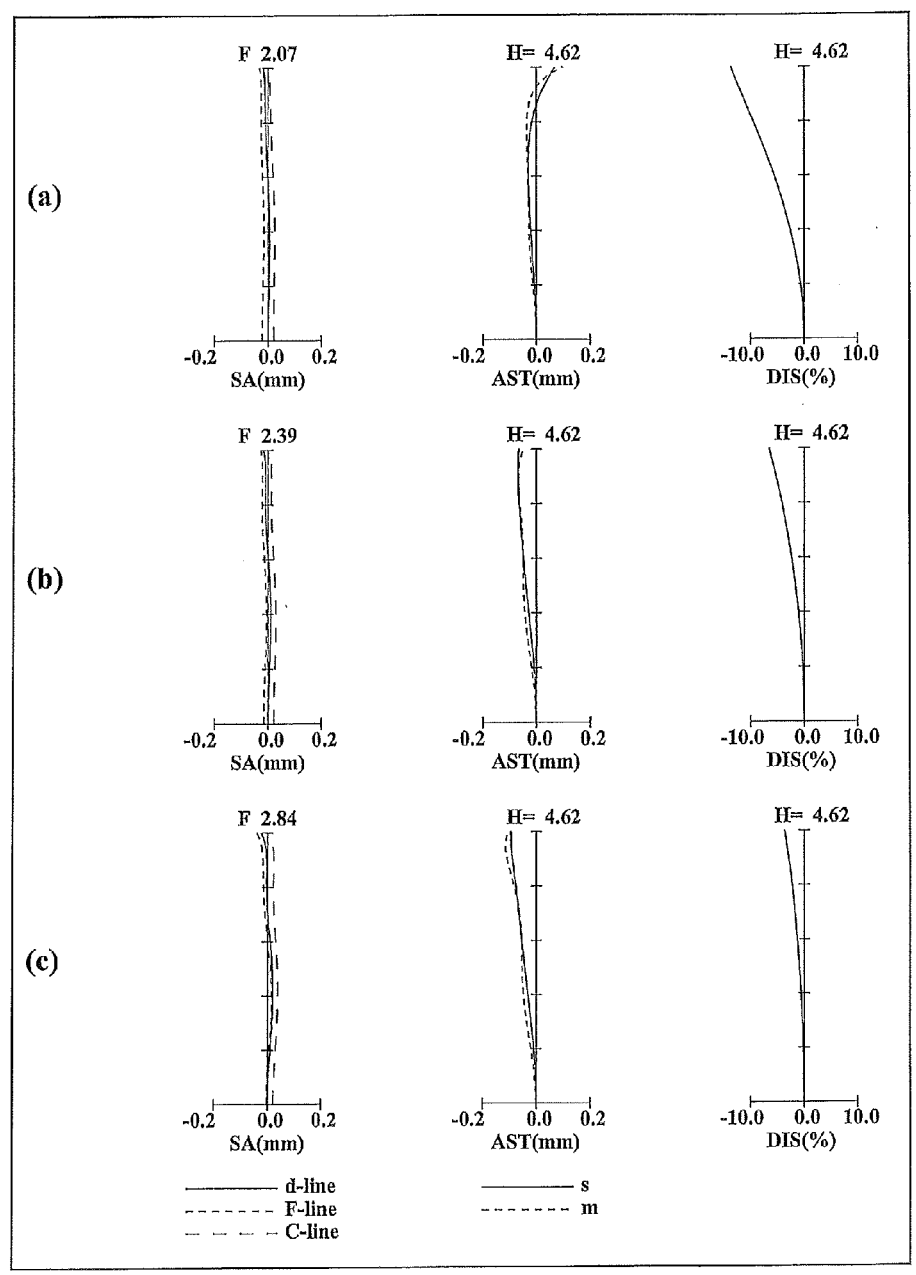
FIG. 20 is a longitudinal aberration diagram of an infinity in-focus condition of a zoom lens system according to Example 7.
Figure 21:
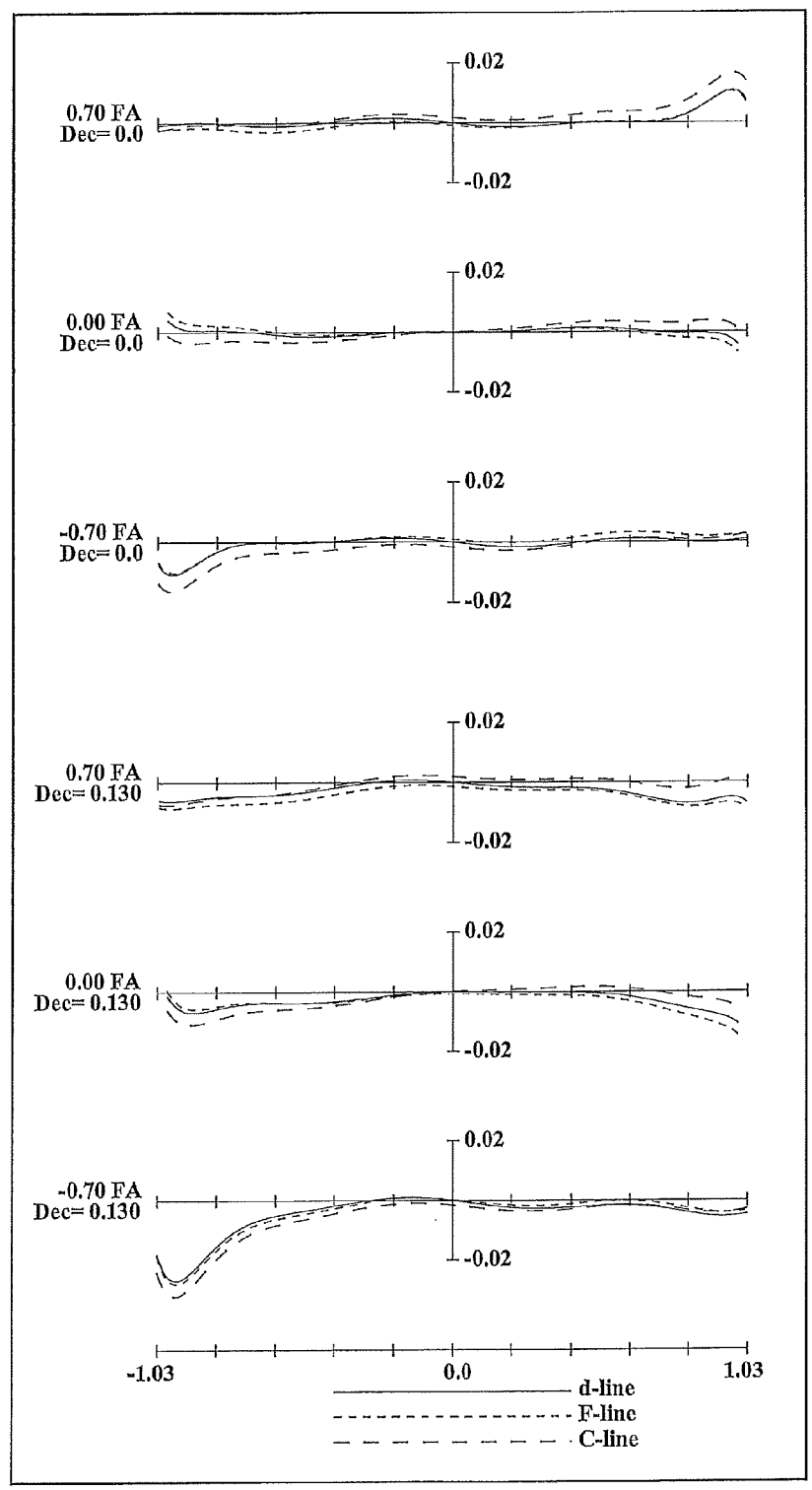
FIG. 21 is a lateral aberration diagram of a zoom lens system according to Example 7 at a telephoto limit in a basic state where image blur compensation is not performed and in a blur compensation state.

As shown in FIG. 19, in the zoom lens system according to Embodiment 7, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 7, the second lens unit G2, in order from the object side to the image side, comprises: a bi-convex third lens element L3; and a bi-concave fourth lens element L4. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 7, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 7, the fourth lens unit G4 comprises solely a positive meniscus eighth lens element L8 with the convex surface facing the object side. The eighth lens element L8 has an aspheric image side surface.

In the zoom lens system according to Embodiment 7, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 22:
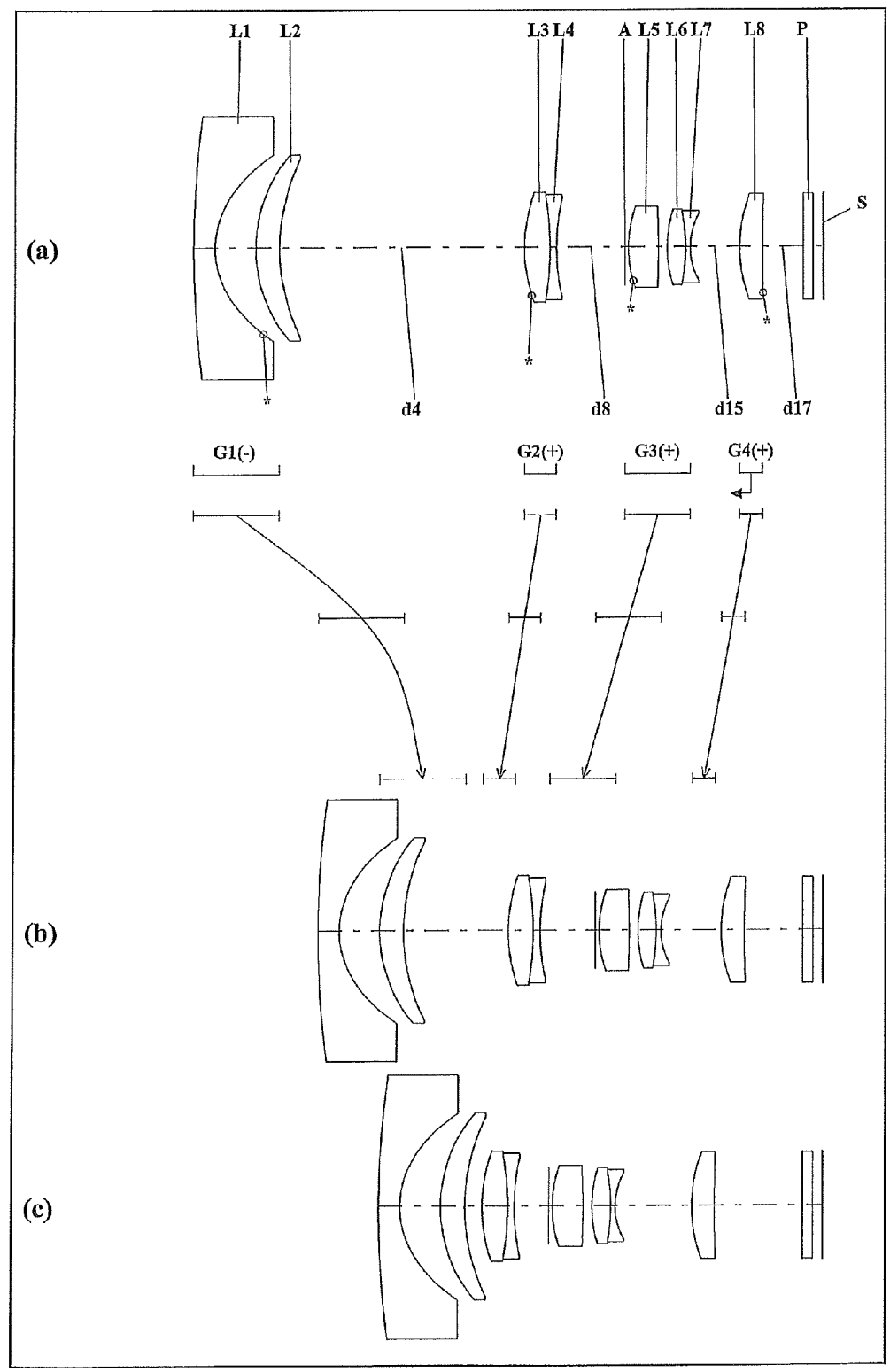
FIG. 22 is a lens arrangement diagram showing an infinity in-focus condition of a zoom lens system according to Embodiment 8 (Example 8).
Figure 23:
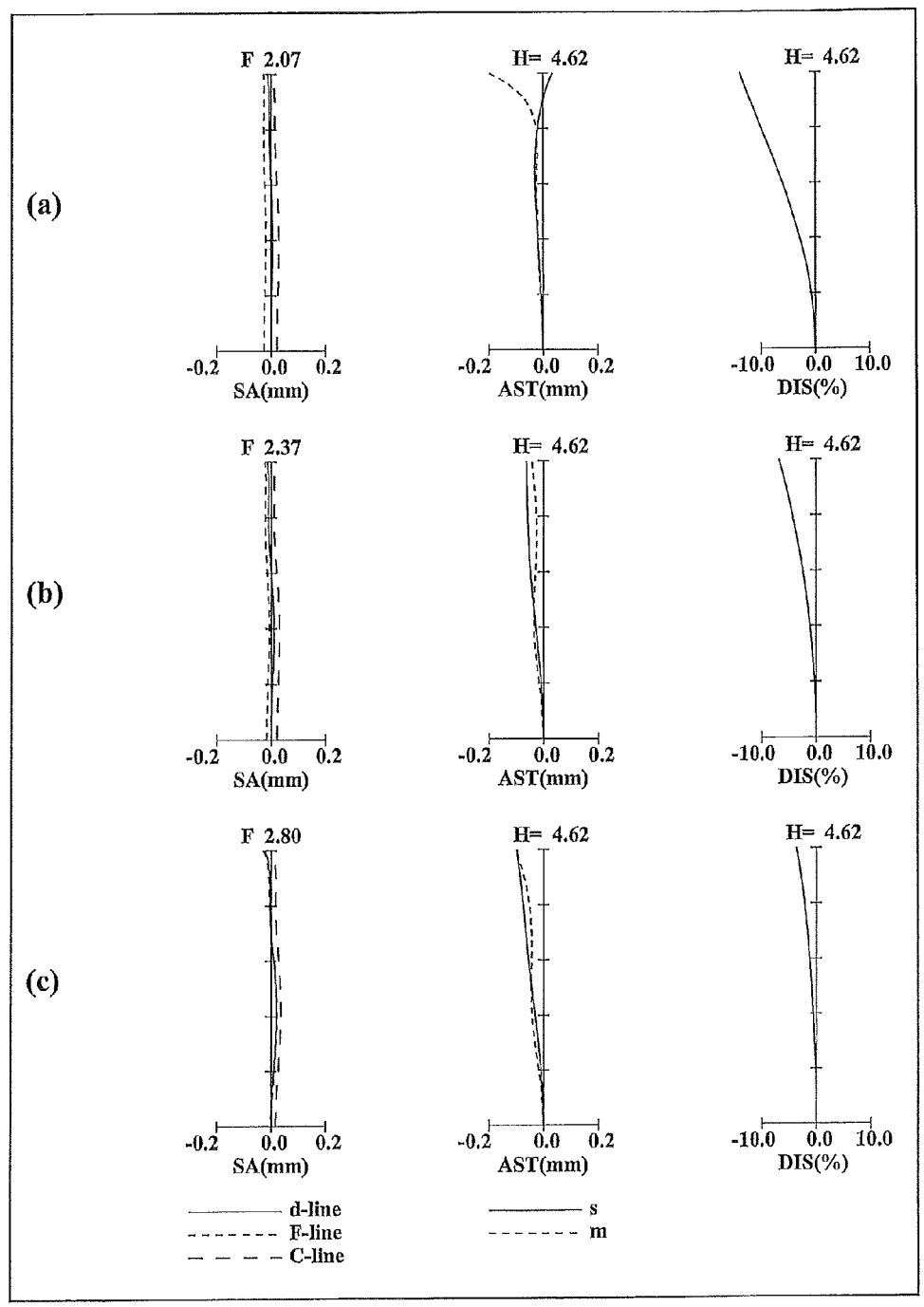
FIG. 23 is a longitudinal aberration diagram of an infinity in-focus condition of a zoom lens system according to Example 8.
Figure 24:
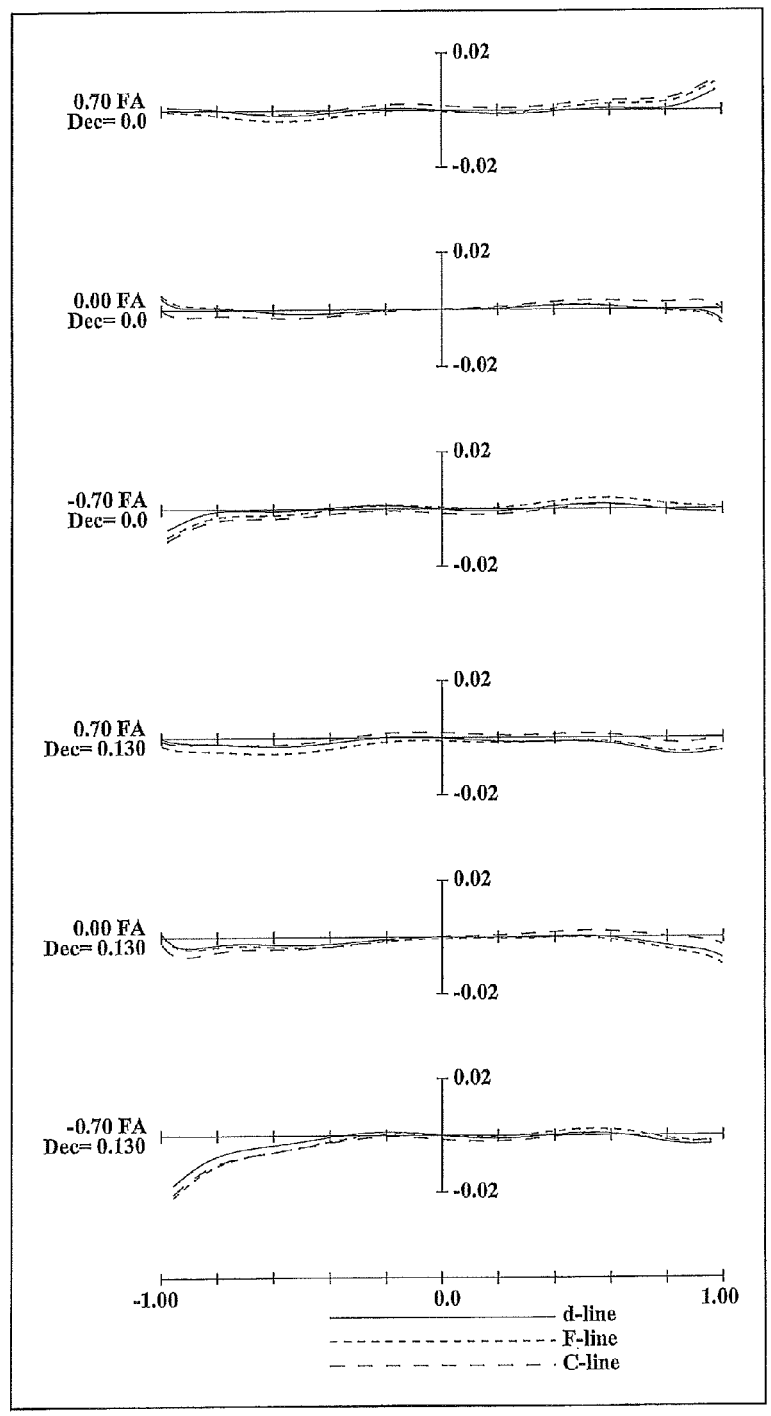
FIG. 24 is a lateral aberration diagram of a zoom lens system according to Example 8 at a telephoto limit in a basic state where image blur compensation is not performed and in a blur compensation state.

As shown in FIG. 22, in the zoom lens system according to Embodiment 8, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 8, the second lens unit G2, in order from the object side to the image side, comprises: a bi-convex third lens element L3; and a bi-concave fourth lens element L4. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 8, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 8, the fourth lens unit G4 comprises solely a positive meniscus eighth lens element L8 with the convex surface facing the object side. The eighth lens element L8 has an aspheric image side surface.

In the zoom lens system according to Embodiment 8, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 25:
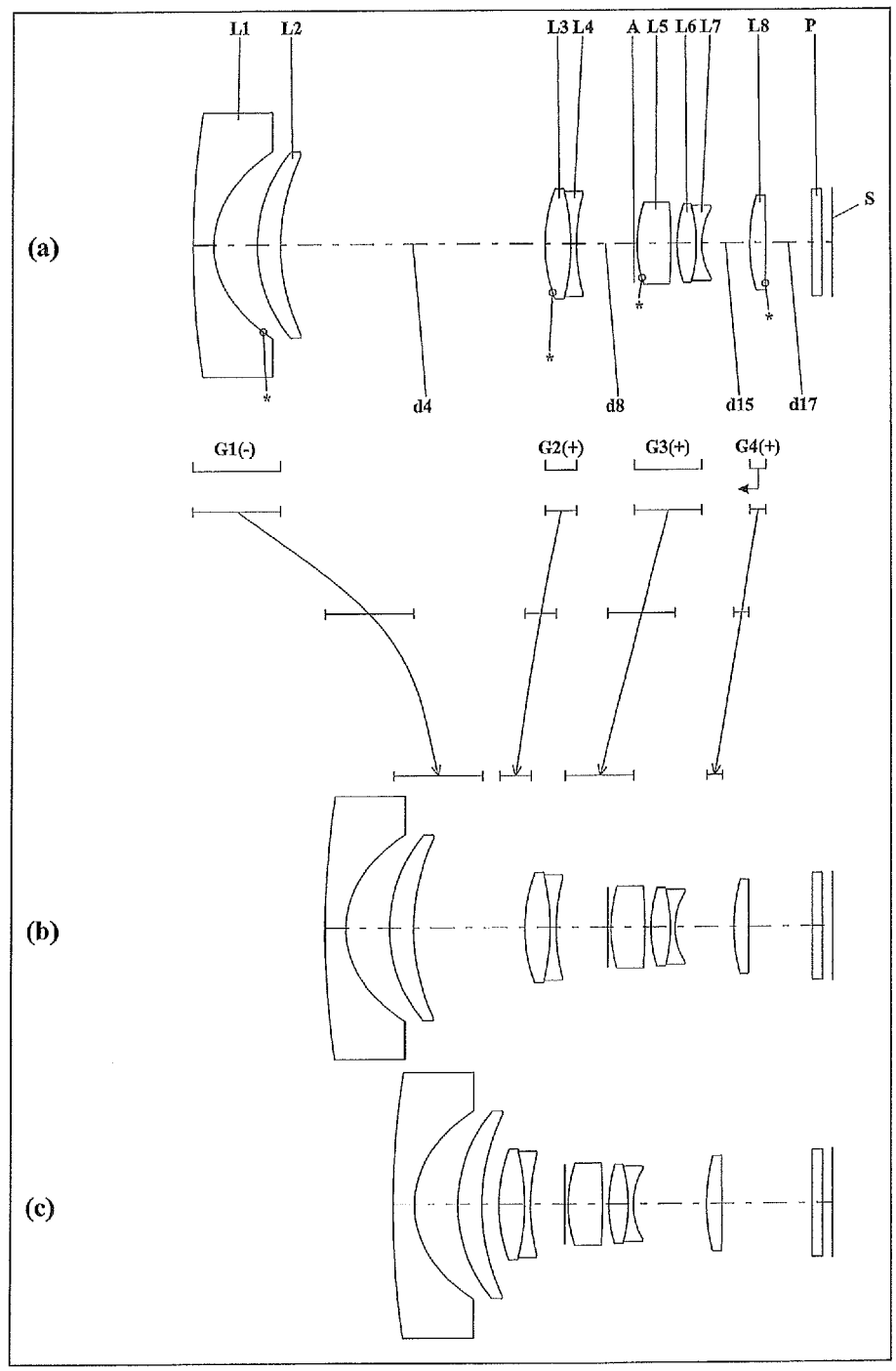
FIG. 25 is a lens arrangement diagram showing an infinity in-focus condition of a zoom lens system according to Embodiment 9 (Example 9).
Figure 26:
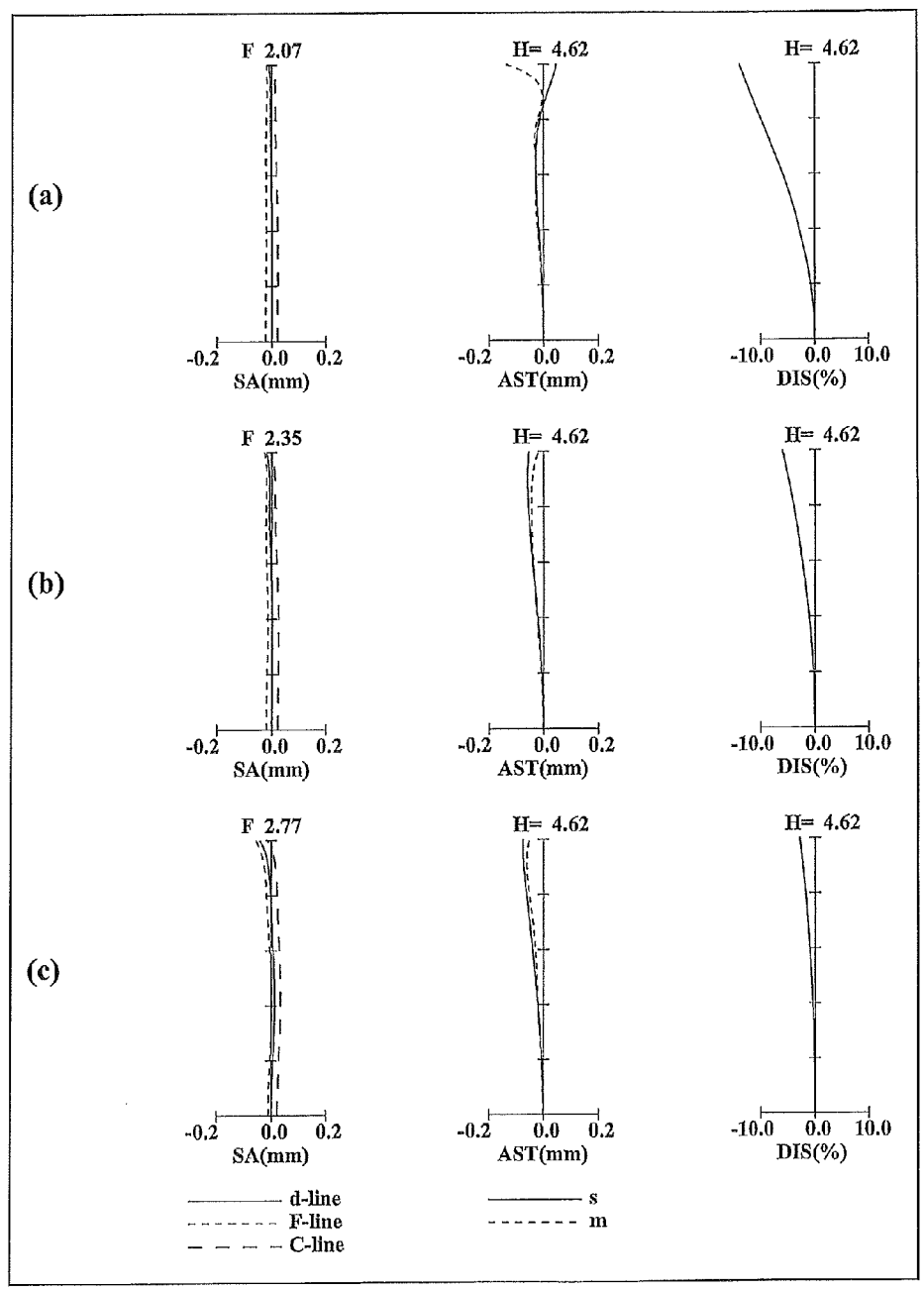
FIG. 26 is a longitudinal aberration diagram of an infinity in-focus condition of a zoom lens system according to Example 9.
Figure 27:
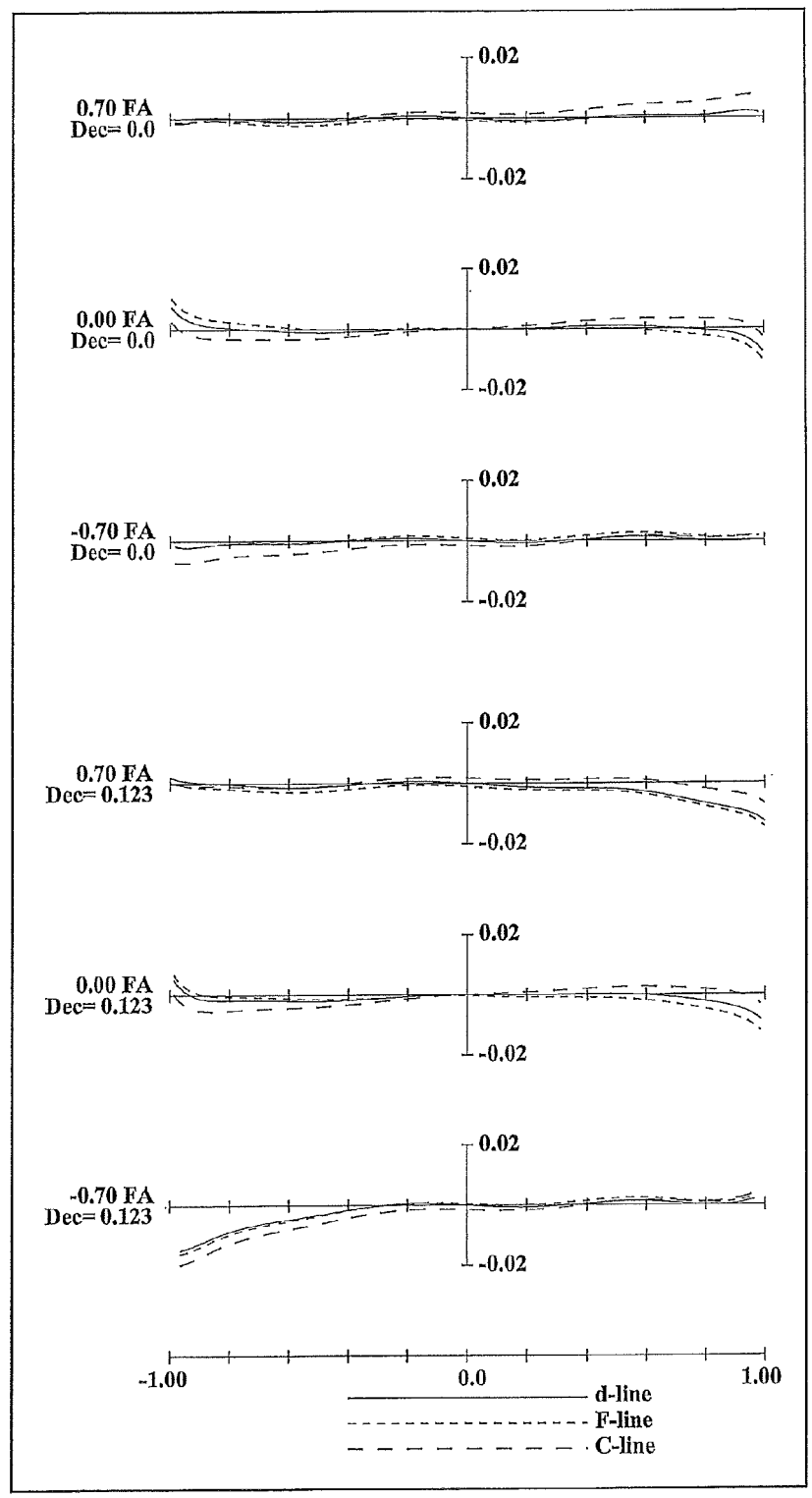
FIG. 27 is a lateral aberration diagram of a zoom lens system according to Example 9 at a telephoto limit in a basic state where image blur compensation is not performed and in a blur compensation state.

As shown in FIG. 25, in the zoom lens system according to Embodiment 9, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 9, the second lens unit G2, in order from the object side to the image side, comprises: a bi-convex third lens element L3; and a bi-concave fourth lens element L4. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 9, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 9, the fourth lens unit G4 comprises solely a bi-convex eighth lens element L8. The eighth lens element L8 has an aspheric image side surface.

In the zoom lens system according to Embodiment 9, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 28:
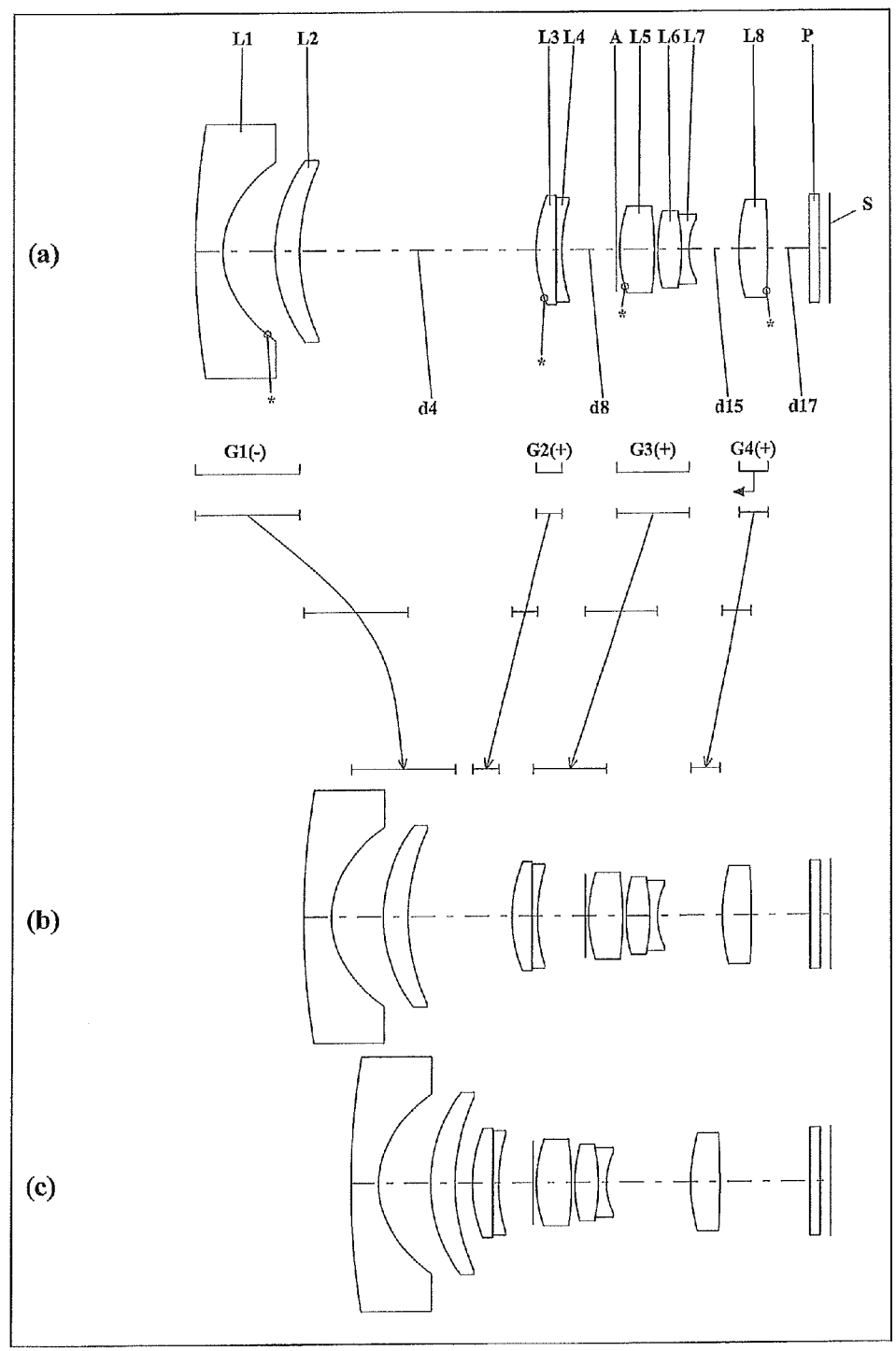
FIG. 28 is a lens arrangement diagram showing an infinity in-focus condition of a zoom lens system according to Embodiment 10 (Example 10).
Figure 29:
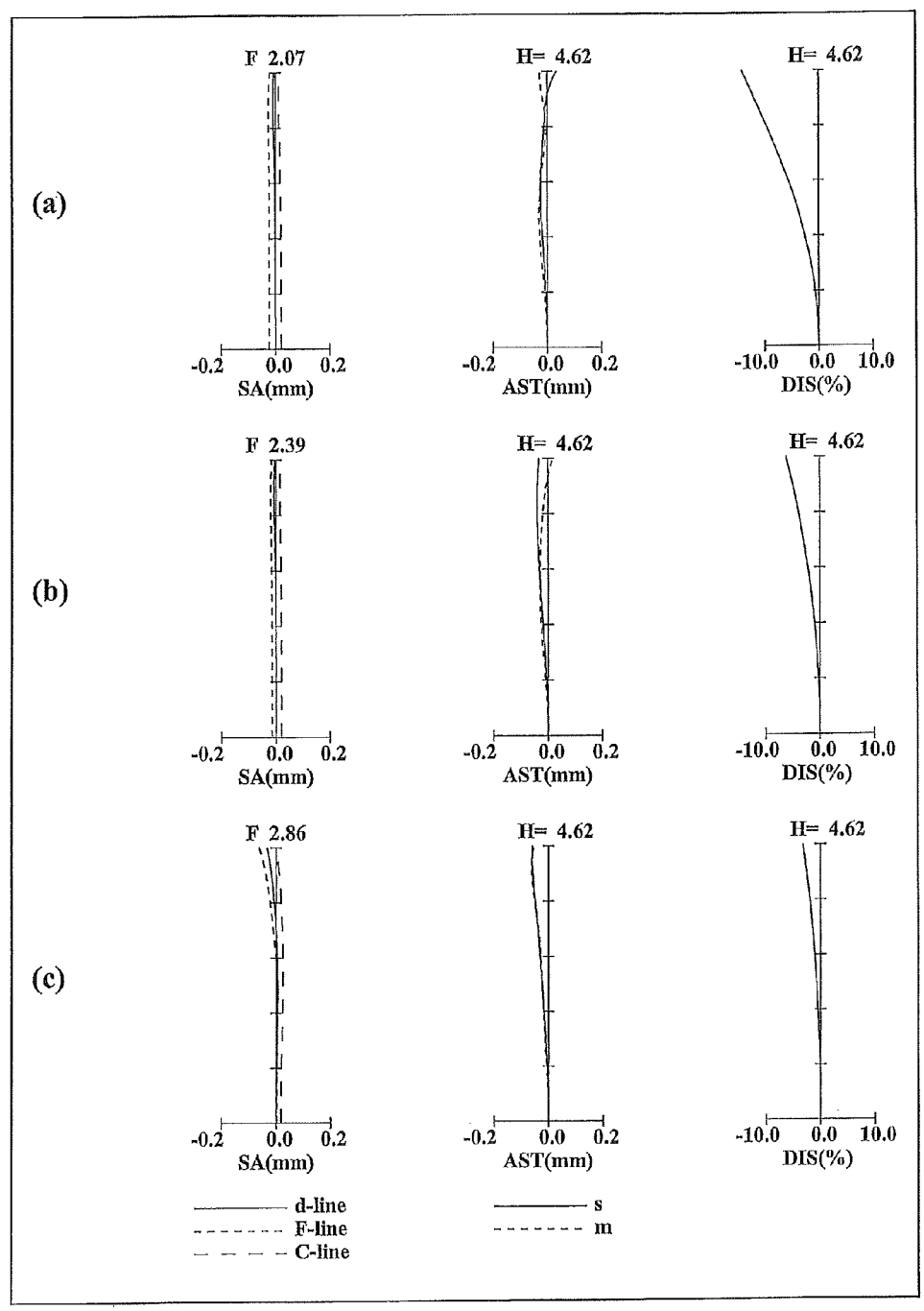
FIG. 29 is a longitudinal aberration diagram of an infinity in-focus condition of a zoom lens system according to Example 10.
Figure 30:
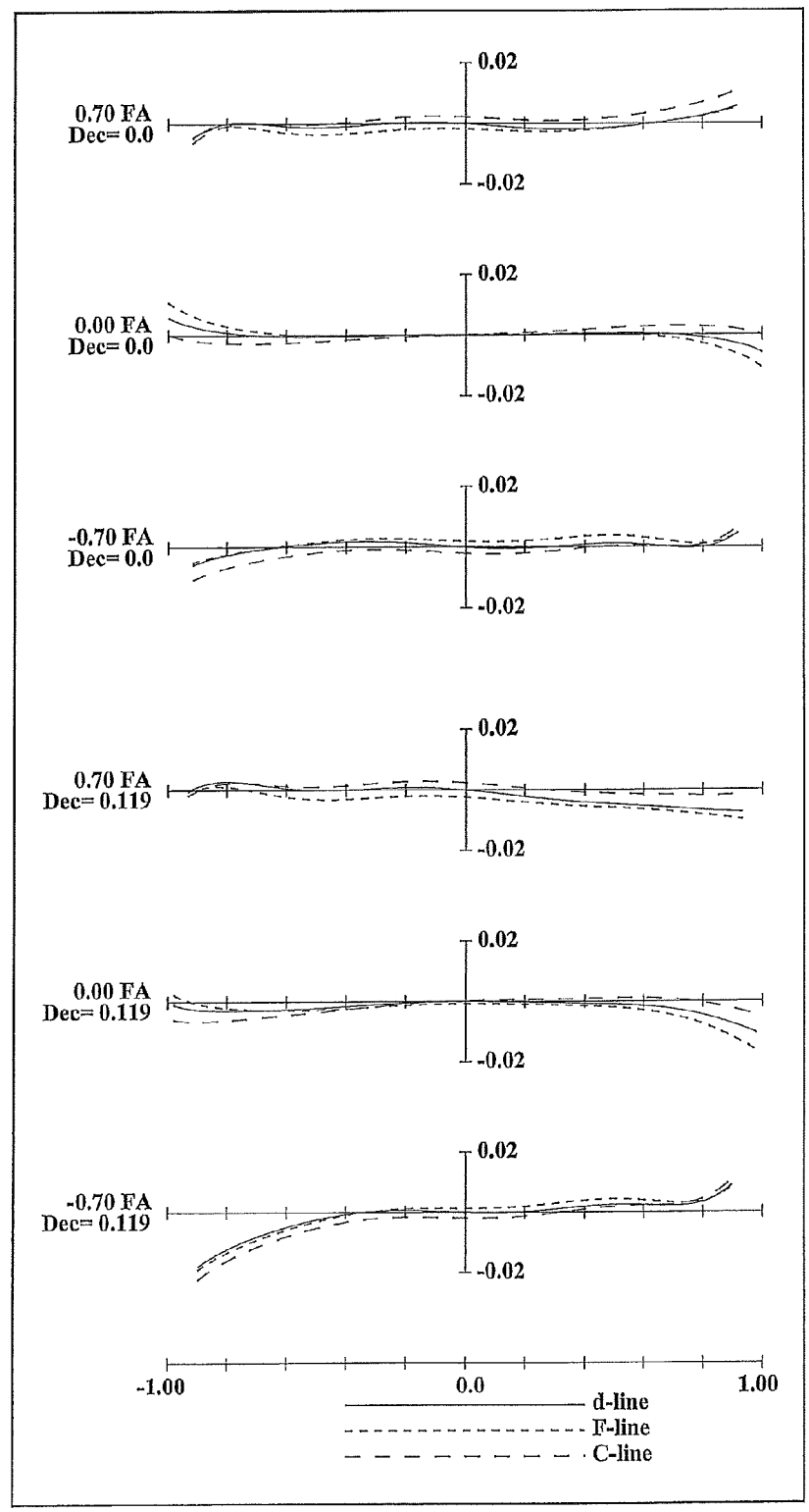
FIG. 30 is a lateral aberration diagram of a zoom lens system according to Example 10 at a telephoto limit in a basic state where image blur compensation is not performed and in a blur compensation state.

As shown in FIG. 28, in the zoom lens system according to Embodiment 10, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 10, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 10, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 10, the fourth lens unit G4 comprises solely a bi-convex eighth lens element L8. The eighth lens element L8 has an aspheric image side surface.

In the zoom lens system according to Embodiment 10, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 31:
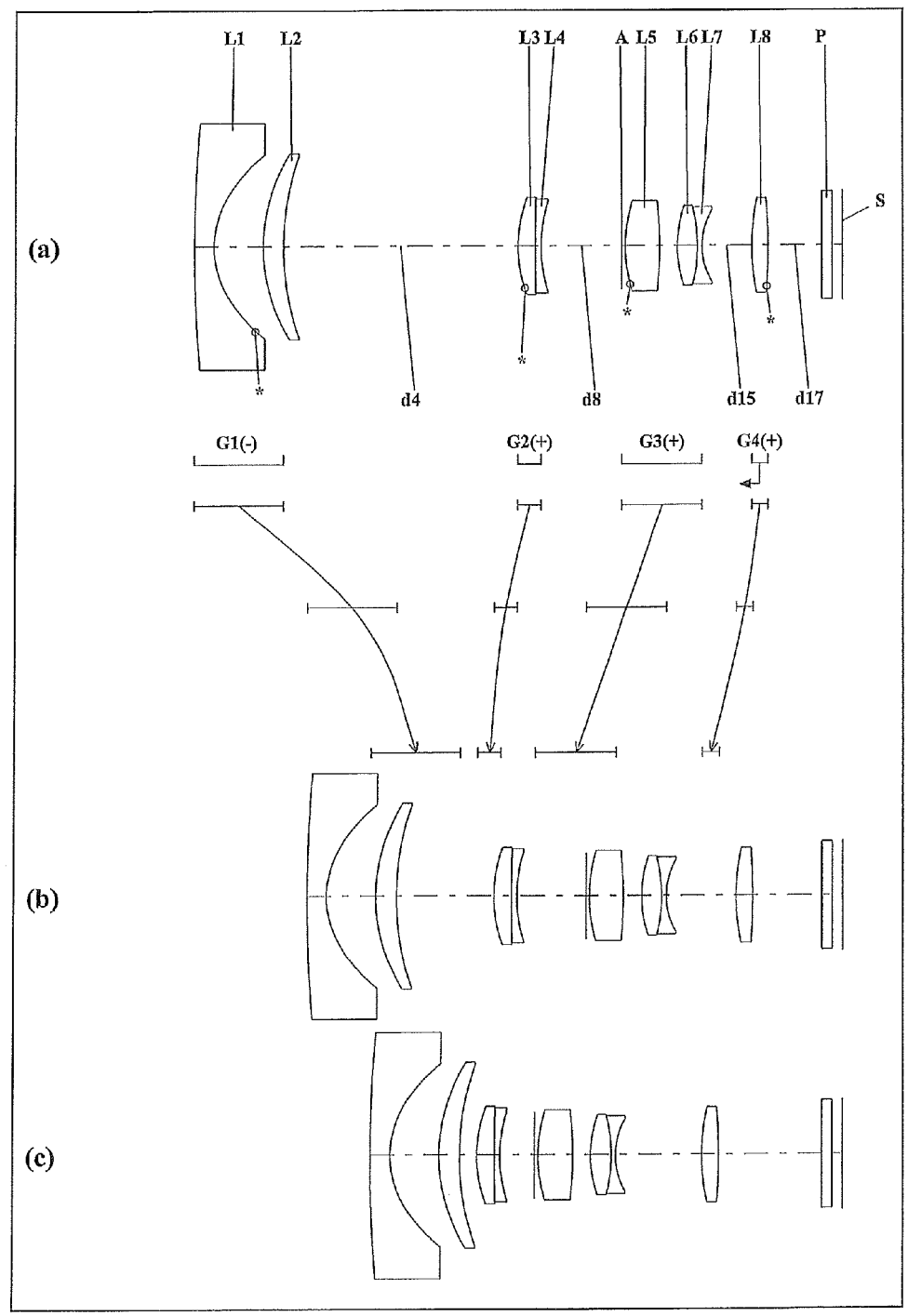
FIG. 31 is a lens arrangement diagram showing an infinity in-focus condition of a zoom lens system according to Embodiment 11 (Example 11).
Figure 32:
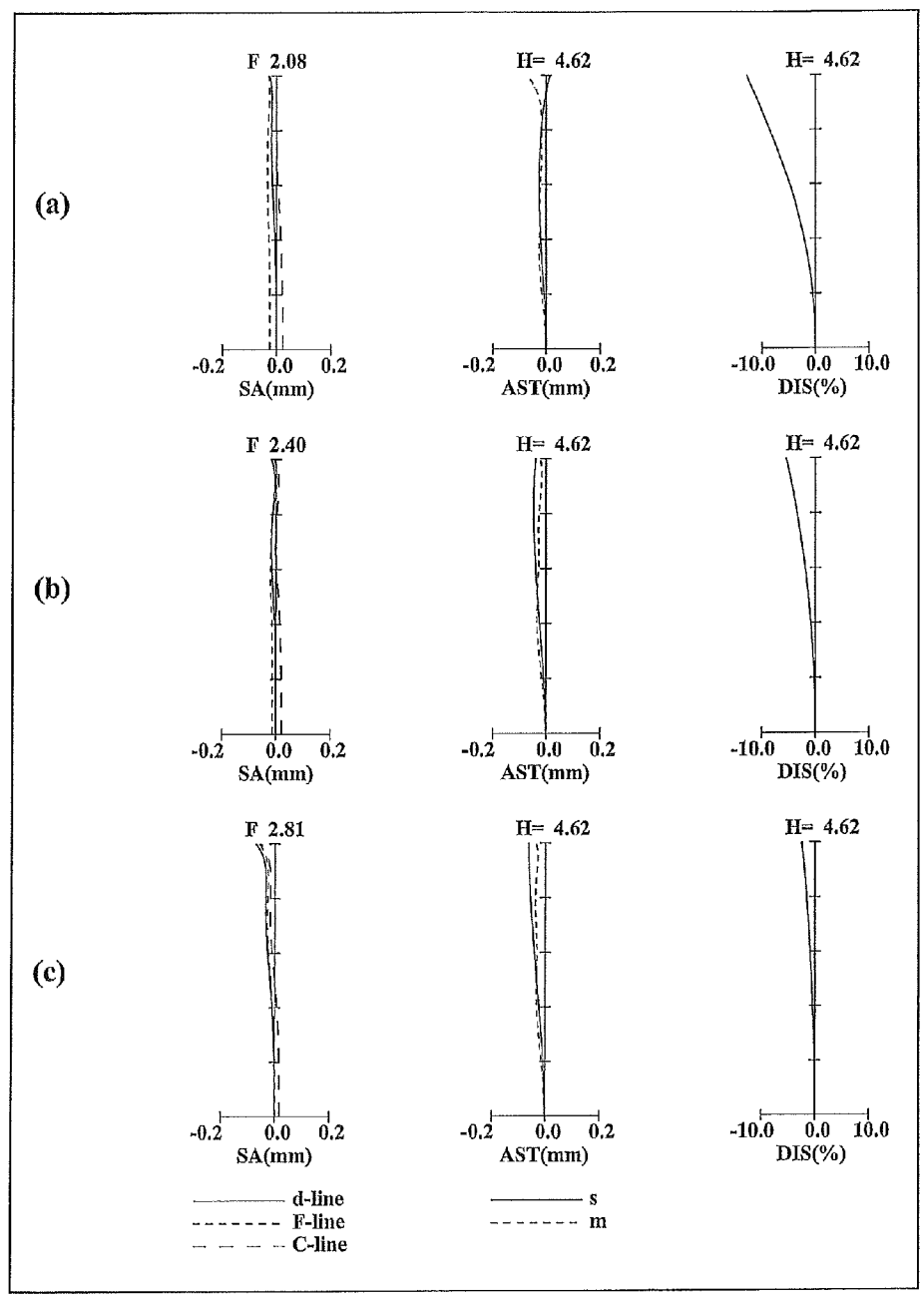
FIG. 32 is a longitudinal aberration diagram of an infinity in-focus condition of a zoom lens system according to Example 11.
Figure 33:
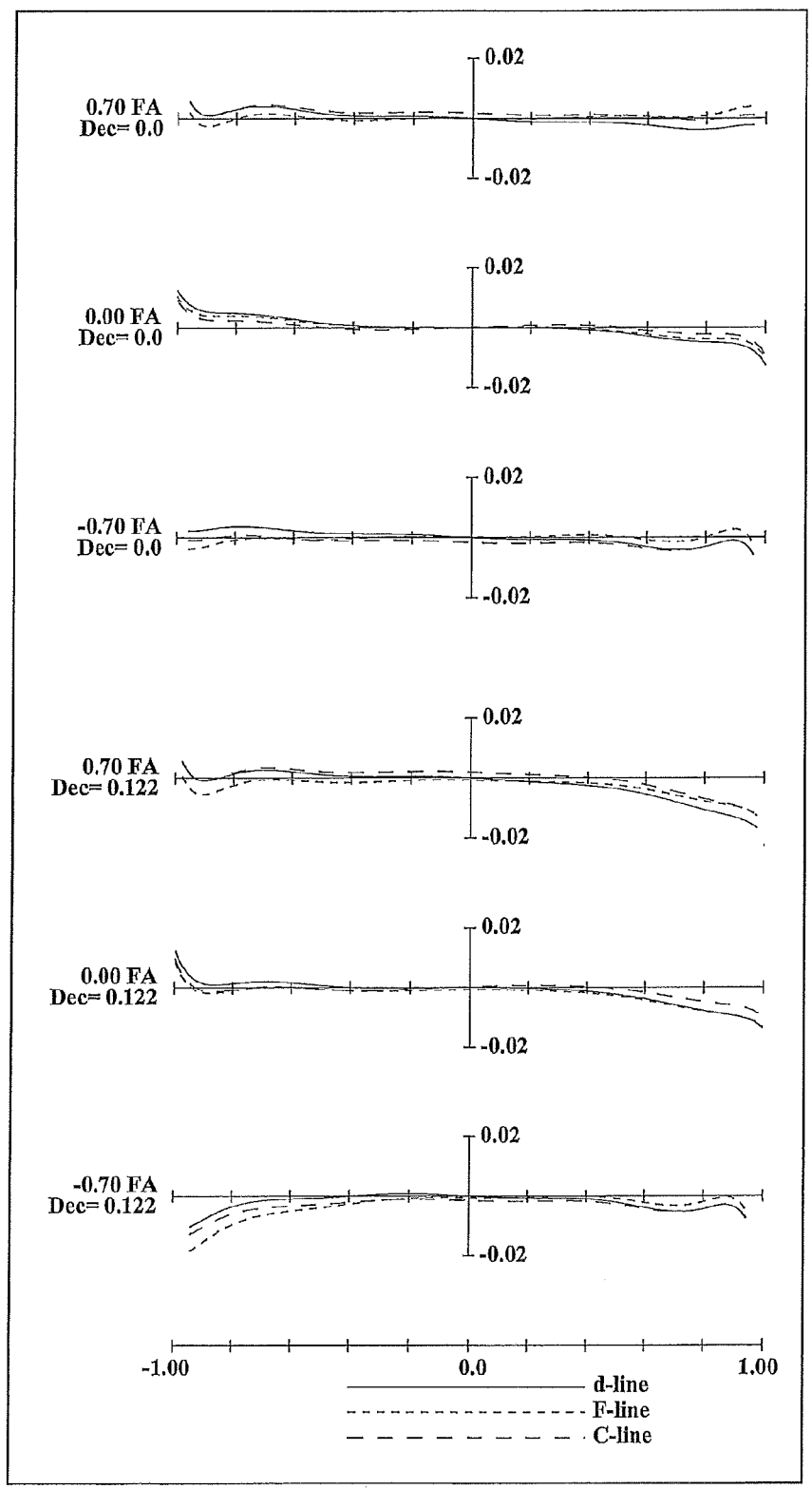
FIG. 33 is a lateral aberration diagram of a zoom lens system according to Example 11 at a telephoto limit in a basic state where image blur compensation is not performed and in a blur compensation state.

As shown in FIG. 31, in the zoom lens system according to Embodiment 11, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 11, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 11, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 11, the fourth lens unit G4 comprises solely a bi-convex eighth lens element L8. The eighth lens element L8 has an aspheric image side surface.

In the zoom lens system according to Embodiment 11, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Particularly, in the zoom lens systems according to Embodiments 1 to 11, the first lens unit G1, in order from the object side to the image side, comprises: a first lens element L1 having negative optical power; and a second lens element L2 having positive optical power. Therefore, various aberrations, particularly distortion at a wide-angle limit, can be favorably compensated, and still a short overall optical length (overall length of lens system) can be achieved.

In the zoom lens systems according to Embodiments 1 to 11, the first lens unit G1 includes at least one lens element having an aspheric surface. Therefore, aberrations, particularly distortion at a wide-angle limit, can be compensated more favorably.

For example, in a zoom lens system having any of basic configurations I to III, described later, the third lens unit G3 comprises a plurality of lens elements. The third lens unit G3 is composed of a small number of, two, lens elements in the zoom lens systems according to Embodiments 1 to 3, and is composed of a small number of, three, lens elements in the zoom lens systems according to Embodiments 4 to 11, resulting in a lens system having a short overall optical length (overall length of lens system). In the zoom lens system having any of the basic configurations I to III, there is no limitation of the number of lens elements constituting the third lens unit G3. However, in consideration of reduction of overall optical length (overall length of lens system), it is still preferable that the third lens unit G3 is composed of two or three lens elements like in the zoom lens systems according to Embodiments 1 to 11.

In the zoom lens systems according to Embodiments 1 to 11, the fourth lens unit G4 is composed of a single lens element. Therefore, the total number of lens elements is reduced, resulting in a lens system having a short overall optical length (overall length of lens system). Further, since the single lens element constituting the fourth lens unit G4 has an aspheric surface, aberrations can be compensated more favorably.

In the zoom lens systems according to Embodiments 1 to 2, the second lens unit G2, which is positioned just on the image side of the aperture diaphragm A, is composed of three lens elements including one cemented lens element. Therefore, the thickness of the second lens unit G2 is reduced, resulting in a lens system having a short overall optical length (overall length of lens system). Further, in the zoom lens systems according to Embodiments 3 to 11, the third lens unit G3, which is positioned just on the image side of the aperture diaphragm A, is composed of two single lens elements, or alternatively three lens elements including one cemented lens element. Therefore, the thickness of the third lens unit G3 is reduced, resulting in a lens system having a short overall optical length (overall length of lens system).

In the zoom lens systems according to Embodiments 1 to 11, in zooming from a wide-angle limit to a telephoto limit at the time of image taking, the first lens unit G1, the second lens unit G2, the third lens unit G3 and the fourth lens unit G4 move individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis, so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis. Thus, image blur can be compensated in a state that size increase in the entire zoom lens system is suppressed and thereby a compact construction is realized and that excellent imaging characteristics such as small decentering coma aberration and small decentering astigmatism are maintained.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for conditions preferred to be satisfied by a zoom lens system like the zoom lens systems according to Embodiments 1 to 11. Here, a plurality of preferable conditions is set forth for the zoom lens system according to each embodiment. A construction that satisfies all the plural conditions is most desirable for the zoom lens system. However, when an individual condition is satisfied, a zoom lens system having the corresponding effect is obtained.

In a zoom lens system like the zoom lens systems according to Embodiments 1 to 11, in order from the object side to the image side, comprising a first lens unit having negative optical power, a second lens unit having positive optical power, a third lens unit having positive optical power, and a fourth lens unit having positive optical power, wherein, in zooming, the intervals between the respective lens units vary, and the third lens unit comprises a plurality of lens elements (this lens configuration is referred to as basic configuration I of the embodiment, hereinafter), the following condition (I-1) is satisfied.

$$0.47 < |f_{31}/f_{G3}| < 1.00 \tag{I-1}$$

(here, $f_T/f_W > 2.0$)

where, $f_{31}$ is a focal length of a most object side lens element in the third lens unit, $f_{G3}$ is a focal length of the third lens unit, $f_T$ is a focal length of the entire system at a telephoto limit, and $f_W$ is a focal length of the entire system at a wide-angle limit.

The condition (I-1) suitably sets forth the focal length of the most object side lens element in the third lens unit. When the value exceeds the upper limit of the condition (I-1), the focal length of the most object side lens element in the third lens unit becomes excessively long. As a result, most of the positive optical power derived from the third lens unit is occupied on the most object side in the third lens unit. Therefore, balance of compensation of aberrations in the third lens unit becomes low, resulting in impossibility of achievement of optical performance. On the other hand, when the value goes below the lower limit of the condition (I-1), the focal length of the most object side lens element in the third lens unit becomes excessively short. As a result, it becomes impossible for other lens elements constituting the third lens unit to compensate spherical aberration, particularly spherical aberration at a telephoto limit, that occurs in the third lens unit.

When at least one of the following conditions (I-1)' and (I-1)" is satisfied, the above-mentioned effect is achieved more successfully.

$$0.50 < |f_{31}/f_{G3}| \tag{I-1)'}$$

$$0.60 < |f_{31}/f_{G3}| \tag{I-1)''}$$

(here, $f_T/f_W > 2.0$)

In a zoom lens system like the zoom lens systems according to Embodiments 1 to 11, in order from the object side to the image side, comprising a first lens unit having negative optical power, a second lens unit having positive optical power, a third lens unit having positive optical power, and a fourth lens unit having positive optical power, wherein, in zooming, at least the fourth lens unit moves in a direction along an optical axis such that the intervals between the respective lens units vary, and the third lens unit comprises a plurality of lens elements (this lens configuration is referred to as basic configuration II of the embodiment, hereinafter), the following condition (II-1) is satisfied.

$$2.0 < |f_{G3}/f_W| < 5.0 \tag{II-1}$$

(here, $f_T/f_W > 2.0$)

where, $f_{G3}$ is a focal length of the third lens unit, $f_T$ is a focal length of the entire system at a telephoto limit, and $f_W$ is a focal length of the entire system at a wide-angle limit.

The condition (II-1) sets forth the focal length of the third lens unit. When the value exceeds the upper limit of the condition (II-1), the focal length of the third lens unit becomes excessively long, resulting in increase of the amount of movement of the third lens unit during zooming. As a result, it becomes impossible to achieve a compact zoom lens system. On the other hand, when the value goes below the lower limit of the condition (II-1), the focal length of the third lens unit becomes excessively short. As a result, it becomes impossible for other lens units to compensate spherical aberration that occurs in the third lens unit.

When at least one of the following conditions (II-1)' and (II-1)" is satisfied, the above-mentioned effect is achieved more successfully.

$$2.5 < |f_{G3}/f_W| \qquad (II-1)'$$

$$|f_{G3}/f_W| < 4.0 \qquad (II-1)''$$

(here, $f_T/f_W > 2.0$)

In a zoom lens system like the zoom lens systems according to Embodiments 1 to 11, in order from the object side to the image side, comprising a first lens unit having negative optical power, a second lens unit having positive optical power, a third lens unit having positive optical power, and a fourth lens unit having positive optical power, wherein, in zooming, at least the fourth lens unit moves in a direction along an optical axis such that the intervals between the respective lens units vary, and the third lens unit comprises a plurality of lens elements (this lens configuration is referred to as basic configuration III of the embodiment, hereinafter), the following condition (III-1) is satisfied.

$$|\beta_{3W}| < 1.0 \qquad (III-1)$$

(here, $f_T/f_W > 2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

The condition (III-1) sets forth the lateral magnification of the third lens unit at a wide-angle limit. This is a condition relating to the optical power and the decentering error sensitivity of the third lens unit. When the value exceeds the upper limit of the condition (III-1), the lateral magnification of the third lens unit at a wide-angle limit excessively increases, resulting in difficulty in fundamental zooming. As a result, it becomes difficult to construct a zoom lens system itself. On the other hand, when the value goes below the lower limit of the condition (III-1), the lateral magnification of the third lens unit at a wide-angle limit excessively decreases, resulting in increase of the decentering error sensitivity. This situation is undesirable because adjustment for assembling becomes difficult.

Like the zoom lens systems according to Embodiments 1 to 11,
in a zoom lens system having the basic configuration II or the basic configuration III, or alternatively
in a zoom lens system, in order from the object side to the image side, comprising a first lens unit having negative optical power, a second lens unit having positive optical power, a third lens unit having positive optical power, and a fourth lens unit having positive optical power, wherein, in zooming, all the first lens unit, the second lens unit, the third lens unit, and the fourth lens unit move in a direction along an optical axis such that the intervals between the respective lens units vary, and an aperture diaphragm is provided between the second lens unit and the third lens unit (this lens configuration is referred to as basic configuration IV of the embodiment, hereinafter), it is preferable that the following condition (3A) is satisfied.

$$0.07 < |D_{G4}/f_{G4}| < 0.25 \qquad (3A)$$

(here, $f_T/f_W > 2.0$)
where,
$D_{G4}$ is an amount of movement of the fourth lens unit in the direction along the optical axis during zooming,
$f_{G4}$ is a focal length of the fourth lens unit,
$f_T$ is a focal length of the entire system at a telephoto limit, and
$f_W$ is a focal length of the entire system at a wide-angle limit.

The condition (3A) sets forth the amount of movement of the fourth lens unit. When the value exceeds the upper limit of the condition (3A), the amount of movement of the fourth lens unit becomes excessively great, resulting in difficulty in achieving a compact zoom lens system. On the other hand, when the value goes below the lower limit of the condition (3A), the amount of movement of the fourth lens unit becomes excessively small, resulting in difficulty in compensating aberrations that vary during zooming. Thus, this situation is undesirable.

In a zoom lens system having any of the basic configurations I to IV like the zoom lens systems according to Embodiments 1 to 11, it is preferable that the following condition (4A) is satisfied.

$$1.5 < f_{G4}/f_W < 10.0 \qquad (4A)$$

(here, $f_T/f_W > 2.0$)
where,
$f_{G4}$ is a focal length of the fourth lens unit,
$f_T$ is a focal length of the entire system at a telephoto limit, and
$f_W$ is a focal length of the entire system at a wide-angle limit.

The condition (4A) sets forth the focal length of the fourth lens unit. When the value exceeds the upper limit of the condition (4A), the focal length of the fourth lens unit becomes excessively long, resulting in difficulty in securing peripheral illuminance on the image surface. On the other hand, when the value goes below the lower limit of the condition (4A), the focal length of the fourth lens unit becomes excessively short, resulting in difficulty in compensating aberrations, particularly spherical aberration, that occur in the fourth lens unit.

When the following condition (4A)' is satisfied, the above-mentioned effect is achieved more successfully.

$$f_{G4}/f_W < 7.5 \qquad (4A)'$$

(here, $f_T/f_W > 2.0$)

In a zoom lens system having any of the basic configurations I to IV like the zoom lens systems according to Embodiments 1 to 11, it is preferable that the following condition (5A) is satisfied.

$$|\beta_{4W}| < 1.5 \qquad (5A)$$

(here, $f_T/f_W > 2.0$)
where,
$\beta_{4W}$ is a lateral magnification of the fourth lens unit at a wide-angle limit,
$f_T$ is a focal length of the entire system at a telephoto limit, and
$f_W$ is a focal length of the entire system at a wide-angle limit.

The condition (5A) sets forth the lateral magnification of the fourth lens unit at a wide-angle limit. This is a condition relating to the back focal length. When the condition (5A) is not satisfied, since the lateral magnification of the fourth lens unit arranged closest to the image side increases, the back focal length becomes excessively long, resulting in difficulty in achieving a compact zoom lens system.

When at least one of the following conditions (5A)' and (5A)" is satisfied, the above-mentioned effect is achieved more successfully.

$$|\beta_{4W}|<1.0 \tag{5A}'$$

$$|\beta_{4W}|<0.8 \tag{5A}''$$

(here, $f_T/f_W>2.0$)

In a zoom lens system having any of the basic configurations I to IV like the zoom lens systems according to Embodiments 1 to 11, wherein, the first lens unit comprises two lens elements including, in order from the object side to the image side, a first lens element having negative optical power and a second lens element having positive optical power, it is preferable that the following condition (6A) is satisfied.

$$0.5<f_{L1}/f_{G1}<0.8 \tag{6A}$$

where,
$f_{L1}$ is a focal length of the first lens element, and
$f_{G1}$ is a focal length of the first lens unit.

The condition (6A) sets forth the focal length of the first lens element in the first lens unit. When the value exceeds the upper limit of the condition (6A), the focal length of the first lens element becomes excessively long, resulting in difficulty in compensating, particularly, distortion at a wide-angle limit. In addition, the amount of movement of the first lens unit during zooming also increases, resulting in difficulty in achieving a compact zoom lens system. On the other hand, when the value goes below the lower limit of the condition (6A), the focal length of the first lens element becomes excessively short, resulting in difficulty in compensating, particularly, distortion at a wide-angle limit.

When the following condition (6A)' is satisfied, the above-mentioned effect is achieved more successfully.

$$f_{L1}/f_{G1}<0.67 \tag{6A}'$$

In a zoom lens system having any of the basic configurations I to IV like the zoom lens systems according to Embodiments 1 to 11, wherein, the first lens unit comprises two lens elements including, in order from the object side to the image side, a first lens element having negative optical power and a second lens element having positive optical power, it is preferable that the following condition (7A) is satisfied.

$$1.5<|f_{L2}/f_{G1}|<4.0 \tag{7A}$$

where,
$f_{L2}$ is a focal length of the second lens element, and
$f_{G1}$ is a focal length of the first lens unit.

The condition (7A) sets forth the focal length of the second lens element in the first lens unit. When the value exceeds the upper limit of the condition (7A), the focal length of the second lens element becomes excessively long, resulting in difficulty in compensating, particularly, distortion at a wide-angle limit. In addition, the amount of movement of the first lens unit during zooming also increases, resulting in difficulty in achieving a compact zoom lens system. On the other hand, when the value goes below the lower limit of the condition (7A), the focal length of the second lens element becomes excessively short, resulting in difficulty in compensating, particularly, distortion at a wide-angle limit.

When the following condition (7A)' is satisfied, the above-mentioned effect is achieved more successfully.

$$2.4<|f_{L2}/f_{G1}| \tag{7A}'$$

In a zoom lens system having any of the basic configurations I to IV like the zoom lens systems according to Embodiments 1 to 11, wherein, the first lens unit comprises two lens elements including, in order from the object side to the image side, a first lens element having negative optical power and a second lens element having positive optical power, it is preferable that the following condition (8A) is satisfied.

$$0.15<|f_{L1}/f_{L2}|<4.00 \tag{8A}$$

where,
$f_{L1}$ is a focal length of the first lens element, and
$f_{L2}$ is a focal length of the second lens element.

The condition (8A) sets forth the ratio between the focal lengths of the first lens element and the second lens element in the first lens unit. When the value exceeds the upper limit of the condition (8A), the focal length of the first lens element becomes excessively long relative to the focal length of the second lens element, resulting in difficulty in compensating, particularly, distortion at a wide-angle limit. In addition, the amount of movement of the first lens unit during zooming also increases, resulting in difficulty in achieving a compact zoom lens system. On the other hand, when the value goes below the lower limit of the condition (8A), the focal length of the second lens element becomes excessively long relative to the focal length of the first lens element, resulting in difficulty in compensating, particularly, distortion at a wide-angle limit.

When the following condition (8A)' is satisfied, the above-mentioned effect is achieved more successfully.

$$|f_{L1}/f_{L2}|<0.25 \tag{8A}'$$

Each of the lens units constituting the zoom lens system according to any of Embodiments 1 to 11 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 12

Figure 34:
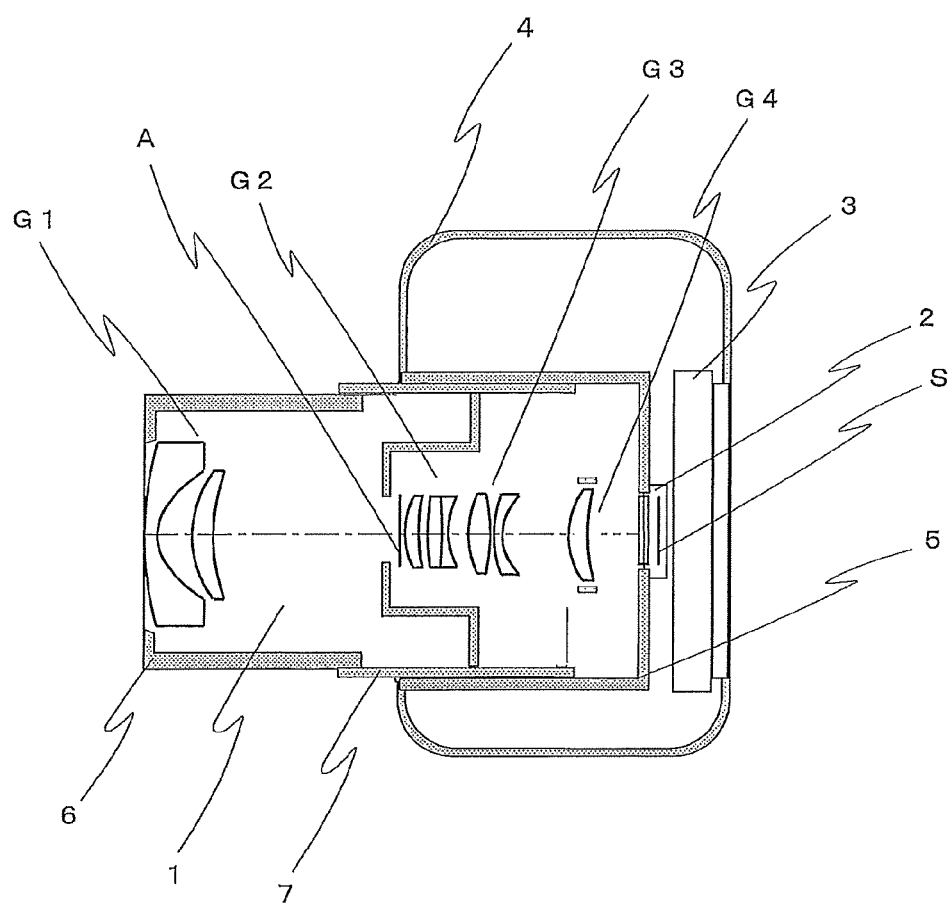
FIG. 34 is a schematic construction diagram of a digital still camera according to Embodiment 12.

FIG. 34 is a schematic construction diagram of a digital still camera according to Embodiment 12. In FIG. 34, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 34, the zoom lens system 1 comprises a first lens unit G1, an aperture diaphragm A, a second lens unit G2, a third lens unit G3, and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

A lens barrel comprises a main barrel 5, a moving barrel 6 and a cylindrical cam 7. When the cylindrical cam 7 is rotated, the first lens unit G1, the aperture diaphragm A and the second lens unit G2, the third lens unit G3, and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 34, any one of the zoom lens systems according to Embodiments 2 to 11 may be employed in place of the zoom lens system according to Embodiment 1. Further, the optical system of the digital still camera shown in FIG. 34 is applicable also to a digital video camera for moving images. In this case, moving images with high resolution can be acquired in addition to still images.

The digital still camera according to Embodiment 12 has been described for a case that the employed zoom lens system 1 is a zoom lens system according to any of Embodiments 1 to 11. However, in these zoom lens systems, the entire zooming range need not be used. That is, in accordance with a desired zooming range, a range where optical performance is secured may exclusively be used. Then, the zoom lens system may be used as one having a lower magnification than the zoom lens systems described in Embodiments 1 to 11.

Further, Embodiment 12 has been described for a case that the zoom lens system is applied to a lens barrel of so-called barrel retraction construction. However, the present invention is not limited to this. For example, the zoom lens system may be applied to a lens barrel of so-called bending construction where a prism having an internal reflective surface or a front surface reflective mirror is arranged at an arbitrary position within the first lens unit G1 or the like. Further, in Embodiment 12, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of retraction.

Further, an imaging device comprising a zoom lens system according to any of Embodiments 1 to 11 described above and an image sensor such as a CCD or a CMOS may be applied to a mobile telephone, a PDA (Personal Digital Assistance), a surveillance camera in a surveillance system, a Web camera, a vehicle-mounted camera or the like.

Embodiments 13 to 18

FIGS. 35, 38, 41, 44, 47 and 50 are lens arrangement diagrams of zoom lens systems according to Embodiments 13 to 18, respectively.

Each of FIGS. 35, 38, 41, 44, 47 and 50 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having negative optical power; a second lens unit G2 having positive optical power; a third lens unit G3 having positive optical power; and a fourth lens unit having positive optical power. Then, in zooming, the individual lens units move in a direction along the optical axis such that intervals between the lens units, that is, the interval between the first lens unit and the second lens unit, the interval between the second lens unit and the third lens unit, and the interval between the third lens unit and the fourth lens unit should all vary. In the zoom lens system according to each embodiment, since these lens units are arranged in the desired optical power configuration, high optical performance is maintained and still size reduction is achieved in the entire lens system.

Further, in FIGS. 35, 38, 41, 44, 47 and 50, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P equivalent to an optical low-pass filter or a face plate of an image sensor is provided.

Further, in FIGS. 35, 38, 41, 44, 47 and 50, an aperture diaphragm A is provided on the object side relative to the third lens unit G3 (between the most image side lens surface of the second lens unit G2 and the most object side lens surface of the third lens unit G3). In zooming from a wide-angle limit to a telephoto limit at the time of image taking, the aperture diaphragm A moves along the optical axis integrally with the third lens unit G3.

Figure 35:
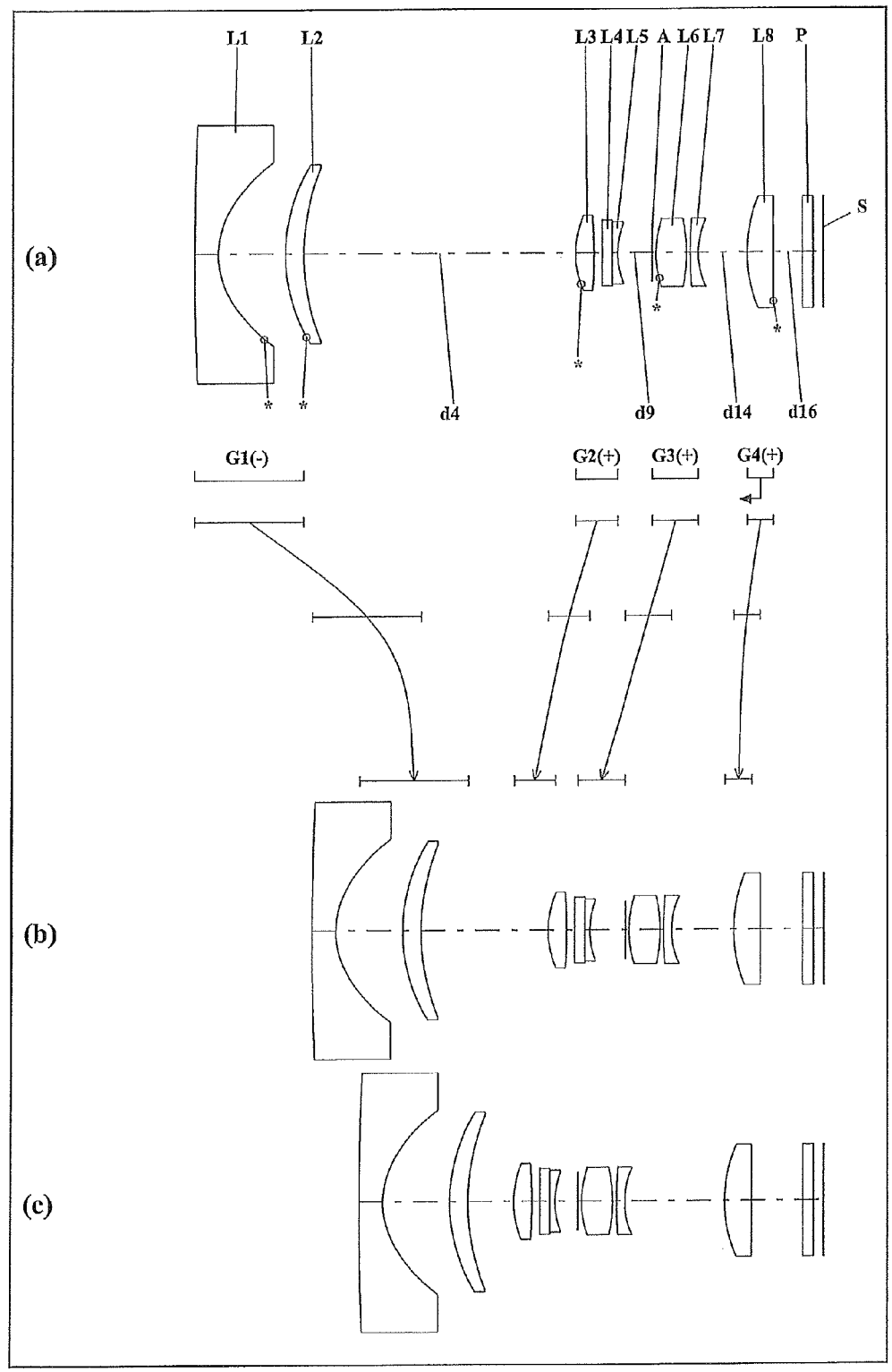
FIG. 35 is a lens arrangement diagram showing an infinity in-focus condition of a zoom lens system according to Embodiment 13 (Example 13).
Figure 36:
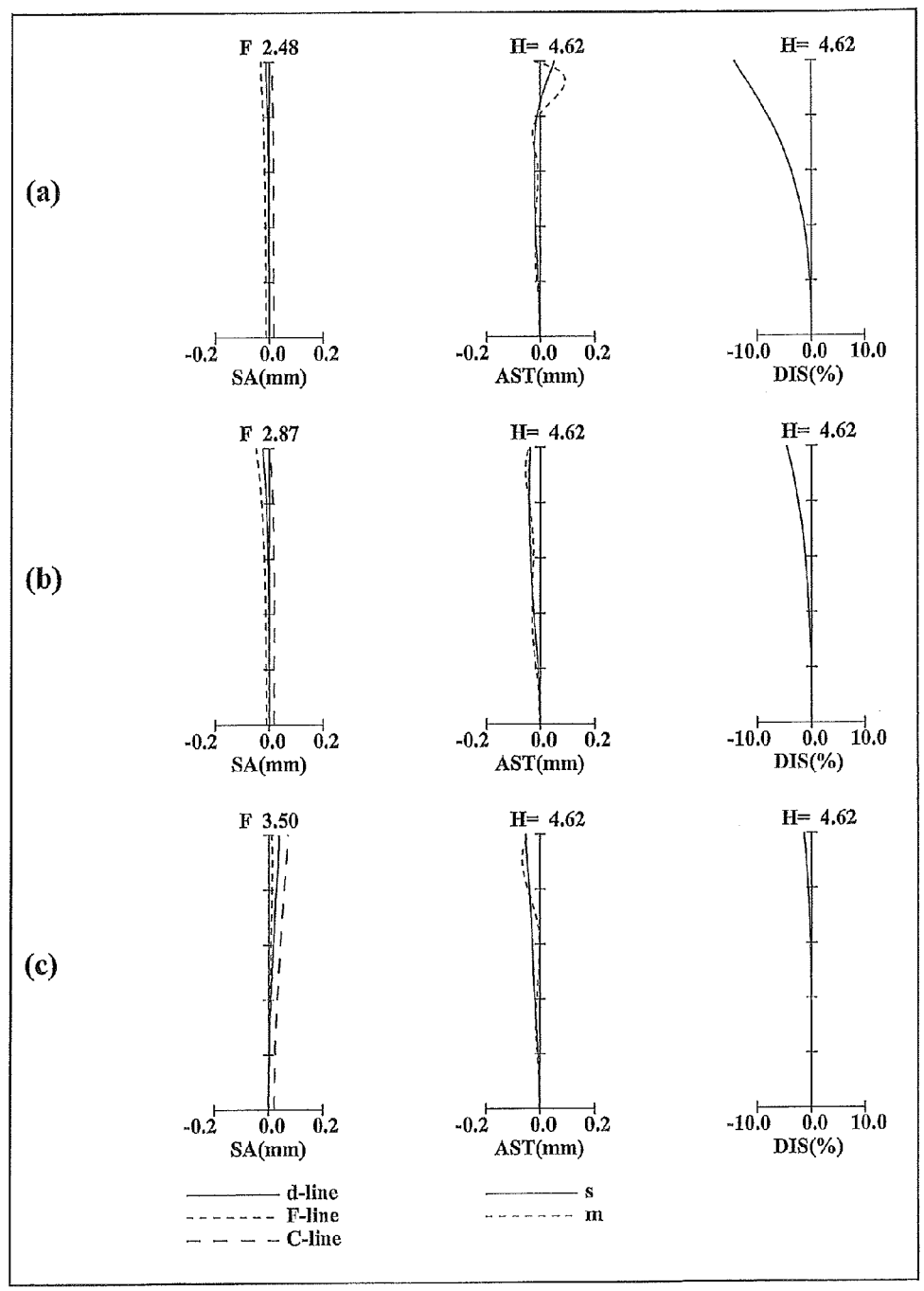
FIG. 36 is a longitudinal aberration diagram of an infinity in-focus condition of a zoom lens system according to Example 13.
Figure 37:
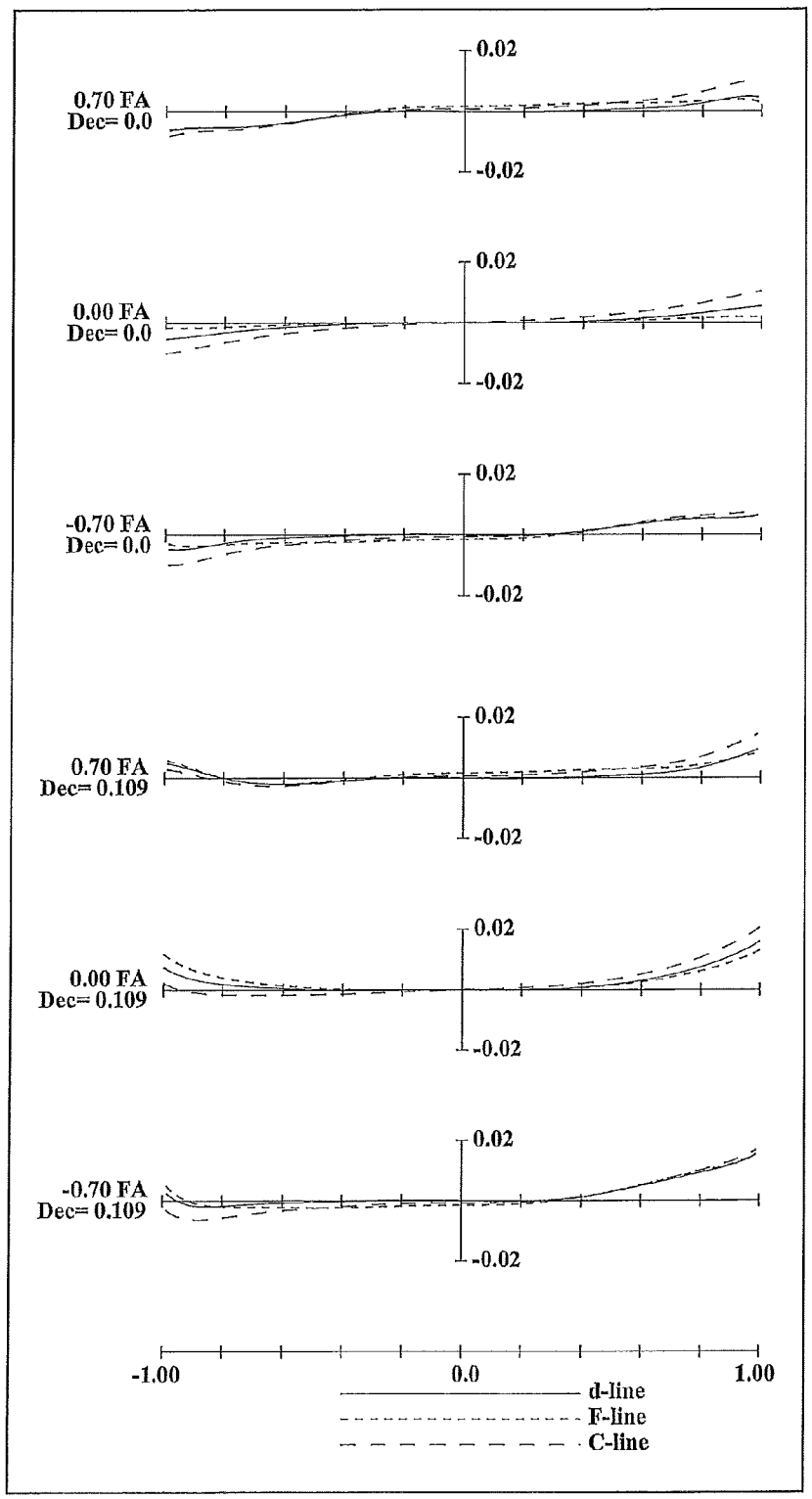
FIG. 37 is a lateral aberration diagram of a zoom lens system according to Example 13 at a telephoto limit in a basic state where image blur compensation is not performed and in a blur compensation state.

As shown in FIG. 35, in the zoom lens system according to Embodiment 13, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface. The second lens element L2 has an aspheric object side surface.

In the zoom lens system according to Embodiment 13, the second lens unit G2, in order from the object side to the image side, comprises: a bi-convex third lens element L3; a bi-concave fourth lens element L4; and a negative meniscus fifth lens element L5 with the convex surface facing the object side. Among these, the fourth lens element L4 and the fifth lens element L5 are cemented with each other. The third lens element L3 has an aspheric object side surface.

In the zoom lens system according to Embodiment 13, the third lens unit G3, in order from the object side to the image side, comprises: a bi-convex sixth lens element L6; and a negative meniscus seventh lens element L7 with the convex surface facing the object side. The sixth lens element L6 has an aspheric object side surface.

In the zoom lens system according to Embodiment 13, the fourth lens unit G4 comprises solely a bi-convex eighth lens element L8. The eighth lens element L8 has an aspheric image side surface.

In the zoom lens system according to Embodiment 13, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 38:
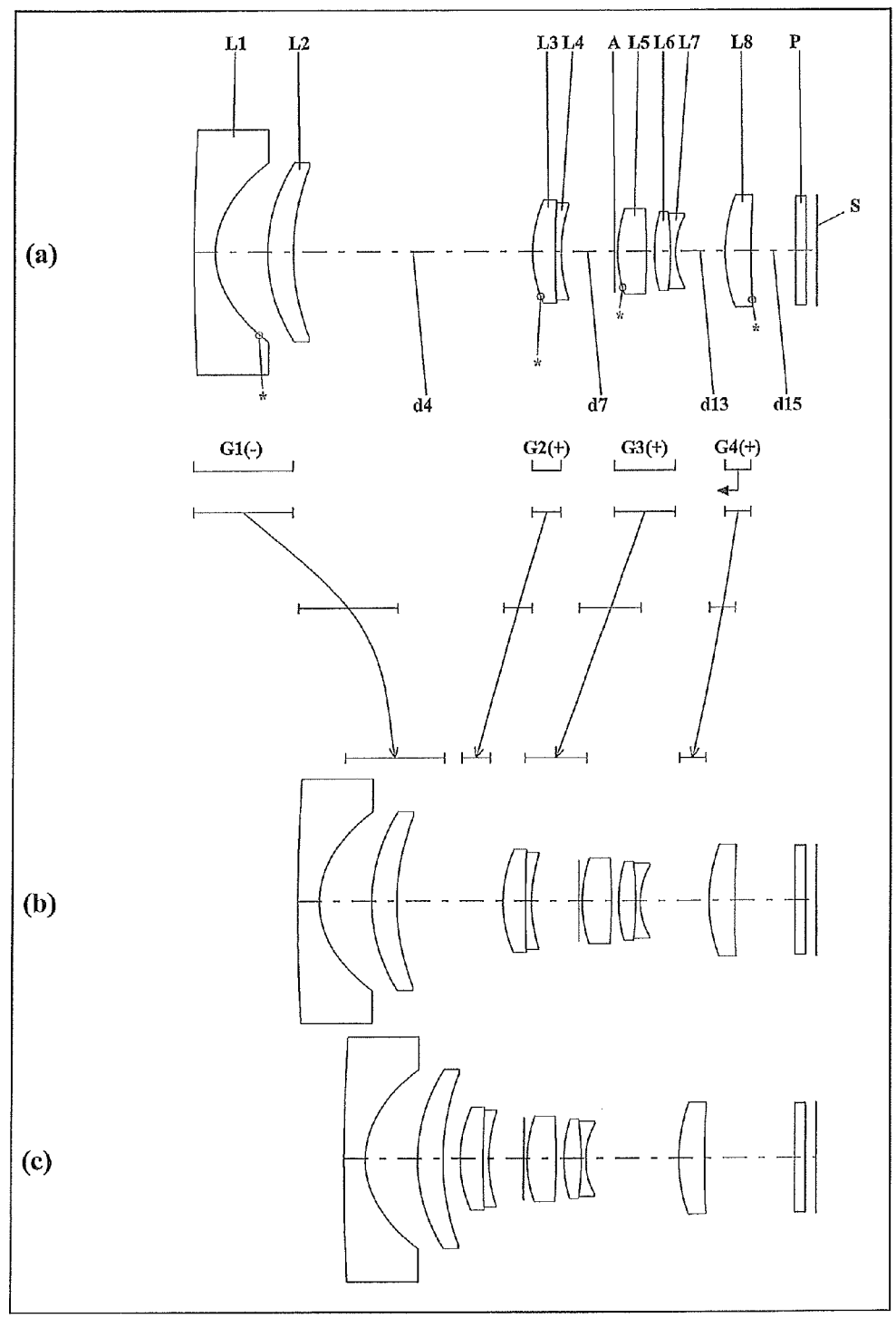
FIG. 38 is a lens arrangement diagram showing an infinity in-focus condition of a zoom lens system according to Embodiment 14 (Example 14).
Figure 39:
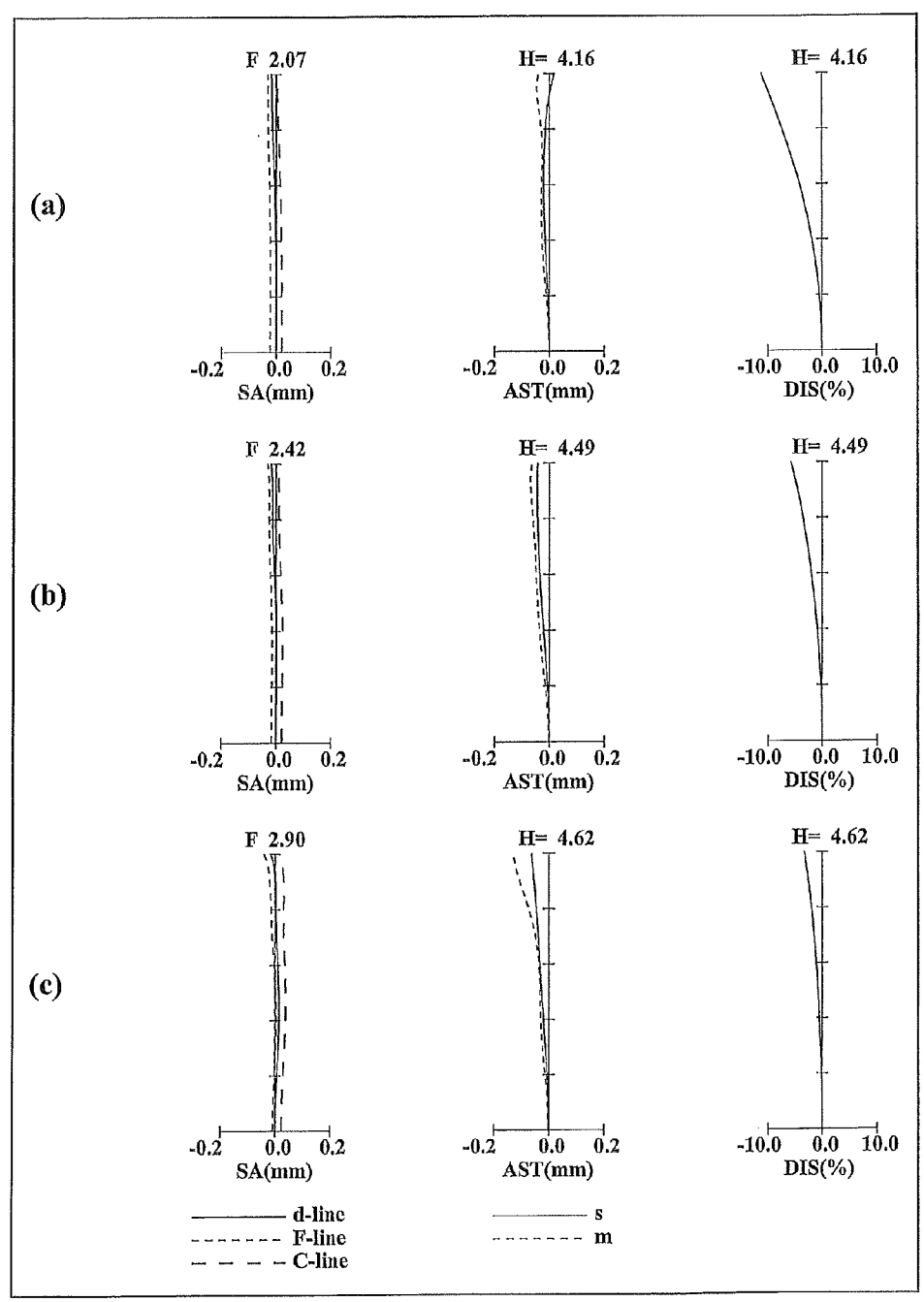
FIG. 39 is a longitudinal aberration diagram of an infinity in-focus condition of a zoom lens system according to Example 14.
Figure 40:
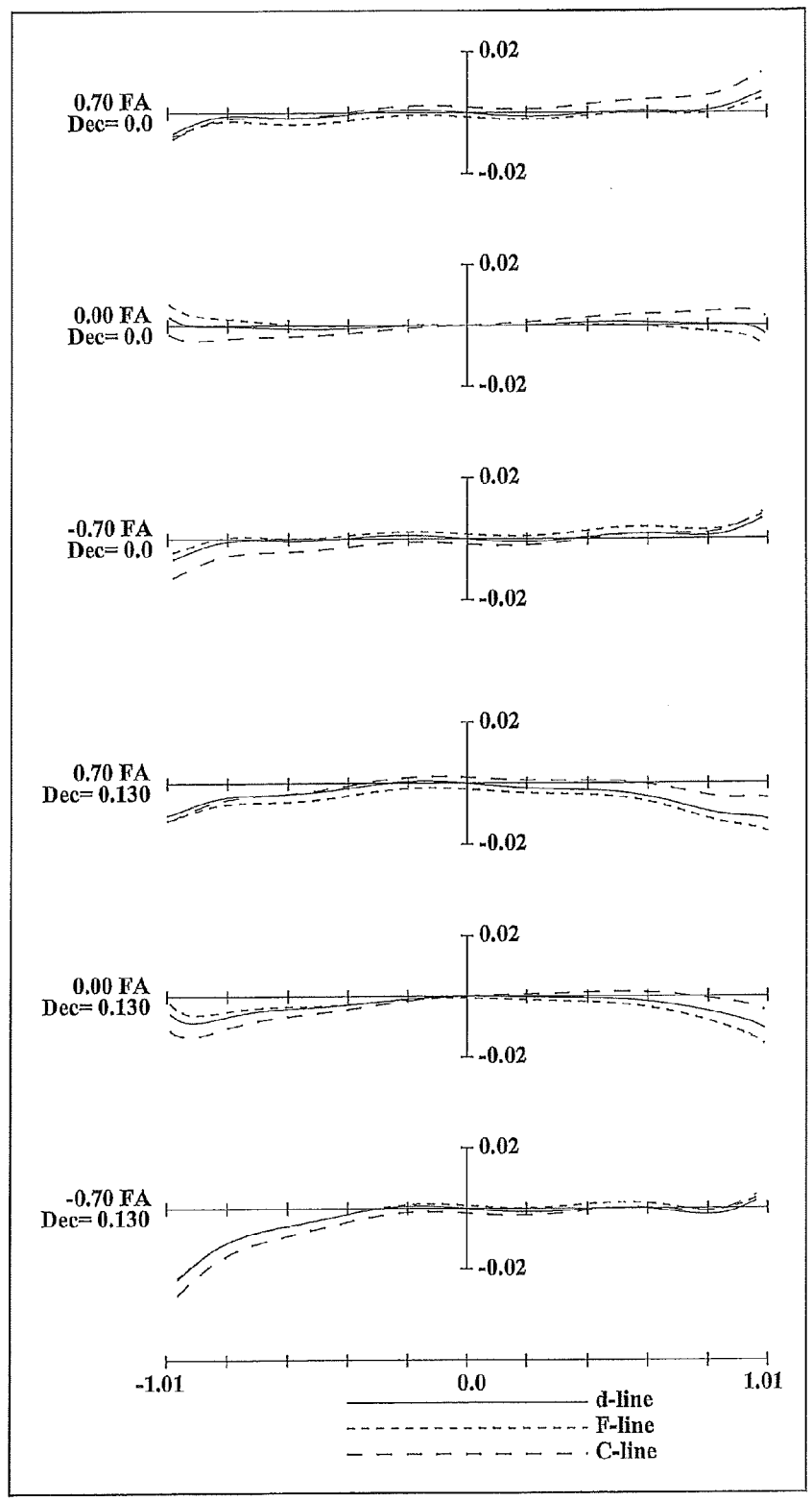
FIG. 40 is a lateral aberration diagram of a zoom lens system according to Example 14 at a telephoto limit in a basic state where image blur compensation is not performed and in a blur compensation state.

As shown in FIG. 38, in the zoom lens system according to Embodiment 14, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 14, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. The third lens element L3 has an aspheric object side surface.

In the zoom lens system according to Embodiment 14, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. The fifth lens element L5 has an aspheric object side surface.

In the zoom lens system according to Embodiment 14, the fourth lens unit G4 comprises solely a positive meniscus eighth lens element L8 with the convex surface facing the object side. The eighth lens element L8 has an aspheric image side surface.

In the zoom lens system according to Embodiment 14, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming, the individual lens units move along the optical axis such that the interval between the first lens unit G1 and the second lens unit G2 should decrease.

Figure 41:
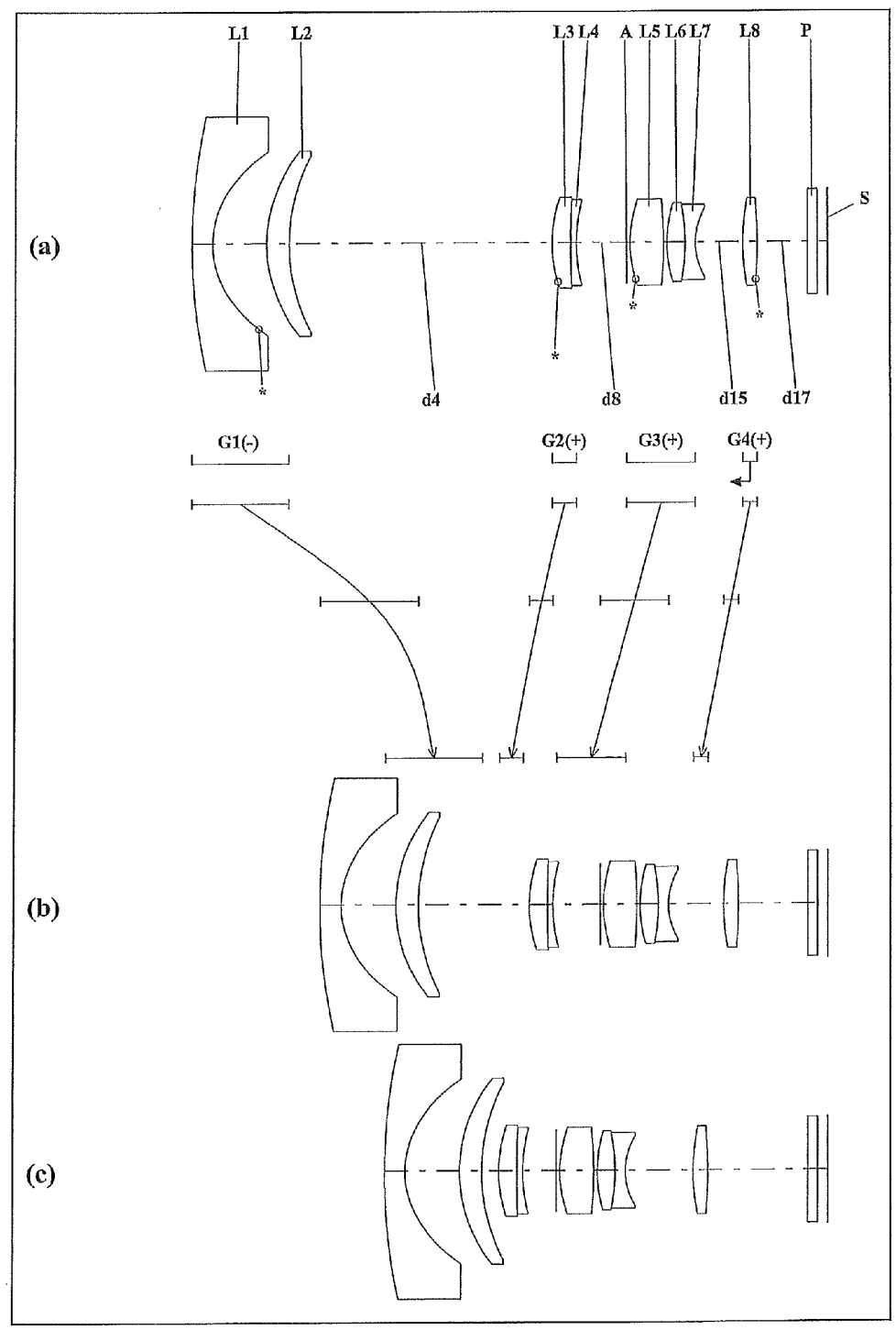
FIG. 41 is a lens arrangement diagram showing an infinity in-focus condition of a zoom lens system according to Embodiment 15 (Example 15).
Figure 42:
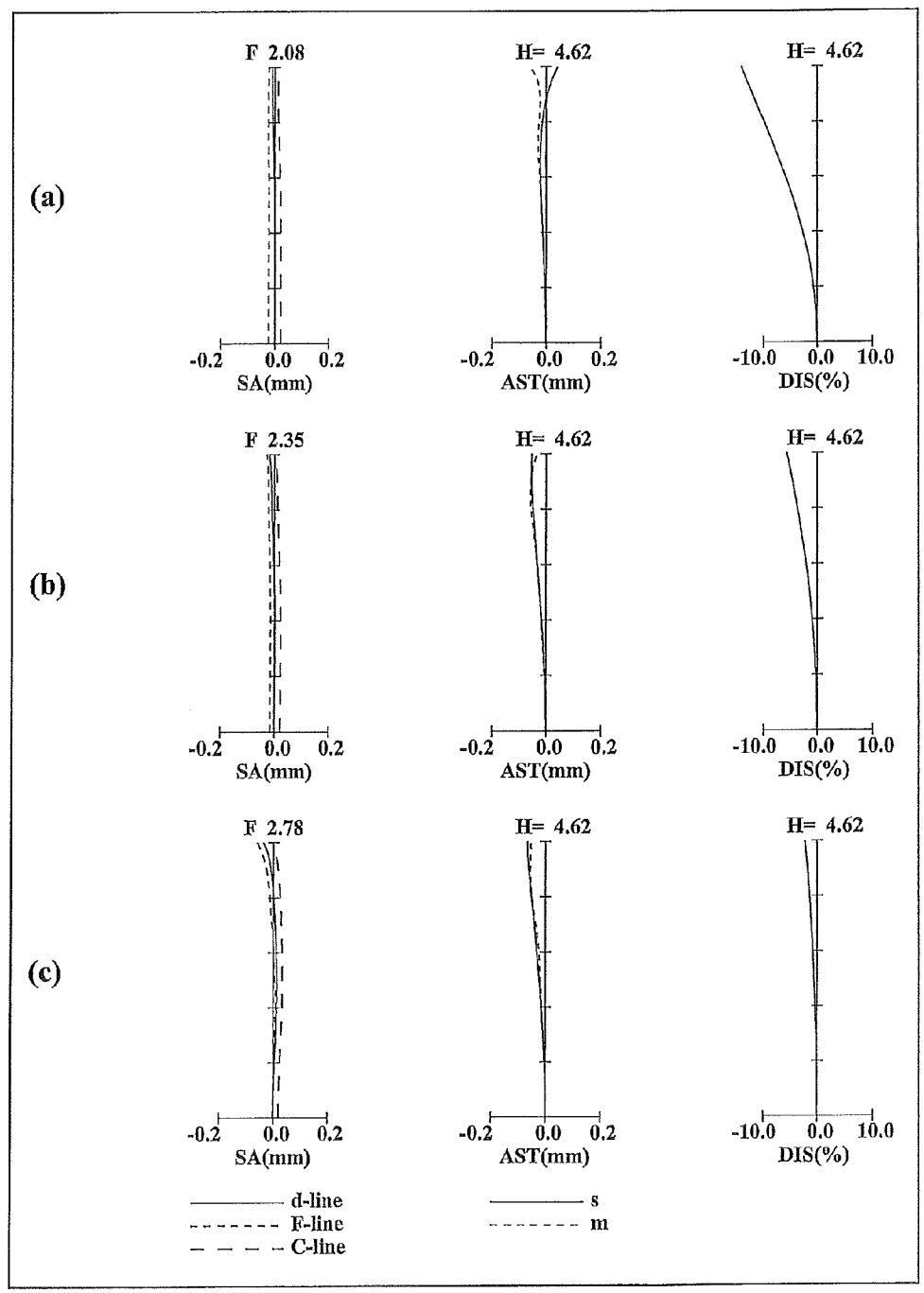
FIG. 42 is a longitudinal aberration diagram of an infinity in-focus condition of a zoom lens system according to Example 15.
Figure 43:
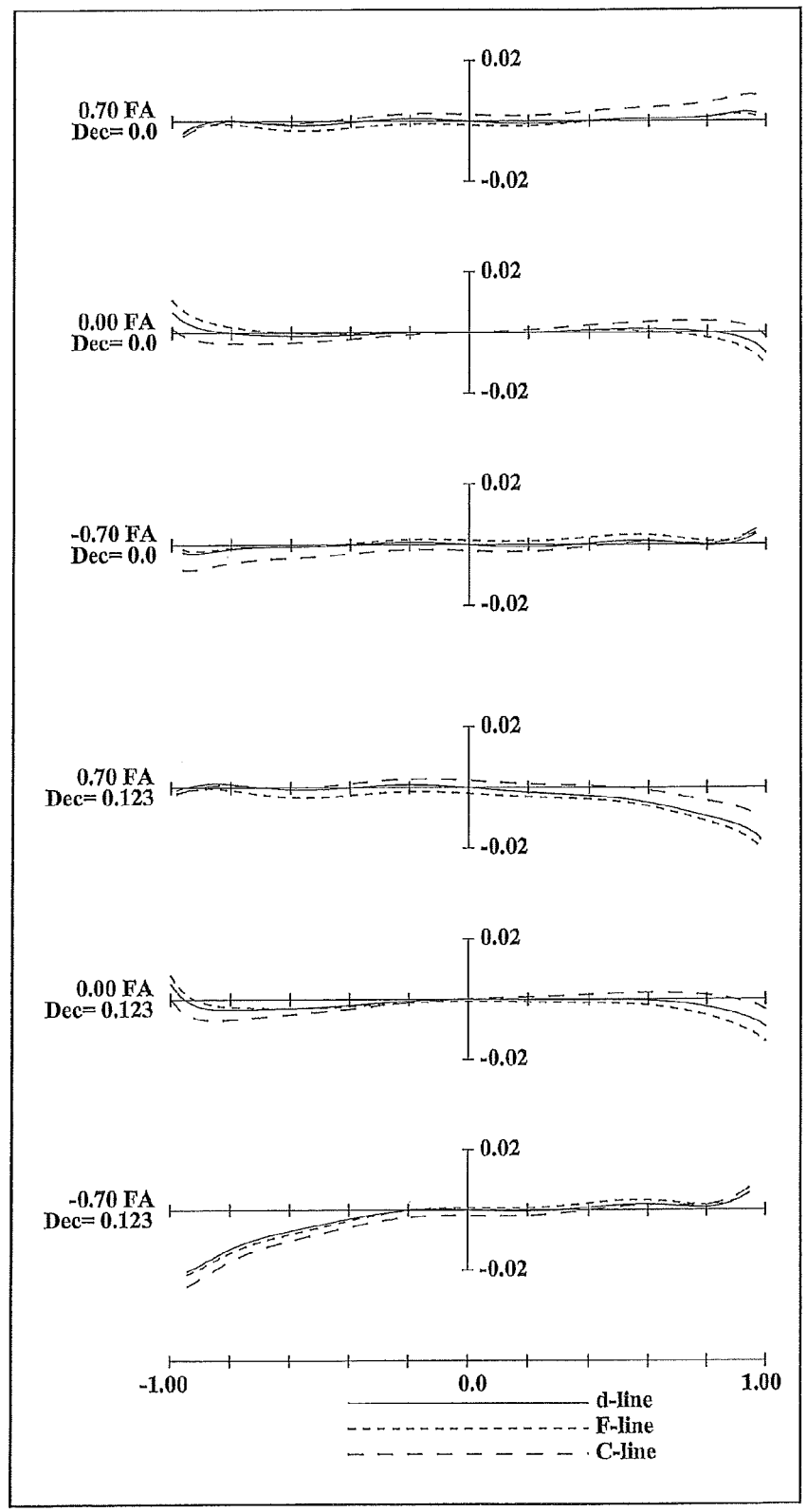
FIG. 43 is a lateral aberration diagram of a zoom lens system according to Example 15 at a telephoto limit in a basic state where image blur compensation is not performed and in a blur compensation state.

As shown in FIG. 41, in the zoom lens system according to Embodiment 15, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 15, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 15, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 15, the fourth lens unit G4 comprises solely a bi-convex eighth lens element L8. The eighth lens element L8 has an aspheric image side surface.

In the zoom lens system according to Embodiment 15, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 44:
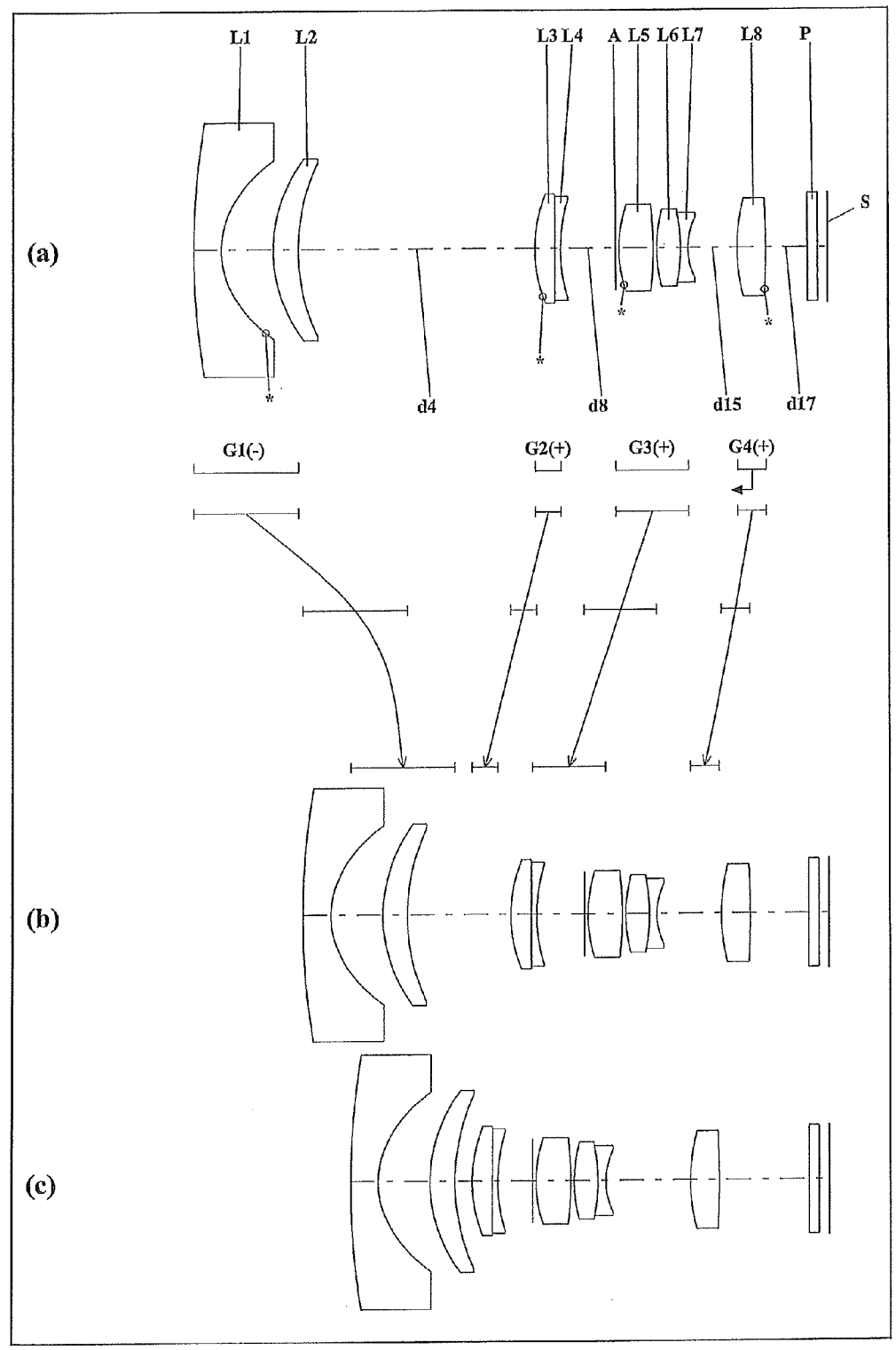
FIG. 44 is a lens arrangement diagram showing an infinity in-focus condition of a zoom lens system according to Embodiment 16 (Example 16).
Figure 45:
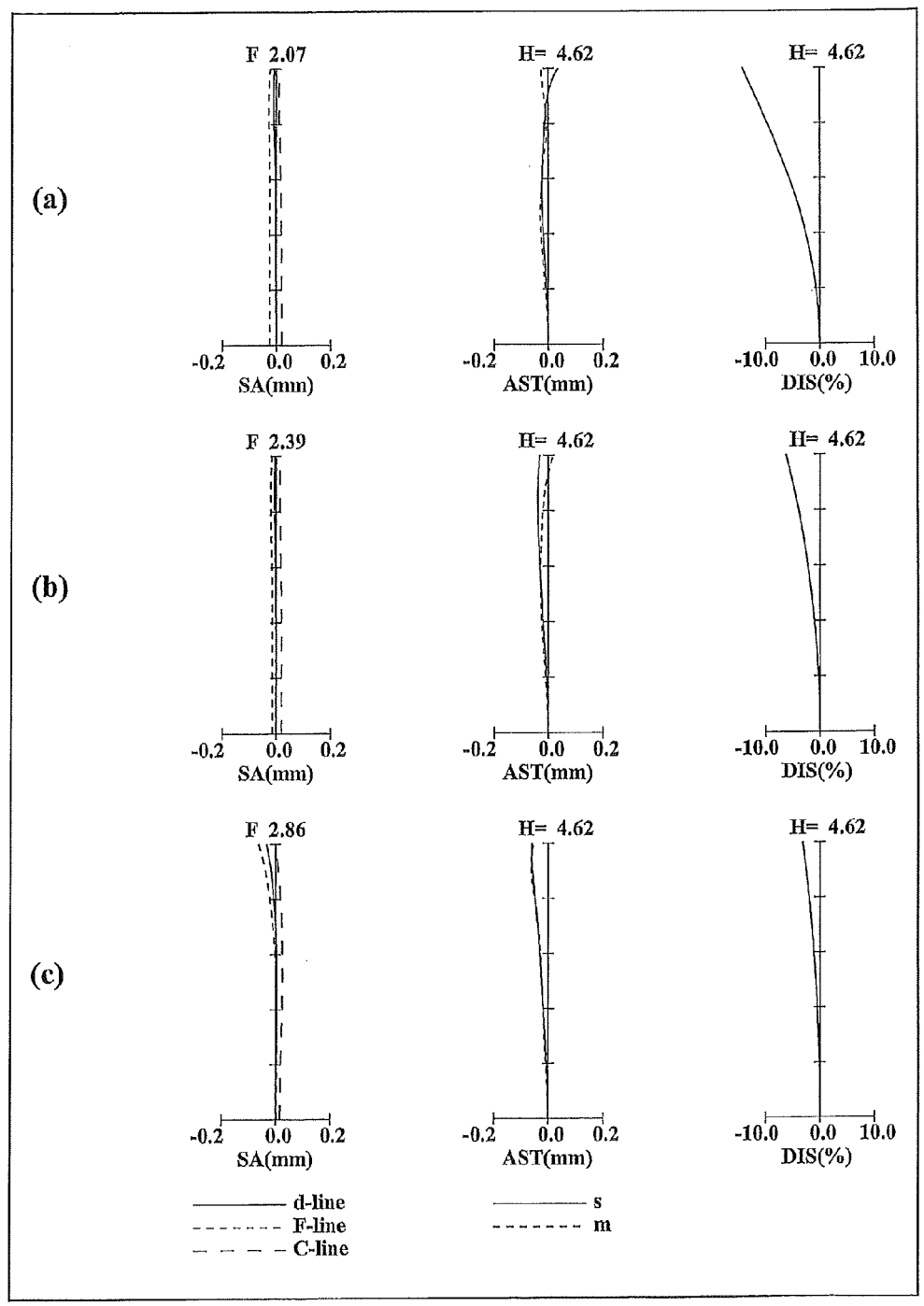
FIG. 45 is a longitudinal aberration diagram of an infinity in-focus condition of a zoom lens system according to Example 16.
Figure 46:
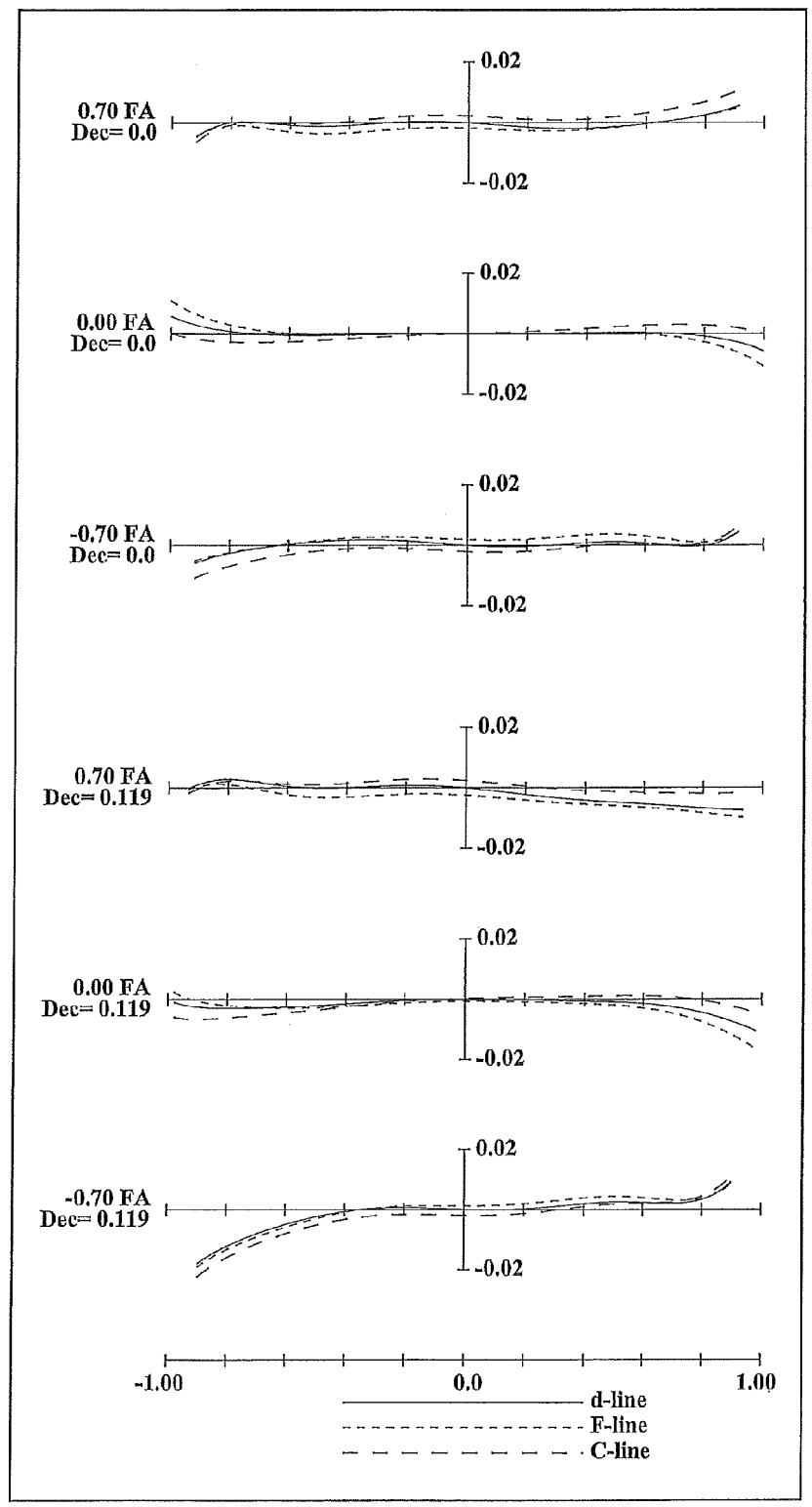
FIG. 46 is a lateral aberration diagram of a zoom lens system according to Example 16 at a telephoto limit in a basic state where image blur compensation is not performed and in a blur compensation state.

As shown in FIG. 44, in the zoom lens system according to Embodiment 16, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 16, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 16, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 16, the fourth lens unit G4 comprises solely a bi-convex eighth lens element L8. The eighth lens element L8 has an aspheric image side surface.

In the zoom lens system according to Embodiment 16, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 47:
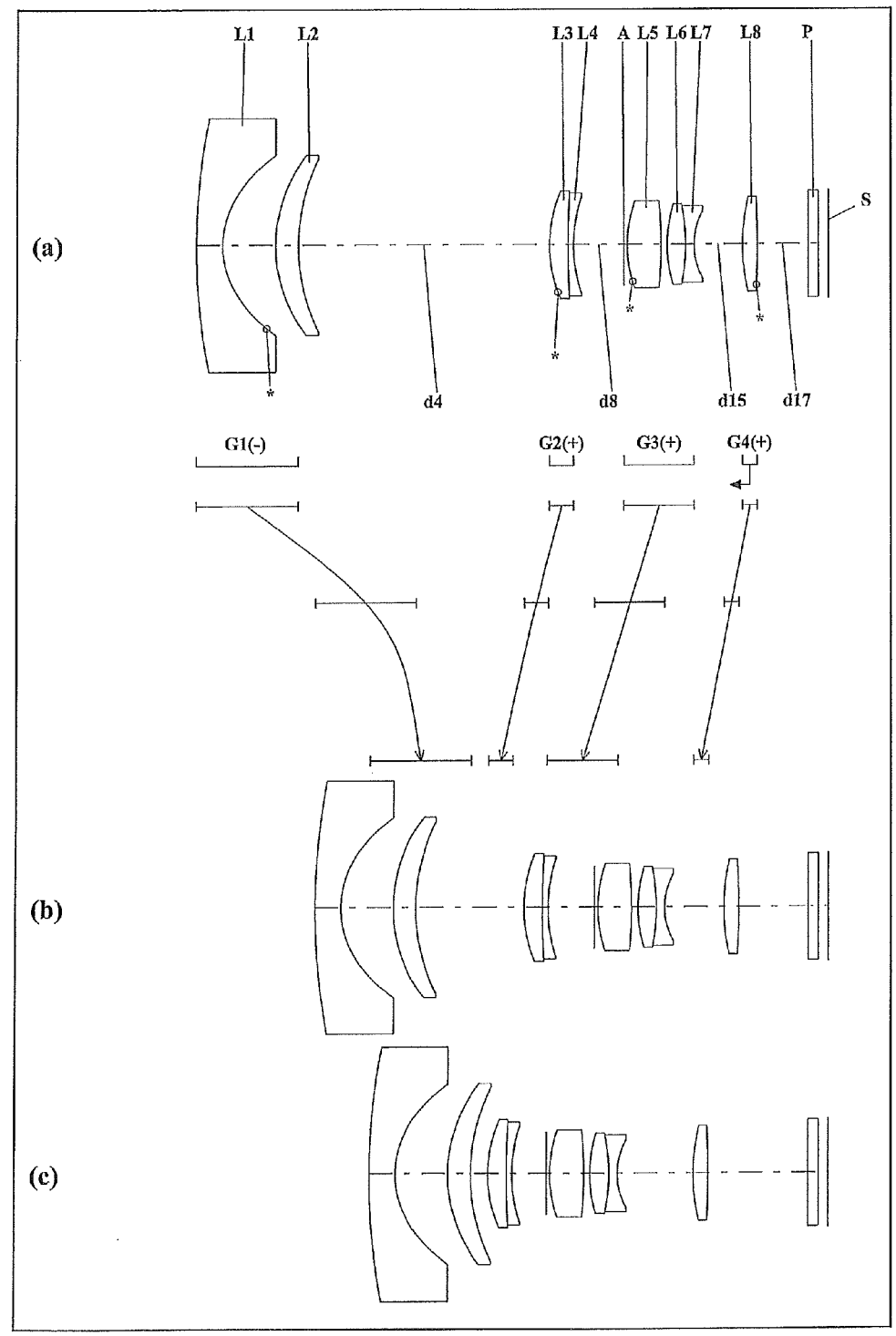
FIG. 47 is a lens arrangement diagram showing an infinity in-focus condition of a zoom lens system according to Embodiment 17 (Example 17).
Figure 48:
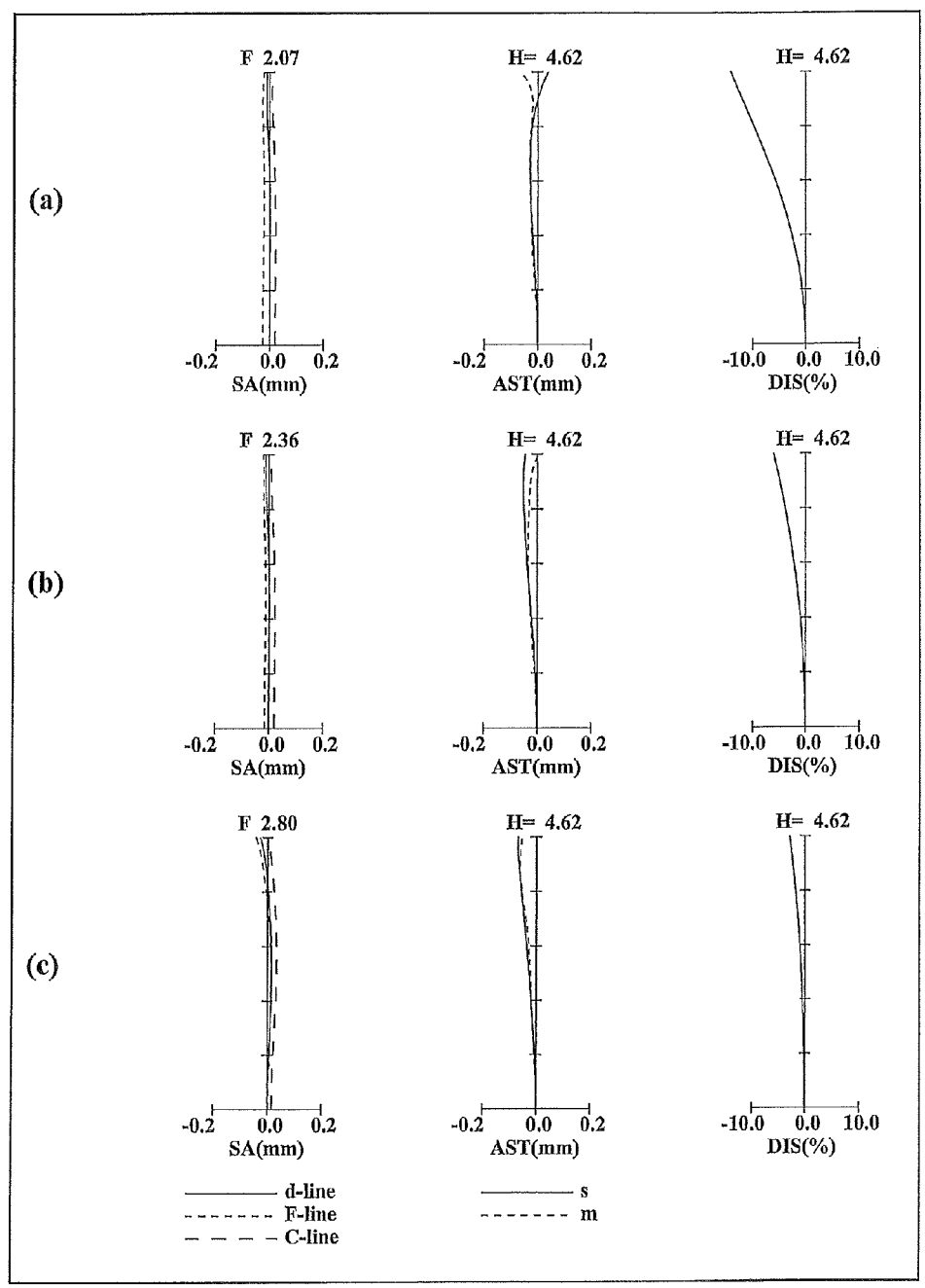
FIG. 48 is a longitudinal aberration diagram of an infinity in-focus condition of a zoom lens system according to Example 17.
Figure 49:
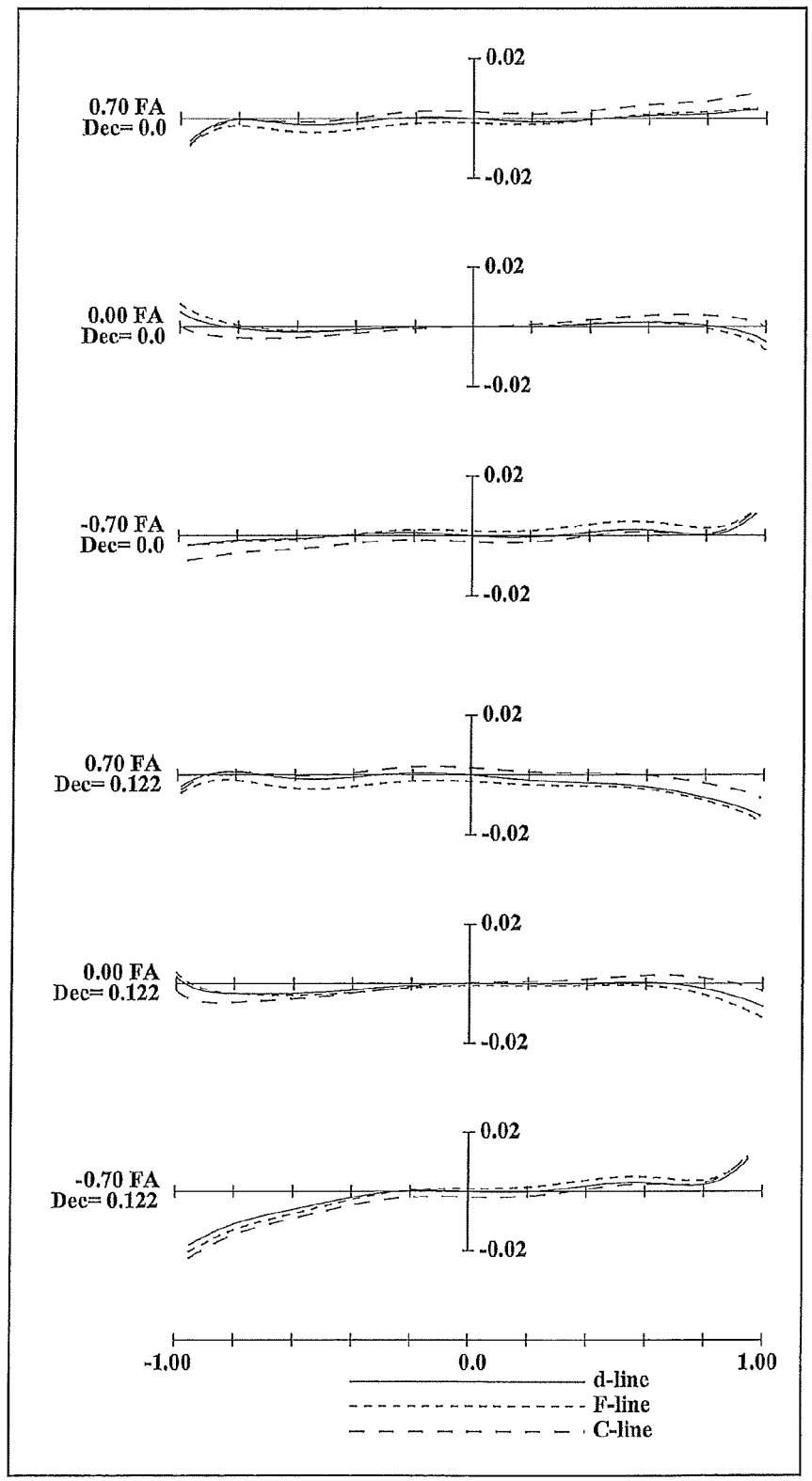
FIG. 49 is a lateral aberration diagram of a zoom lens system according to Example 17 at a telephoto limit in a basic state where image blur compensation is not performed and in a blur compensation state.

As shown in FIG. 47, in the zoom lens system according to Embodiment 17, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 17, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 17, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 17, the fourth lens unit G4 comprises solely a bi-convex eighth lens element L8. The eighth lens element L8 has an aspheric image side surface.

In the zoom lens system according to Embodiment 17, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Figure 50:
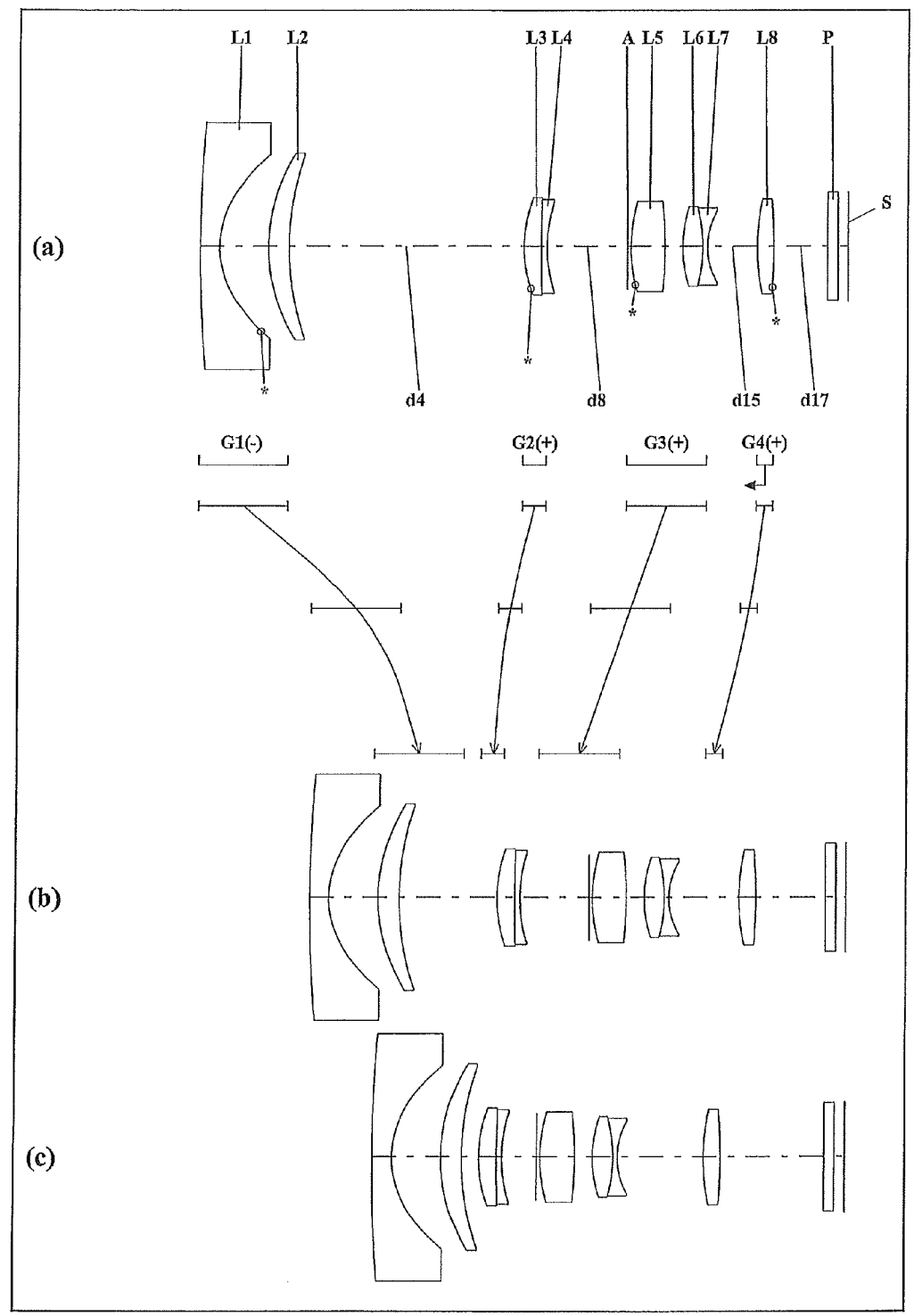
FIG. 50 is a lens arrangement diagram showing an infinity in-focus condition of a zoom lens system according to Embodiment 18 (Example 18).
Figure 51:
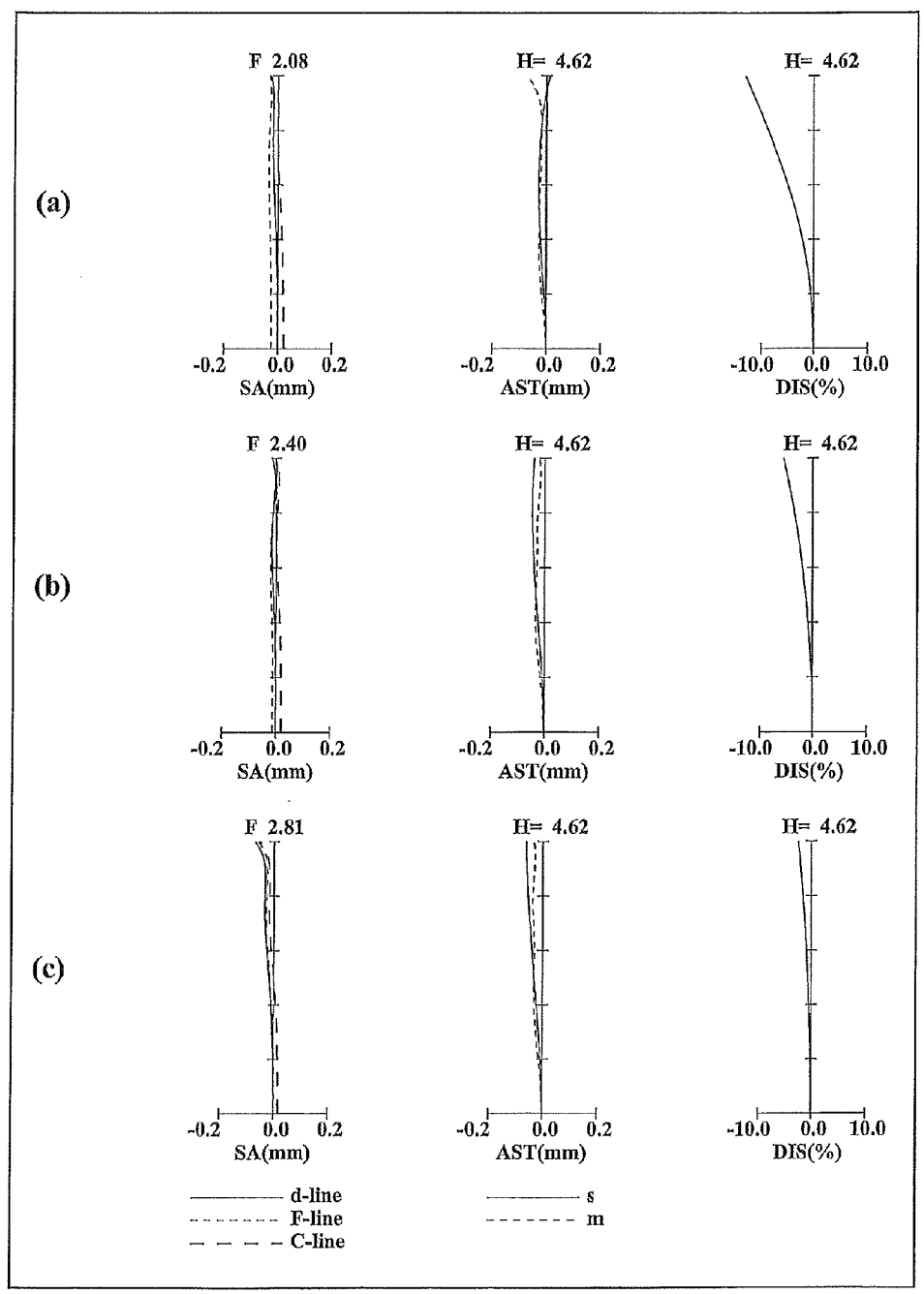
FIG. 51 is a longitudinal aberration diagram of an infinity in-focus condition of a zoom lens system according to Example 18.
Figure 52:
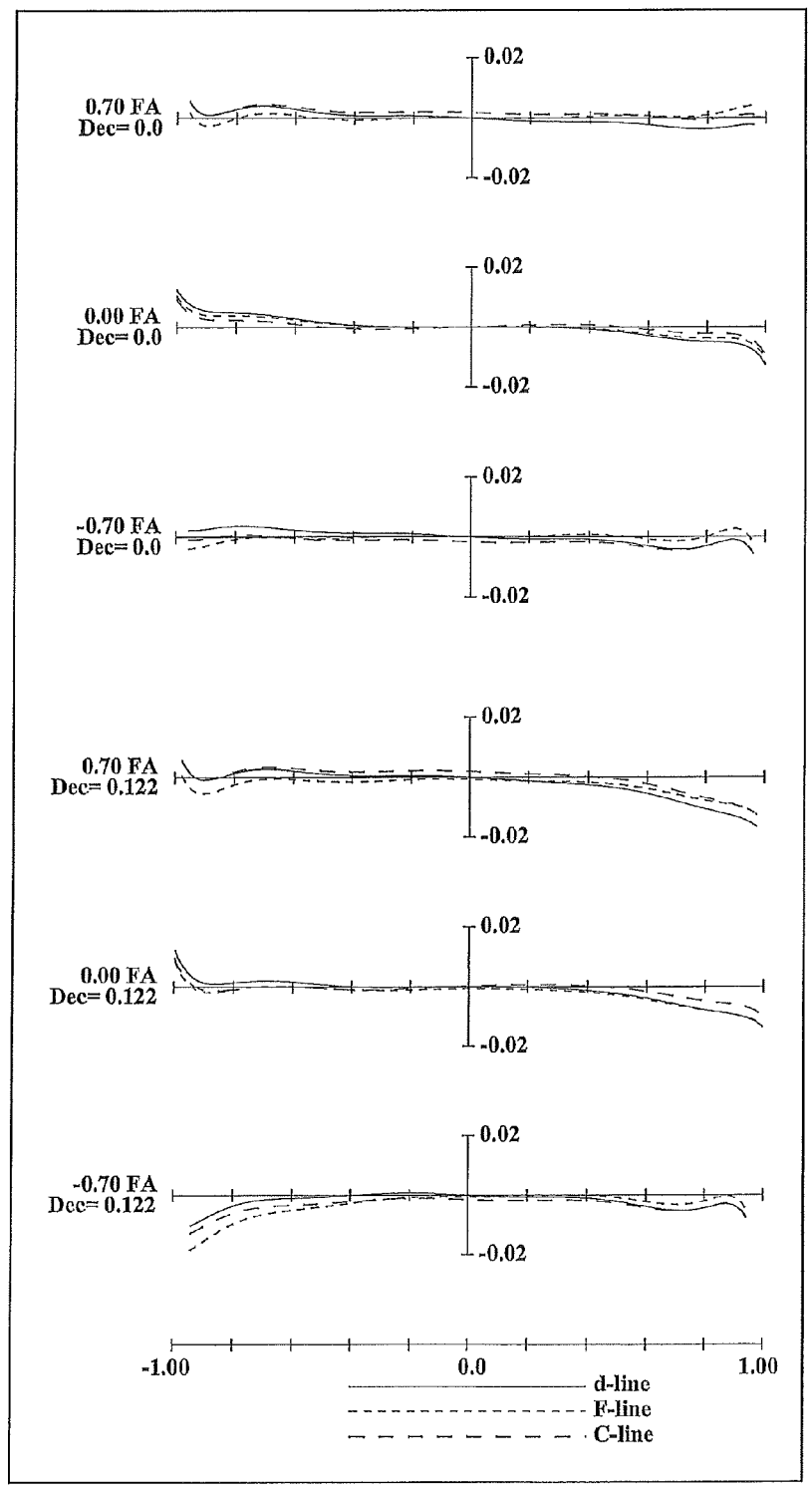
FIG. 52 is a lateral aberration diagram of a zoom lens system according to Example 18 at a telephoto limit in a basic state where image blur compensation is not performed and in a blur compensation state.

As shown in FIG. 50, in the zoom lens system according to Embodiment 18, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface.

In the zoom lens system according to Embodiment 18, the second lens unit G2, in order from the object side to the image side, comprises: a positive meniscus third lens element L3 with the convex surface facing the object side; and a negative meniscus fourth lens element L4 with the convex surface facing the object side. The third lens element L3 and the fourth lens element L4 are cemented with each other. In the surface data in the corresponding numerical example described later, surface number 6 indicates a cement layer between the third lens element L3 and the fourth lens element L4. The third lens element L3 has an aspheric object side surface.

In the zoom lens system according to Embodiment 18, the third lens unit G3, in order from the object side to the image side, comprises: a bi-convex fifth lens element L5; a bi-convex sixth lens element L6; and a bi-concave seventh lens element L7. Among these, the sixth lens element L6 and the seventh lens element L7 are cemented with each other. In the surface data in the corresponding numerical example described later, surface number 13 indicates a cement layer between the sixth lens element L6 and the seventh lens element L7. The fifth lens element L5 has an aspheric object side surface.

In the zoom lens system according to Embodiment 18, the fourth lens unit G4 comprises solely a bi-convex eighth lens element L8. The eighth lens element L8 has an aspheric image side surface.

In the zoom lens system according to Embodiment 18, in zooming from a wide-angle limit to a telephoto limit at the time of image taking, the first lens unit G1 moves with locus of a convex to the image side such that the position of the first lens unit G1 at the telephoto limit is closer to the image side than the position at the wide-angle limit, the second lens unit G2 moves to the object side, the third lens unit G3 moves to the object side together with the aperture diaphragm A, and the fourth lens unit G4 moves to the object side. That is, in zooming from a wide-angle limit to a telephoto limit at the time of image taking, the individual lens units move along the optical axis such that the interval between the first lens unit G1 and the second lens unit G2 should decrease.

Particularly, in the zoom lens systems according to Embodiments 13 to 18, the first lens unit G1, in order from the object side to the image side, comprises: a first lens element L1 having negative optical power, and a second lens element L2 having positive optical power. Therefore, various aberrations, particularly, distortion at a wide-angle limit, can be favorably compensated, and still a short overall optical length (overall length of lens system) can be achieved.

In the zoom lens systems according to Embodiments 13 to 18, the first lens unit G1 includes at least one lens element having an aspheric surface. Therefore, aberrations, particularly distortion at a wide-angle limit, can be compensated more favorably.

In the zoom lens systems according to Embodiments 13 to 18, the fourth lens unit G4 is composed of a single lens element. Therefore, the total number of lens elements is reduced, resulting in a lens system having a short overall optical length (overall length of lens system). Further, since the single lens element constituting the fourth lens unit G4 has an aspheric surface, aberrations can be compensated more favorably.

In the zoom lens systems according to Embodiments 13 to 18, the third lens unit G3, which is positioned just on the image side of the aperture diaphragm A, is composed of two single lens elements, or alternatively three lens elements including one cemented lens element. Therefore, the thickness of the third lens unit G3 is reduced, resulting in a lens system having a short overall optical length (overall length of lens system).

In the zoom lens systems according to Embodiments 13 to 18, in zooming from a wide-angle limit to a telephoto limit at the time of image taking, the first lens unit G1, the second lens unit G2, the third lens unit G3 and the fourth lens unit G4 move individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis. Thus, image blur can be compensated in a state that size increase in the entire zoom lens system is suppressed and thereby a compact construction is realized and that excellent imaging characteristics such as small decentering coma aberration and small decentering astigmatism are maintained.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for conditions preferred to be satisfied by a zoom lens system like the zoom lens systems according to Embodiments 13 to 18. Here, a plurality of preferable conditions is set forth for the zoom lens system according to each embodiment. A construction that satisfies all the plural conditions is most desirable for the zoom lens system. However, when an individual condition is satisfied, a zoom lens system having the corresponding effect is obtained.

In a zoom lens system like the zoom lens systems according to Embodiments 13 to 18, in order from the object side to the image side, comprising a first lens unit having negative optical power, a second lens unit having positive optical power, a third lens unit having positive optical power, and a fourth lens unit having positive optical power, wherein, in zooming, the intervals between the respective lens units vary (this lens configuration is referred to as basic configuration VII of the embodiment, hereinafter), the following condition (VII-1) is satisfied.

$$0.20 \leq (1-\beta_{2W})\beta_{3W} \leq 0.75 \qquad \text{(VII-1)}$$

(here, $f_T/f_W > 2.0$)
where,
$\beta_{2W}$ is a lateral magnification of the second lens unit at a wide-angle limit,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

The condition (VII-1) sets forth the lateral magnifications of the second lens unit and the third lens unit at a wide-angle limit. This is a condition relating to compensation of image point movement caused by vibration of the entire system. When the value exceeds the upper limit of the condition (VII-1), the decentering error sensitivity of lens units during image blur compensation excessively increases, resulting in difficulty in constructing mechanism of image blur compensation. On the other hand, when the value goes below the lower limit of the condition (VII-1), the decentering error sensitivity of lens units during image blur compensation excessively decreases, resulting in excessive increase of the amount of movement of a lens unit for compensation (or a lens element for compensation) during image blur compensation. As a result, a compact zoom lens system cannot be achieved. Functional effects of the condition (VII-1) is most remarkably exhibited in the case that the lens unit for compensation (or the lens element for compensation) that moves in a direction perpendicular to the optical axis during image blur compensation is the entirety of the third lens unit.

When at least one of the following conditions (VII-1)' and (VII-1)" is satisfied, the above-mentioned effect is achieved more successfully.

$$(1-\beta_{2W})\beta_{3W} \leq 0.70 \qquad \text{(VII-1)'}$$

$$(1-\beta_{2W})\beta_{3W} \leq 0.50 \qquad \text{(VII-1)''}$$

(here, $f_T/f_W > 2.0$)

In a zoom lens system like the zoom lens systems according to Embodiments 13 to 18, in order from the object side to the image side, comprising a first lens unit having negative optical power, a second lens unit having positive optical power, a third lens unit having positive optical power, and a fourth lens unit having positive optical power, wherein, in zooming, the intervals between the respective lens units vary (this lens configuration is referred to as basic configuration VIII of the embodiment, hereinafter), the following condition (VIII-1) is satisfied.

$$0.20 \leq (1-\beta_{2T})\beta_{3T} \leq 1.00 \qquad \text{(VIII-1)}$$

(here, $f_T/f_W > 2.0$)
where,
$\beta_{2T}$ is a lateral magnification of the second lens unit at a telephoto limit,
$\beta_{3T}$ is a lateral magnification of the third lens unit at a telephoto limit,
$f_T$ is a focal length of the entire system at a telephoto limit, and
$f_W$ is a focal length of the entire system at a wide-angle limit.

The condition (VIII-1) sets forth the lateral magnifications of the second lens unit and the third lens unit at a telephoto limit. This is a condition relating to compensation of image point movement caused by vibration of the entire system. When the value exceeds the upper limit of the condition (VIII-1), the decentering error sensitivity of lens units during image blur compensation excessively increases, resulting in difficulty in constructing mechanism of image blur compensation. On the other hand, when the value goes below the lower limit of the condition (VIII-1), the decentering error sensitivity of lens units during image blur compensation excessively decreases, resulting in excessive increase of the amount of movement of a lens unit for compensation (or a lens element for compensation) during image blur compensation. As a result, a compact zoom lens system cannot be achieved. Functional effects of the condition (VIII-1) is most remarkably exhibited in the case that the lens unit for compensation (or the lens element for compensation) that moves in a direction perpendicular to the optical axis during image blur compensation is the entirety of the third lens unit.

When at least one of the following conditions (VIII-1)' and (VIII-1)" is satisfied, the above-mentioned effect is achieved more successfully.

$$(1-\beta_{2T})\beta_{3T} \leq 0.780 \quad (VIII\text{-}1)'$$

$$(1-\beta_{2T})\beta_{3T} \leq 0.75 \quad (VIII\text{-}1)''$$

(here, $f_T/f_W > 2.0$)

Like the zoom lens systems according to Embodiments 13 to 18, in a zoom lens system, in order from the object side to the image side, comprising a first lens unit having negative optical power, a second lens unit having positive optical power, a third lens unit having positive optical power, and a fourth lens unit having positive optical power, wherein, in zooming, all the first lens unit, the second lens unit, the third lens unit, and the fourth lens unit move in a direction along an optical axis such that the intervals between the respective lens units vary, and in compensating image point movement caused by vibration of the entire system, any lens unit among the first lens unit, the second lens unit, the third lens unit and the fourth lens unit or a sub lens unit consisting of a part of a lens unit moves in a direction perpendicular to the optical axis (this lens configuration is referred to as basic configuration V of the embodiment, hereinafter), or alternatively in a zoom lens system, in order from the object side to the image side, comprising a first lens unit having negative optical power, a second lens unit having positive optical power, a third lens unit having positive optical power, and a fourth lens unit having positive optical power, wherein, in zooming, the intervals between the respective lens units vary, in compensating image point movement caused by vibration of the entire system, any lens unit among the first lens unit, the second lens unit, the third lens unit and the fourth lens unit or a sub lens unit consisting of a part of a lens unit moves in a direction perpendicular to the optical axis, and an aperture diaphragm is provided between the second lens unit and the third lens unit (this lens configuration is referred to as basic configuration VI of the embodiment, hereinafter), and wherein, in zooming, the fourth lens unit moves in a direction along the optical axis, or alternatively in a zoom lens system having the basic configuration VII or the basic configuration VIII, wherein, in zooming, the fourth lens unit moves in a direction along the optical axis, it is preferable that the following condition (3B) is satisfied.

$$0.07 < |D_{G4}/f_{G4}| < 0.25 \quad (3B)$$

(here, $f_T/f_W > 2.0$)
where,
$D_{G4}$ is an amount of movement of the fourth lens unit in the direction along the optical axis during zooming,
$f_{G4}$ is a focal length of the fourth lens unit,
$f_T$ is a focal length of the entire system at a telephoto limit, and
$f_W$ is a focal length of the entire system at a wide-angle limit.

The condition (3B) sets forth the amount of movement of the fourth lens unit. When the value exceeds the upper limit of the condition (3B), the amount of movement of the fourth lens unit becomes excessively great, resulting in difficulty in achieving a compact zoom lens system. On the other hand, when the value goes below the lower limit of the condition (3B), the amount of movement of the fourth lens unit becomes excessively small, resulting in difficulty in compensating aberrations that vary during zooming. Thus, this situation is undesirable.

In a zoom lens system having any of the basic configurations V to VIII like the zoom lens systems according to Embodiments 13 to 18, it is preferable that the following condition (4B) is satisfied.

$$1.5 < f_{G4}/f_W < 10.0 \quad (4B)$$

(here, $f_T/f_W > 2.0$)
where,
$f_{G4}$ is a focal length of the fourth lens unit,
$f_T$ is a focal length of the entire system at a telephoto limit, and
$f_W$ is a focal length of the entire system at a wide-angle limit.

The condition (4B) sets forth the focal length of the fourth lens unit. When the value exceeds the upper limit of the condition (4B), the focal length of the fourth lens unit becomes excessively long, resulting in difficulty in securing peripheral illuminance on the image surface. On the other hand, when the value goes below the lower limit of the condition (4B), the focal length of the fourth lens unit becomes excessively short, resulting in difficulty in compensating aberrations, particularly spherical aberration, that occur in the fourth lens unit.

When the following condition (4B)' is satisfied, the above-mentioned effect is achieved more successfully.

$$f_{G4}/f_W < 7.5 \quad (4B)'$$

(here, $f_T/f_W > 2.0$)

In a zoom lens system having any of the basic configurations V to VIII like the zoom lens systems according to Embodiments 13 to 18, it is preferable that the following condition (5B) is satisfied.

$$|\beta_{4W}| < 1.5 \quad (5B)$$

(here, $f_T/f_W > 2.0$)
where,
$\beta_{4W}$ is a lateral magnification of the fourth lens unit at a wide-angle limit,
$f_T$ is a focal length of the entire system at a telephoto limit, and
$f_W$ is a focal length of the entire system at a wide-angle limit.

The condition (5B) sets forth the lateral magnification of the fourth lens unit at a wide-angle limit. This is a condition relating to the back focal length. When the condition (5B) is not satisfied, since the lateral magnification of the fourth lens unit arranged closest to the image side increases, the back focal length becomes excessively long, resulting in difficulty in achieving a compact zoom lens system.

When at least one of the following conditions (5B)' and (5B)" is satisfied, the above-mentioned effect is achieved more successfully.

$$|\beta_{4W}| < 1.0 \quad (5B)'$$

$$|\beta_{4W}| < 0.8 \quad (5B)''$$

(here, $f_T/f_W > 2.0$)

In a zoom lens system having any of the basic configurations V to VIII like the zoom lens systems according to Embodiments 13 to 18, wherein, the first lens unit comprises two lens elements including, in order from the object side to the image side, a first lens element having negative optical power and a second lens element having positive optical power, it is preferable that the following condition (6B) is satisfied.

$$0.5 < f_{L1}/f_{G1} < 0.8 \qquad (6B)$$

where,
$f_{L1}$ is a focal length of the first lens element, and
$f_{G1}$ is a focal length of the first lens unit.

The condition (6B) sets forth the focal length of the first lens element in the first lens unit. When the value exceeds the upper limit of the condition (6B), the focal length of the first lens element becomes excessively long, resulting in difficulty in compensating, particularly, distortion at a wide-angle limit. In addition, the amount of movement of the first lens unit during zooming also increases, resulting in difficulty in achieving a compact zoom lens system. On the other hand, when the value goes below the lower limit of the condition (6B), the focal length of the first lens element becomes excessively short, resulting in difficulty in compensating, particularly, distortion at a wide-angle limit.

When the following condition (6B)' is satisfied, the above-mentioned effect is achieved more successfully.

$$f_{L1}/f_{G1} < 0.67 \qquad (6B)'$$

In a zoom lens system having any of the basic configurations V to VIII like the zoom lens systems according to Embodiments 13 to 18, wherein, the first lens unit comprises two lens elements including, in order from the object side to the image side, a first lens element having negative optical power and a second lens element having positive optical power, it is preferable that the following condition (7B) is satisfied.

$$1.5 < |f_{L2}/f_{G1}| < 4.0 \qquad (7B)$$

where,
$f_{L2}$ is a focal length of the second lens element, and
$f_{G1}$ is a focal length of the first lens unit.

The condition (7B) sets forth the focal length of the second lens element in the first lens unit. When the value exceeds the upper limit of the condition (7B), the focal length of the second lens element becomes excessively long, resulting in difficulty in compensating, particularly, distortion at a wide-angle limit. In addition, the amount of movement of the first lens unit during zooming also increases, resulting in difficulty in achieving a compact zoom lens system. On the other hand, when the value goes below the lower limit of the condition (7B), the focal length of the second lens element becomes excessively short, resulting in difficulty in compensating, particularly, distortion at a wide-angle limit.

When the following condition (7B)' is satisfied, the above-mentioned effect is achieved more successfully.

$$2.4 < |f_{L2}/f_{G1}| \qquad (7B)''$$

In a zoom lens system having any of the basic configurations V to VIII like the zoom lens systems according to Embodiments 13 to 18, wherein, the first lens unit comprises two lens elements including, in order from the object side to the image side, a first lens element having negative optical power and a second lens element having positive optical power, it is preferable that the following condition (8B) is satisfied.

$$0.15 < |f_{L1}/f_{L2}| < 4.00 \qquad (8B)$$

where,
$f_{L1}$ is a focal length of the first lens element, and
$f_{L2}$ is a focal length of the second lens element.

The condition (8B) sets forth the ratio between the focal lengths of the first lens element and the second lens element in the first lens unit. When the value exceeds the upper limit of the condition (8B), the focal length of the first lens element becomes excessively long relative to the focal length of the second lens element, resulting in difficulty in compensating, particularly, distortion at a wide-angle limit. In addition, the amount of movement of the first lens unit during zooming also increases, resulting in difficulty in achieving a compact zoom lens system. On the other hand, when the value goes below the lower limit of the condition (8B), the focal length of the second lens element becomes excessively long relative to the focal length of the first lens element, resulting in difficulty in compensating, particularly, distortion at a wide-angle limit.

When the following condition (8B)' is satisfied, the above-mentioned effect is achieved more successfully.

$$|f_{L1}/f_{L2}| < 0.25 \qquad (8B)'$$

Each of the lens units constituting the zoom lens system according to any of Embodiments 13 to 18 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 19

Figure 53:
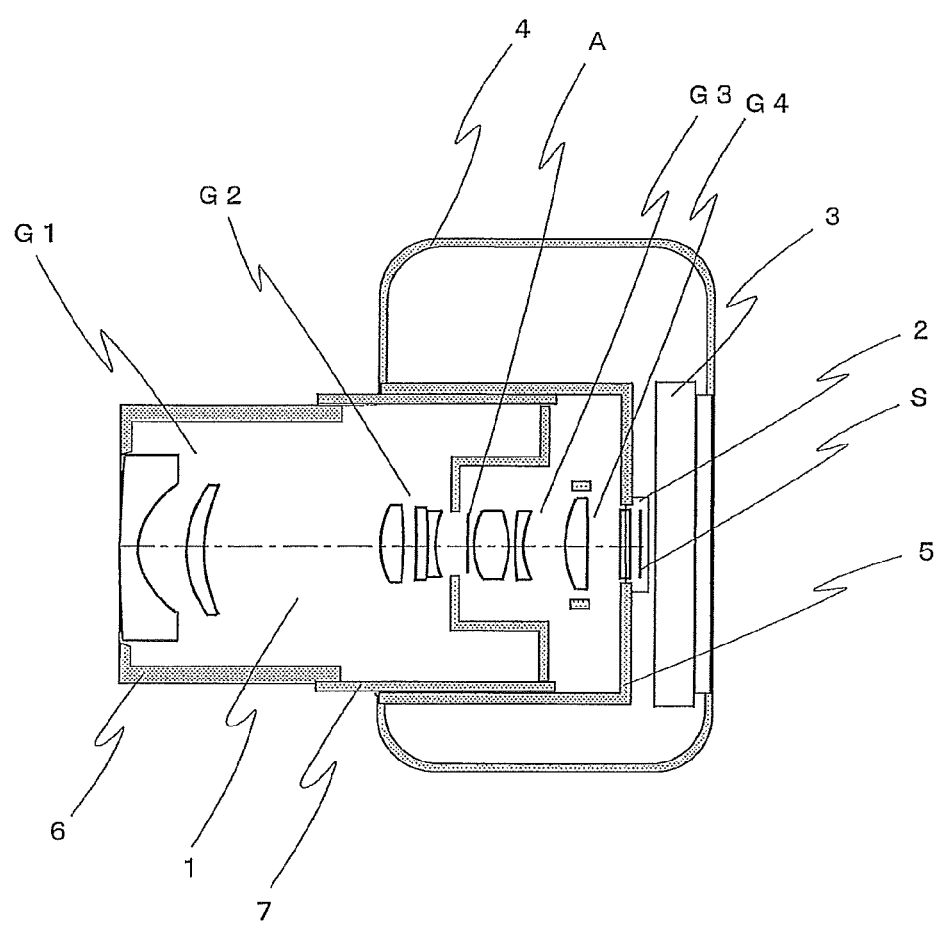
FIG. 53 is a schematic construction diagram of a digital still camera according to Embodiment 19.

FIG. 53 is a schematic construction diagram of a digital still camera according to Embodiment 19. In FIG. 53, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 13. In FIG. 53, the zoom lens system 1 comprises a first lens unit G1, a second lens unit G2, an aperture diaphragm A, a third lens unit G3, and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

A lens barrel comprises a main barrel 5, a moving barrel 6 and a cylindrical cam 7. When the cylindrical cam 7 is rotated, the first lens unit G1, the second lens unit G2, the aperture diaphragm A and the third lens unit G3, and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment 13 is employed in a digital still camera, a small digital still camera is obtained that has a high resolution and high capability of compensating the curvature of field and that has a short overall length of lens system at the time of non-use. Here, in the digital still camera shown in FIG. 53, any one of the zoom lens systems according to Embodiments 14 to 18 may be employed in place of the zoom lens system according to Embodiment 13. Further, the optical system of the digital still camera shown in FIG. 53 is applicable also to a digital video camera for moving images. In this case, moving images with high resolution can be acquired in addition to still images.

The digital still camera according to Embodiment 19 has been described for a case that the employed zoom lens system 1 is a zoom lens system according to any of Embodiments 13 to 18. However, in these zoom lens systems, the entire zooming range need not be used. That is, in accordance with a desired zooming range, a range where optical performance is secured may exclusively be used. Then, the zoom lens system may be used as one having a lower magnification than the zoom lens systems described in Embodiments 13 to 18.

Further, Embodiment 19 has been described for a case that the zoom lens system is applied to a lens barrel of so-called barrel retraction construction. However, the present invention is not limited to this. For example, the zoom lens system may be applied to a lens barrel of so-called bending construction where a prism having an internal reflective surface or a front surface reflective mirror is arranged at an arbitrary position within the first lens unit G1 or the like. Further, in Embodiment 19, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of retraction.

Further, an imaging device comprising a zoom lens system according to any of Embodiments 13 to 18 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments 1 to 11 and 13 to 18 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + A4h^4 + A6h^6 + A8h^8 + A10h^{10} + A12h^{12}$$

Here, κ is the conic constant, A4, A6, A8, A10 and A12 are a fourth-order, sixth-order, eighth-order, tenth-order and twelfth-order aspherical coefficients, respectively.

FIGS. 2, 5, 8, 11, 14, 17, 20, 23, 26, 29 and 32 are longitudinal aberration diagrams of the zoom lens systems according to Embodiments 1 to 11, respectively.

FIGS. 36, 39, 42, 45, 48 and 51 are longitudinal aberration diagrams of the zoom lens systems according to Embodiments 13 to 18, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, 18, 21, 24, 27, 30 and 33 are lateral aberration diagrams of the zoom lens systems at a telephoto limit according to Embodiments 1 to 11, respectively.

FIGS. 37, 40, 43, 46, 49 and 52 are lateral aberration diagrams of the zoom lens systems at a telephoto limit according to Embodiments 13 to 18, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the third lens unit G3 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the third lens unit G3 in a direction perpendicular to the optical axis in the image blur compensation state at a telephoto limit is as follows.

| Example | Amount of movement (mm) |
|---|---|
| 1 | 0.108 |
| 2 | 0.108 |

-continued

| Example | Amount of movement (mm) |
|---|---|
| 3 | 0.109 |
| 4 | 0.107 |
| 5 | 0.130 |
| 6 | 0.130 |
| 7 | 0.130 |
| 8 | 0.130 |
| 9 | 0.123 |
| 10 | 0.119 |
| 11 | 0.117 |
| 13 | 0.109 |
| 14 | 0.130 |
| 15 | 0.124 |
| 16 | 0.119 |
| 17 | 0.122 |
| 18 | 0.117 |

Here, when the shooting distance is infinity, at a telephoto limit, the amount of image decentering in a case that the zoom lens system inclines by 0.6° is equal to the amount of image decentering in a case that the entirety of the third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.6° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1* | 26.46600 | 2.01600 | 1.68966 | 53.0 |
| 2* | 5.48900 | 5.03400 | | |
| 3* | 16.02300 | 2.20000 | 1.99537 | 20.7 |
| 4 | 23.30000 | Variable | | |
| 5(Diaphragm) | ∞ | 0.30000 | | |
| 6* | 10.05500 | 1.39800 | 1.80470 | 41.0 |
| 7 | 49.69300 | 0.93300 | | |
| 8 | 22.05300 | 1.35000 | 1.83500 | 43.0 |
| 9 | −140.13900 | 0.40000 | 1.80518 | 25.5 |
| 10 | 8.94000 | Variable | | |
| 11* | 8.19300 | 2.50000 | 1.68863 | 52.8 |
| 12 | −22.84400 | 0.30000 | | |
| 13 | 14.14700 | 0.70000 | 1.72825 | 28.3 |
| 14 | 6.21900 | Variable | | |
| 15* | 9.93700 | 1.92200 | 1.51443 | 63.3 |
| 16* | 40.88200 | Variable | | |
| 17 | ∞ | 0.90000 | 1.51680 | 64.2 |
| 18 | ∞ | (BF) | | |
| Image surface | ∞ | | | |

TABLE 2

(Aspherical data)

Surface No. 1

K = 0.00000E+00, A4 = −1.15959E−04, A6 = 1.46087E−07, A8 = 2.55385E−10 A10 = 0.00000E+00

Surface No. 2

K = −8.94415E−01, A4 = 1.56211E−04, A6 = −8.50454E−07, A8 = −6.92380E−08 A10 = 5.41652E−10

Surface No. 3

K = −1.15758E+00, A4 = 9.48348E−05, A6 = −1.26303E−07, A8 = −2.58189E−09 A10 = 0.00000E+00

Surface No. 6

K = −5.75419E−01, A4 = −1.53947E−06, A6 = −4.49953E−07, A8 = −3.34490E−08 A10 = 9.55120E−10

Surface No. 11

K = 0.00000E+00, A4 = −3.56486E−04, A6 = −5.33043E−07, A8 = −3.91783E−08 A10 = 0.00000E+00

Surface No. 15

K = 1.37651E+00, A4 = −2.07124E−04, A6 = −1.43147E−05, A8 = 2.83699E−07 A10 = −7.50170E−09

Surface No. 16

K = 0.00000E+00 , A4 = 9.63145E−05, A6 = −1.13976E−05, A8 = 9.43475E−08 A10 = 0.00000E+00

TABLE 3

(Various data)

Zooming ratio 2.21958

| | Wide-angle limit | Middle position | Telephoto limit |
|---|---|---|---|
| Focal length | 4.6402 | 6.9137 | 10.2992 |
| F-number | 2.07000 | 2.29000 | 2.65000 |
| View angle | 49.7098 | 35.0496 | 24.7918 |
| Image height | 4.6250 | 4.6250 | 4.6250 |
| Overall length of lens system | 54.2809 | 44.9071 | 40.2351 |
| BF | 0.88151 | 0.88677 | 0.88337 |
| d4 | 23.6313 | 11.9638 | 4.2975 |
| d10 | 2.1787 | 2.1453 | 1.5345 |
| d14 | 5.0864 | 6.4956 | 8.6386 |
| d16 | 2.5500 | 3.4626 | 4.9381 |

Zoom lens unit data

| Lens unit | Initial surface No. | Focal length |
|---|---|---|
| 1 | 1 | −14.74961 |
| 2 | 5 | 36.14986 |

TABLE 3-continued (Various data)

| | | |
|---|---|---|
| 3 | 11 | 16.01110 |
| 4 | 15 | 24.99213 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 134.72900 | 1.91500 | 1.68966 | 53.0 |
| 2* | 6.50600 | 5.54800 | | |
| 3* | 12.44500 | 1.66800 | 1.99537 | 20.7 |
| 4 | 16.85000 | Variable | | |
| 5(Diaphragm) | ∞ | 0.30000 | | |
| 6* | 10.15100 | 1.40400 | 1.80470 | 41.0 |
| 7 | 50.08000 | 1.01800 | | |
| 8 | 20.76600 | 1.37600 | 1.83500 | 43.0 |
| 9 | −135.52400 | 0.40000 | 1.80518 | 25.5 |
| 10 | 8.58000 | Variable | | |
| 11* | 8.13500 | 2.59600 | 1.68863 | 52.8 |
| 12 | −20.12200 | 0.30000 | | |
| 13 | 16.02300 | 0.72400 | 1.72825 | 28.3 |
| 14 | 6.26200 | Variable | | |
| 15* | 12.02800 | 2.08200 | 1.51443 | 63.3 |
| 16* | 257.77300 | Variable | | |
| 17 | ∞ | 0.90000 | 1.51680 | 64.2 |
| 18 | ∞ | (BF) | | |
| Image surface | ∞ | | | |

TABLE 5

(Aspherical data)

Surface No. 2

$K = -8.89541E-01, A4 = 3.99666E-05, A6 = 1.70635E-07,$
$A8 = 7.94855E-09\ A10 = -1.19853E-11, A12 = 0.00000E+00$
Surface No. 3

$K = 0.00000E+00, A4 = -2.98869E-05, A6 = 0.00000E+00,$
$A8 = 0.00000E+00\ A10 = 0.00000E+00, A12 = 0.00000E+00$
Surface No. 6

$K = -5.58335E-01, A4 = 1.94814E-06, A6 = -1.25348E-06,$
$A8 = -1.13996E-09\ A10 = 3.40693E-10, A12 = 0.00000E+00$
Surface No. 11

$K = 0.00000E+00, A4 = -3.87944E-04, A6 = 8.43364E-08,$
$A8 = -6.23411E-08\ A10 = 5.24843E-10, A12 = 0.00000E+00$
Surface No. 15

$K = 0.00000E+00, A4 = -7.19125E-05, A6 = 0.00000E+00,$
$A8 = 0.00000E+00\ A10 = 0.00000E+00, A12 = 0.00000E+00$
Surface No. 16

$K = 0.00000E+00, A4 = 1.04407E-05, A6 = 7.96592E-06,$
$A8 = -8.57725E-07\ A10 = 3.18421E-08, A12 = -4.36684E-10$

TABLE 6

(Various data)

Zooming ratio 2.21971

| | Wide-angle limit | Middle position | Telephoto limit |
|---|---|---|---|
| Focal length | 4.6399 | 6.9129 | 10.2992 |
| F-number | 2.07000 | 2.29000 | 2.63000 |
| View angle | 49.4321 | 35.2212 | 24.7264 |
| Image height | 4.6250 | 4.6250 | 4.6250 |
| Overall length of lens system | 54.3814 | 44.5418 | 39.4183 |
| BF | 0.88142 | 0.88720 | 0.87461 |
| d4 | 23.7170 | 11.5906 | 3.4670 |
| d10 | 2.0017 | 1.9854 | 1.4553 |
| d14 | 5.0003 | 6.3431 | 8.1913 |
| d16 | 2.5500 | 3.5045 | 5.1991 |

Zoom lens unit data

| Lens unit | Initial surface No. | Focal length |
|---|---|---|
| 1 | 1 | −14.99745 |
| 2 | 5 | 37.58519 |
| 3 | 11 | 15.96197 |
| 4 | 15 | 24.45523 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1 | 250.00000 | 2.01800 | 1.68966 | 53.0 |
| 2* | 6.73400 | 5.75000 | | |
| 3* | 13.79500 | 1.59400 | 1.99537 | 20.7 |
| 4 | 19.27700 | Variable | | |
| 5* | 7.86600 | 1.57300 | 1.80470 | 41.0 |
| 6 | −45.60600 | 0.70400 | | |
| 7 | −268.86000 | 0.82900 | 1.83500 | 43.0 |
| 8 | 382.84900 | 0.44100 | 1.80518 | 25.5 |
| 9 | 6.88800 | Variable | | |
| 10 (Diaphragm) | ∞ | 0.30000 | | |
| 11* | 8.04900 | 2.65000 | 1.68863 | 52.8 |
| 12 | −12.76600 | 0.30000 | | |
| 13 | 36.01500 | 0.70000 | 1.72825 | 28.3 |
| 14 | 6.55200 | Variable | | |
| 15 | 12.08800 | 2.30000 | 1.51443 | 63.3 |
| 16* | −244.81300 | Variable | | |
| 17 | ∞ | 0.90000 | 1.51680 | 64.2 |
| 18 | ∞ | (BF) | | |
| Image surface | ∞ | | | |

TABLE 8

(Aspherical data)

Surface No. 2

$K = -1.22698E+00, A4 = 1.07714E-04, A6 = 8.55227E-07,$
$A8 = -5.06893E-09\ A10 = 5.51366E-11, A12 = 0.00000E+00$

TABLE 8-continued (Aspherical data)

Surface No. 3

K = 0.00000E+00, A4 = −3.13513E−05, A6 = 1.08070E−07,
A8 = 0.00000E+00 A10 = 0.00000E+00, A12 = 0.00000E+00

Surface No. 5

K = −6.38079E−01, A4 = −3.99372E−06, A6 = −5.89749E−06,
A8 = 4.15242E−07 A10 = −1.77890E−08, A12 = 0.00000E+00

Surface No. 11

K = 0.00000E+00, A4 = −5.90024E−04, A6 = 1.07020E−05,
A8 = −1.90848E−06 A10 = 1.19941E−07, A12 = 0.00000E+00

Surface No. 16

K = 0.00000E+00, A4 = 6.48889E−05, A6 = 2.05259E−05,
A8 = −2.23740E−06 A10 = 9.49245E−08, A12 = −1.48319E−09

TABLE 9

(Various data)

Zooming ratio 2.21969

| | Wide-angle limit | Middle position | Telephoto limit |
|---|---|---|---|
| Focal length | 4.6502 | 6.9287 | 10.3220 |
| F-number | 2.48000 | 2.87000 | 3.50000 |
| View angle | 49.1915 | 34.9745 | 24.4421 |
| Image height | 4.6250 | 4.6250 | 4.6250 |
| Overall length of lens system | 54.0153 | 43.8953 | 39.8118 |
| BF | 0.87840 | 0.88341 | 0.85876 |
| d4 | 23.3667 | 10.9098 | 3.9002 |
| d9 | 2.9646 | 2.9961 | 1.9334 |
| d14 | 4.1966 | 5.3215 | 8.5860 |
| d16 | 2.5500 | 3.7255 | 4.4744 |

Zoom lens unit data

| Lens unit | Initial surface No. | Focal length |
|---|---|---|
| 1 | 1 | −15.01969 |
| 2 | 5 | 35.17245 |
| 3 | 10 | 15.66219 |
| 4 | 15 | 22.46051 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 248.89100 | 1.85000 | 1.68966 | 53.0 |
| 2* | 7.26600 | 5.72400 | | |
| 3* | 16.57200 | 1.55000 | 1.99537 | 20.7 |
| 4 | 22.76600 | Variable | | |
| 5* | 10.28400 | 1.42400 | 1.80470 | 41.0 |
| 6 | −43.92800 | 0.69900 | | |
| 7 | −59.56600 | 0.80000 | 1.80610 | 33.3 |
| 8 | 11.22300 | Variable | | |

TABLE 10-continued (Surface data)

| Surface number | r | d | nd | vd |
|---|---|---|---|---|
| 9 (Diaphragm) | ∞ | 0.30000 | | |
| 10* | 10.08700 | 2.65000 | 1.68863 | 52.8 |
| 11 | −29.30300 | 0.30000 | | |
| 12 | 15.18000 | 1.54000 | 1.88300 | 40.8 |
| 13 | −10.53100 | 0.40000 | 1.72825 | 28.3 |
| 14 | 6.04600 | Variable | | |
| 15 | 11.50000 | 2.30000 | 1.51443 | 63.3 |
| 16* | −116.95500 | Variable | | |
| 17 | ∞ | 0.90000 | 1.51680 | 64.2 |
| 18 | ∞ | (BF) | | |
| Image surface | ∞ | | | |

TABLE 11

(Aspherical data)

Surface No. 2

K = −1.90619E+00, A4 = 3.22023E−04, A6 = −1.23588E−06,
A8 = 8.64360E−09 A10 = −3.70529E−12, A12 = 0.00000E+00

Surface No. 3

K = 0.00000E+00, A4 = −1.46549E−05, A6 = 1.71224E−07,
A8 = 0.00000E+00 A10 = 0.00000E+00, A12 = 0.00000E+00

Surface No. 5

K = −5.76319E−01, A4 = −5.22325E−06, A6 = −4.56173E−06,
A8 = 4.04842E−07 A10 = −1.50861E−08, A12 = 0.00000E+00

Surface No. 10

K = 0.00000E+00, A4 = −3.51812E−04, A6 = 1.11646E−05,
A8 = −1.26405E−06 A10 = 4.22889E−08, A12 = 0.00000E+00

Surface No. 16

K = 0.00000E+00, A4 = 9.23930E−05, A6 = 2.18939E−05,
A8 = −2.29808E−06 A10 = 9.53998E−08, A12 = −1.47284E−09

TABLE 12

(Various data)

Zooming ratio 2.21854

| | Wide-angle limit | Middle position | Telephoto limit |
|---|---|---|---|
| Focal length | 4.6594 | 6.9418 | 10.3371 |
| F-number | 2.48000 | 2.84000 | 3.39000 |
| View angle | 48.6081 | 34.7387 | 24.3068 |
| Image height | 4.5700 | 4.5700 | 4.5700 |
| Overall length of lens system | 53.4593 | 43.3220 | 38.8923 |
| BF | 0.88011 | 0.88360 | 0.85886 |
| d4 | 20.5602 | 8.4927 | 1.5000 |
| d8 | 4.6413 | 4.2277 | 2.9000 |
| d14 | 4.3469 | 5.5163 | 8.1536 |
| d16 | 2.5938 | 3.7647 | 5.0428 |

Zoom lens unit data

| Lens unit | Initial surface No. | Focal length |
|---|---|---|
| 1 | 1 | −14.92842 |
| 2 | 5 | 42.19028 |
| 3 | 9 | 15.54876 |
| 4 | 15 | 20.47806 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 180.00000 | 1.85000 | 1.68966 | 53.0 |
| 2* | 7.08400 | 4.51300 | | |
| 3 | 13.82400 | 2.20000 | 1.92286 | 20.9 |
| 4 | 19.67200 | Variable | | |
| 5* | 10.57800 | 1.97800 | 1.80470 | 41.0 |
| 6 | 100.00000 | 0.50000 | 1.75520 | 27.5 |
| 7 | 12.65900 | Variable | | |
| 8 (Diaphragm) | ∞ | 0.30000 | | |
| 9* | 10.49500 | 2.48400 | 1.68863 | 52.8 |
| 10 | −61.25500 | 0.65400 | | |
| 11 | 11.53900 | 1.46100 | 1.83500 | 43.0 |
| 12 | −24.34800 | 0.40000 | 1.72825 | 28.3 |
| 13 | 6.09300 | Variable | | |
| 14 | 13.01800 | 2.25000 | 1.60602 | 57.4 |
| 15* | 120.99600 | Variable | | |
| 16 | ∞ | 0.90000 | 1.51680 | 64.2 |
| 17 | ∞ | (BF) | | |
| Image surface | ∞ | | | |

TABLE 14

(Aspherical data)

Surface No. 2

K = −1.81575E+00, A4 = 4.07000E−04, A6 = −1.69323E−06,
A8 = 1.55354E−08 A10 = −6.73938E−11, A12 = 0.00000E+00

Surface No. 5

K = 2.34407E+00, A4 = −2.77129E−04, A6 = −8.78661E−06,
A8 = 1.99478E−07 A10 = −1.20026E−08, A12 = 0.00000E+00

Surface No. 9

K = 5.52606E−02, A4 = −2.18084E−04, A6 = 5.79842E−06,
A8 = −5.60474E−07 A10 = 1.65403E−08, A12 = 0.00000E+00

Surface No. 15

K = 0.00000E+00, A4 = 5.15970E−05, A6 = 9.83168E−06,
A8 = −1.34794E−06 A10 = 7.28423E−08, A12 = −1.46950E−09

TABLE 15

(Various data)

Zooming ratio 2.34657

| | Wide-angle limit | Middle position | Telephoto limit |
|---|---|---|---|
| Focal length | 5.2710 | 8.0458 | 12.3688 |
| F-number | 2.07093 | 2.41762 | 2.90325 |
| View angle | 41.6744 | 30.6121 | 21.1415 |
| Image height | 4.1630 | 4.4870 | 4.6250 |
| Overall length of lens system | 53.8341 | 44.7346 | 40.6770 |
| BF | 0.88586 | 0.88254 | 0.87072 |
| d4 | 20.6756 | 9.1296 | 1.5000 |
| d7 | 4.5413 | 4.0383 | 3.0000 |
| d13 | 4.3151 | 5.9535 | 7.9915 |
| d15 | 3.9262 | 5.2407 | 7.8248 |

TABLE 15-continued (Various data)

Zoom lens unit data

| Lens unit | Initial surface No. | Focal length |
|---|---|---|
| 1 | 1 | −15.39956 |
| 2 | 5 | 45.00188 |
| 3 | 8 | 17.93655 |
| 4 | 14 | 23.88315 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 180.00000 | 2.25500 | 1.68966 | 53.0 |
| 2* | 7.30700 | 4.74500 | | |
| 3 | 14.16900 | 2.20000 | 1.92286 | 20.9 |
| 4 | 19.40600 | Variable | | |
| 5* | 10.55300 | 1.96200 | 1.80470 | 41.0 |
| 6 | −52.00000 | 0.50000 | 1.80610 | 33.3 |
| 7 | 13.37300 | Variable | | |
| 8 (Diaphragm) | ∞ | 0.30000 | | |
| 9* | 10.54100 | 2.65000 | 1.68863 | 52.8 |
| 10 | −54.85000 | 0.42300 | | |
| 11 | 12.81800 | 1.52700 | 1.83481 | 42.7 |
| 12 | −16.25000 | 0.40000 | 1.72825 | 28.3 |
| 13 | 6.37500 | Variable | | |
| 14 | 12.67300 | 2.40000 | 1.58332 | 59.1 |
| 15* | 113.04900 | Variable | | |
| 16 | ∞ | 0.90000 | 1.51680 | 64.2 |
| 17 | ∞ | (BF) | | |
| Image surface | ∞ | | | |

TABLE 17

(Aspherical data)

Surface No. 2

K = −2.40127E+00, A4 = 5.54711E−04, A6 = −4.64573E−06,
A8 = 4.83662E−08 A10 = −2.33204E−10, A12 = 0.00000E+00

Surface No. 5

K = 2.31293E+00, A4 = −2.73540E−04, A6 = −8.70990E−06,
A8 = 1.94308E−07 A10 = −1.17334E−08, A12 = 0.00000E+00

Surface No. 9

K = −8.27368E−02, A4 = −2.29106E−04, A6 = 6.74133E−06,
A8 = −6.43867E−07 A10 = 1.93663E−08, A12 = 0.00000E+00

Surface No. 15

K = 0.00000E+00, A4 = 5.37389E−05, A6 = 1.20630E−05,
A8 = −1.48221E−06 A10 = 7.59420E−08, A12 = −1.46950E−09

TABLE 18

(Various data)

Zooming ratio 2.34594

| | Wide-angle limit | Middle position | Telephoto limit |
|---|---|---|---|
| Focal length | 5.2727 | 8.0468 | 12.3694 |
| F-number | 2.07103 | 2.41838 | 2.90068 |
| View angle | 45.5554 | 31.5315 | 21.1435 |
| Image height | 4.6250 | 4.6250 | 4.6250 |
| Overall length of lens system | 54.7894 | 45.7267 | 41.5783 |
| BF | 0.88877 | 0.88303 | 0.86616 |
| d4 | 20.7225 | 9.1460 | 1.5000 |
| d7 | 4.5957 | 4.1208 | 3.0000 |
| d13 | 4.3931 | 6.0927 | 8.1267 |
| d15 | 3.9273 | 5.2222 | 7.8234 |

Zoom lens unit data

| Lens unit | Initial surface No. | Focal length |
|---|---|---|
| 1 | 1 | −15.40103 |
| 2 | 5 | 45.00567 |
| 3 | 8 | 18.06814 |
| 4 | 14 | 24.25496 |

Numerical Example 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 114.43200 | 2.30000 | 1.68966 | 53.0 |
| 2* | 7.30900 | 4.12700 | | |
| 3 | 12.66800 | 2.20000 | 1.92286 | 20.9 |
| 4 | 16.83700 | Variable | | |
| 5* | 11.36700 | 2.11900 | 1.80359 | 40.8 |
| 6 | −22.15400 | 0.00500 | 1.56732 | 42.8 |
| 7 | −22.15400 | 0.50000 | 1.80610 | 33.3 |
| 8 | 14.15800 | Variable | | |
| 9 (Diaphragm) | ∞ | 0.30000 | | |
| 10* | 9.52000 | 2.65000 | 1.68863 | 52.8 |
| 11 | −90.06800 | 0.48500 | | |
| 12 | 11.27600 | 1.49500 | 1.83481 | 42.7 |
| 13 | −21.34800 | 0.00500 | 1.56732 | 42.8 |
| 14 | −21.34800 | 0.40000 | 1.72825 | 28.3 |
| 15 | 5.84300 | Variable | | |
| 16 | 12.75900 | 2.44100 | 1.60602 | 57.4 |
| 17* | 281.13000 | Variable | | |
| 18 | ∞ | 0.90000 | 1.51680 | 64.2 |
| 19 | ∞ | (BF) | | |
| Image surface | ∞ | | | |

TABLE 20

(Aspherical data)

Surface No. 2

K = −2.26824E+00, A4 = 5.43364E−04, A6 = −3.63781E−06,
A8 = 3.76202E−08 A10 = −1.54277E−10, A12 = 0.00000E+00

TABLE 20-continued (Aspherical data)

Surface No. 5

K = 2.52789E+00, A4 = −2.27749E−04, A6 = −7.29711E−06,
A8 = 1.70633E−07 A10 = −8.51234E−09, A12 = 0.00000E+00

Surface No. 10

K = −7.98350E−02, A4 = −2.36469E−04, A6 = 8.10456E−06,
A8 = −7.93887E−07 A10 = 2.43425E−08, A12 = 0.00000E+00

Surface No. 17

K = 0.00000E+00, A4 = 1.92768E−05, A6 = 1.34964E−05,
A8 = −1.53164E−06 A10 = 7.61713E−08, A12 = −1.46950E−09

TABLE 21

(Various data)

Zooming ratio 2.34621

| | Wide-angle limit | Middle position | Telephoto limit |
|---|---|---|---|
| Focal length | 5.2717 | 8.0449 | 12.3686 |
| F-number | 2.07088 | 2.39329 | 2.84225 |
| View angle | 45.4638 | 31.6197 | 21.2139 |
| Image height | 4.6250 | 4.6250 | 4.6250 |
| Overall length of lens system | 55.1438 | 45.1651 | 40.3269 |
| BF | 0.88294 | 0.87916 | 0.87183 |
| d4 | 21.1433 | 9.0882 | 1.5000 |
| d8 | 5.1978 | 4.5253 | 3.0000 |
| d15 | 4.3071 | 5.6179 | 7.3043 |
| d17 | 3.6857 | 5.1275 | 7.7238 |

Zoom lens unit data

| Lens unit | Initial surface No. | Focal length |
|---|---|---|
| 1 | 1 | −16.01093 |
| 2 | 5 | 51.24477 |
| 3 | 9 | 17.08637 |
| 4 | 16 | 21.97927 |

Numerical Example 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ | | | |
| 1 | 85.72200 | 1.85000 | 1.74993 | 45.4 |
| 2* | 7.49400 | 3.54600 | | |
| 3 | 12.26100 | 2.10000 | 1.92286 | 20.9 |
| 4 | 17.26200 | Variable | | |
| 5* | 13.87900 | 2.20000 | 1.80359 | 40.8 |
| 6 | −25.95200 | 0.00500 | 1.56732 | 42.8 |
| 7 | −25.95200 | 0.57000 | 1.80610 | 33.3 |
| 8 | 19.00600 | Variable | | |
| 9 (Diaphragm) | ∞ | 0.30000 | | |
| 10* | 9.98500 | 2.65000 | 1.68863 | 52.8 |
| 11 | −75.40400 | 0.78400 | | |
| 12 | 10.97200 | 1.62100 | 1.83481 | 42.7 |

TABLE 22-continued (Surface data)

| Surface number | r | d | nd | vd |
|---|---|---|---|---|
| 13 | −15.55300 | 0.00500 | 1.56732 | 42.8 |
| 14 | −15.55300 | 0.40500 | 1.72825 | 28.3 |
| 15 | 5.71700 | Variable | | |
| 16 | 12.48300 | 2.02400 | 1.60602 | 57.4 |
| 17* | 178.73100 | Variable | | |
| 18 | ∞ | 0.90000 | 1.51680 | 64.2 |
| 19 | ∞ | (BF) | | |
| Image surface | ∞ | | | |

TABLE 23

(Aspherical data)

Surface No. 2

K = −2.53987E+00, A4 = 6.02864E−04, A6 = −4.74973E−06,
A8 = 5.13420E−08 A10 = −2.16011E−10, A12 = 2.55461E−29

Surface No. 5

K = 4.23399E+00, A4 = −2.05015E−04, A6 = −6.25457E−06,
A8 = 1.54072E−07 A10 = −7.27020E−09, A12 = 0.00000E+00

Surface No. 10

K = −3.88628E−02, A4 = −2.24844E−04, A6 = 7.45501E−06,
A8 = −7.33900E−07 A10 = 2.23128E−08, A12 = 0.00000E+00

Surface No. 17

K = 0.00000E+00, A4 = 2.15833E−05, A6 = 1.28143E−05,
A8 = −1.52561E−06 A10 = 7.60102E−08, A12 = −1.46950E−09

TABLE 24

(Various data)

Zooming ratio 2.34665

| | Wide angle limit | Middle position | Telephoto limit |
|---|---|---|---|
| Focal length | 5.2709 | 8.0455 | 12.3689 |
| F-number | 2.07058 | 2.37355 | 2.80491 |
| View angle | 45.5394 | 31.6562 | 21.2060 |
| Image height | 4.6250 | 4.6250 | 4.6250 |
| Overall length of lens system | 55.1442 | 44.1246 | 38.7344 |
| BF | 0.88100 | 0.87941 | 0.86838 |
| d4 | 21.4345 | 9.0602 | 1.5000 |
| d8 | 5.9883 | 4.8062 | 3.0000 |
| d15 | 4.3396 | 5.3349 | 6.7548 |
| d17 | 3.5408 | 5.0839 | 7.6512 |

Zoom lens unit data

| Lens unit | Initial surface No. | Focal length |
|---|---|---|
| 1 | 1 | −16.30844 |
| 2 | 5 | 52.14556 |
| 3 | 9 | 16.80389 |
| 4 | 16 | 22.04372 |

Numerical Example 9

The zoom lens system of Numerical Example 9 corresponds to Embodiment 9 shown in FIG. 25. Table 25 shows the surface data of the zoom lens system of Numerical Example 9. Table 26 shows the aspherical data. Table 27 shows various data.

TABLE 25

(Surface data)

| Surface number | r | d | nd | vd |
|---|---|---|---|---|
| Object surface | ∞ | | | |
| 1 | 74.15600 | 1.85000 | 1.74993 | 45.4 |
| 2* | 7.58000 | 3.85300 | | |
| 3 | 12.45500 | 2.10000 | 1.92286 | 20.9 |
| 4 | 17.84100 | Variable | | |
| 5* | 13.34800 | 2.25500 | 1.80359 | 40.8 |
| 6 | −18.64600 | 0.00500 | 1.56732 | 42.8 |
| 7 | −18.64600 | 0.50000 | 1.80610 | 33.3 |
| 8 | 16.85000 | Variable | | |
| 9 (Diaphragm) | ∞ | 0.30000 | | |
| 10* | 10.88900 | 3.00000 | 1.68863 | 52.8 |
| 11 | −48.29500 | 0.58200 | | |
| 12 | 11.19600 | 1.71300 | 1.83481 | 42.7 |
| 13 | −12.55000 | 0.00500 | 1.56732 | 42.8 |
| 14 | −12.55000 | 0.43900 | 1.71736 | 29.5 |
| 15 | 5.79600 | Variable | | |
| 16 | 15.38300 | 1.36400 | 1.60602 | 57.4 |
| 17* | −289.01800 | Variable | | |
| 18 | ∞ | 0.90000 | 1.51680 | 64.2 |
| 19 | ∞ | (BF) | | |
| Image surface | ∞ | | | |

TABLE 26

(Aspherical data)

Surface No. 2

K = −1.85142E+00, A4 = 3.96910E−04, A6 = −1.32061E−06,
A8 = 1.62746E−08 A10 = −4.52082E−11, A12 = 2.52047E−26

Surface No. 5

K = 3.92686E+00, A4 = −2.20840E−04, A6 = −6.53734E−06,
A8 = 1.49216E−07 A10 = −7.69756E−09, A12 = −7.32507E−28

Surface No. 10

K = −1.06936E−01, A4 = −2.13740E−04, A6 = 5.10378E−06,
A8 = −5.19377E−07 A10 = 1.61556E−08, A12 = 0.00000E+00

Surface No. 17

K = 0.00000E+00, A4 = 3.22743E−05, A6 = 5.56174E−06,
A8 = −9.74806E−07 A10 = 6.08346E−08, A12 = −1.46950E−09

TABLE 27

(Various data)

Zooming ratio 2.34773

| | Wide angle limit | Middle position | Telephoto limit |
|---|---|---|---|
| Focal length | 5.2691 | 8.0454 | 12.3704 |
| F-number | 2.07001 | 2.35450 | 2.77182 |
| View angle | 45.5749 | 31.4639 | 21.0274 |
| Image height | 4.6250 | 4.6250 | 4.6250 |
| Overall length of lens system | 56.5780 | 44.7974 | 38.7099 |
| BF | 0.87800 | 0.87842 | 0.87352 |
| d4 | 23.3636 | 9.7995 | 1.5000 |
| d8 | 5.0995 | 4.5171 | 3.0000 |
| d15 | 4.2965 | 5.2005 | 6.5542 |
| d17 | 4.0744 | 5.5359 | 7.9162 |

TABLE 27-continued (Various data)

Zoom lens unit data

| Lens unit | Initial surface No. | Focal length |
|---|---|---|
| 1 | 1 | −17.39958 |
| 2 | 5 | 60.06224 |
| 3 | 9 | 16.18585 |
| 4 | 16 | 24.14170 |

Numerical Example 10

The zoom lens system of Numerical Example 10 corresponds to Embodiment 10 shown in FIG. 28. Table 28 shows the surface data of the zoom lens system of Numerical Example 10. Table 29 shows the aspherical data. Table 30 shows various data.

TABLE 28

(Surface data)

| Surface number | r | d | nd | vd |
|---|---|---|---|---|
| Object surface | ∞ | | | |
| 1 | 66.27800 | 2.40000 | 1.80470 | 41.0 |
| 2* | 7.49400 | 4.52400 | | |
| 3 | 12.80900 | 2.14800 | 1.94595 | 18.0 |
| 4 | 17.57500 | Variable | | |
| 5* | 12.01700 | 1.75000 | 1.80359 | 40.8 |
| 6 | 863.36900 | 0.00500 | 1.56732 | 42.8 |
| 7 | 863.36900 | 0.50000 | 1.80610 | 33.3 |
| 8 | 14.63300 | Variable | | |
| 9 (Diaphragm) | ∞ | 0.30000 | | |
| 10* | 10.72160 | 3.00000 | 1.68863 | 52.8 |
| 11 | −29.13400 | 0.30300 | | |
| 12 | 13.13500 | 2.05700 | 1.83481 | 42.7 |
| 13 | −15.28700 | 0.00500 | 1.56732 | 42.8 |
| 14 | −15.28700 | 0.65800 | 1.75520 | 27.5 |
| 15 | 5.96600 | Variable | | |
| 16 | 16.54700 | 2.50000 | 1.60602 | 57.4 |
| 17* | −73.92700 | Variable | | |
| 18 | ∞ | 0.90000 | 1.51680 | 64.2 |
| 19 | ∞ | (BF) | | |
| Image surface | ∞ | | | |

TABLE 29

(Aspherical data)

Surface No. 2

K = −1.31819E+00, A4 = 2.40420E−04, A6 = 2.98275E−07,
A8 = 2.67594E−09 A10 = 1.34408E−11, A12 = −2.46367E−20
Surface No. 5

K = 3.19653E+00, A4 = −2.55826E−04, A6 = −7.46403E−06,
A8 = 1.55843E−07 A10 = −9.75799E−09, A12 = 7.77587E−20
Surface No. 10

K = −3.37760E−01, A4 = −1.98834E−04, A6 = 2.30150E−06,
A8 = −1.86669E−07 A10 = 4.76364E−09, A12 = 0.00000E+00
Surface No. 17

K = 0.00000E+00, A4 = 3.17013E−06, A6 = 4.73217E−06,
A8 = −8.64215E−07 A10 = 5.82238E−08, A12 = −1.46950E−09

TABLE 30

(Various data)

Zooming ratio 2.34785

| | Wide-angle limit | Middle position | Telephoto limit |
|---|---|---|---|
| Focal length | 5.2695 | 8.0435 | 12.3720 |
| F-number | 2.06994 | 2.39281 | 2.86402 |
| View angle | 45.6513 | 31.5157 | 21.1194 |
| Image height | 4.6250 | 4.6250 | 4.6250 |
| Overall length of lens system | 55.2256 | 45.7677 | 41.6223 |
| BF | 0.88296 | 0.87774 | 0.87958 |
| d4 | 20.6195 | 9.0131 | 1.5000 |
| d8 | 4.7442 | 4.1037 | 3.0000 |
| d15 | 4.2983 | 5.6196 | 7.3944 |
| d17 | 3.6306 | 5.1036 | 7.7983 |

Zoom lens unit data

| Lens unit | Initial surface No. | Focal length |
|---|---|---|
| 1 | 1 | −15.45313 |
| 2 | 5 | 61.00590 |
| 3 | 9 | 16.30083 |
| 4 | 16 | 22.54570 |

Numerical Example 11

The zoom lens system of Numerical Example 11 corresponds to Embodiment 11 shown in FIG. 31. Table 31 shows the surface data of the zoom lens system of Numerical Example 11. Table 32 shows the aspherical data. Table 33 shows various data.

TABLE 31

(Surface data)

| Surface number | r | d | nd | vd |
|---|---|---|---|---|
| Object surface | ∞ | | | |
| 1 | 120.24000 | 1.70000 | 1.80470 | 41.0 |
| 2* | 7.76000 | 4.30900 | | |
| 3 | 14.85900 | 1.80000 | 1.94595 | 18.0 |
| 4 | 23.49400 | Variable | | |
| 5* | 11.62700 | 1.52000 | 1.80359 | 40.8 |
| 6 | 142.85700 | 0.00500 | 1.56732 | 42.8 |
| 7 | 142.85700 | 0.50000 | 1.80610 | 33.3 |
| 8 | 13.32300 | Variable | | |
| 9 (Diaphragm) | ∞ | 0.30000 | | |
| 10* | 12.80100 | 3.00000 | 1.68863 | 52.8 |
| 11 | −36.79400 | 1.56900 | | |
| 12 | 10.37200 | 1.76800 | 1.83481 | 42.7 |
| 13 | −13.18500 | 0.00500 | 1.56732 | 42.8 |
| 14 | −13.18500 | 0.40000 | 1.75520 | 27.5 |
| 15 | 6.10400 | Variable | | |
| 16 | 18.91900 | 1.45800 | 1.60602 | 57.4 |
| 17* | −49.23900 | Variable | | |
| 18 | ∞ | 0.90000 | 1.51680 | 64.2 |
| 19 | ∞ | (BF) | | |
| Image surface | ∞ | | | |

TABLE 32

(Aspherical data)

Surface No. 2

K = −2.28649E+00, A4 = 4.25785E−04, A6 = −2.79189E−06,
A8 = 2.37543E−08 A10 = −9.54904E−11, A12 = −1.07445E−15

TABLE 32-continued (Aspherical data)

Surface No. 5

K = 3.61159E+00, A4 = −3.16565E−04, A6 = −9.25957E−06,
A8 = 1.86987E−07 A10 = −1.62320E−08, A12 = −4.80450E−19

Surface No. 10

K = 7.70809E−02, A4 = −1.57049E−04, A6 = 3.10975E−06,
A8 = −3.50418E−07 A10 = 1.07860E−08, A12 = 0.00000E+00

Surface No. 17

K = 0.00000E+00, A4 = 8.39459E−06, A6 = 8.89406E−06,
A8 = −1.18450E−06 A10 = 6.69475E−08, A12 = −1.46950E−09

TABLE 33

(Various data)

Zooming ratio 2.34652

|  | Wide-angle limit | Middle position | Telephoto limit |
|---|---|---|---|
| Focal length | 5.2750 | 8.0447 | 12.3780 |
| F-number | 2.07998 | 2.40399 | 2.80753 |
| View angle | 45.1600 | 31.3231 | 20.9681 |
| Image height | 4.6250 | 4.6250 | 4.6250 |
| Overall length of lens system | 56.7415 | 46.7922 | 41.1921 |
| BF | 0.89182 | 0.87805 | 0.89672 |
| d4 | 20.5042 | 8.5076 | 1.5000 |
| d8 | 7.0596 | 5.9981 | 3.0000 |
| d15 | 4.3377 | 6.1230 | 7.5808 |
| d17 | 4.7142 | 6.0515 | 8.9806 |

Zoom lens unit data

| Lens unit | Initial surface No. | Focal length |
|---|---|---|
| 1 | 1 | −15.71457 |
| 2 | 5 | 75.06879 |
| 3 | 9 | 16.54470 |
| 4 | 16 | 22.73649 |

The following Table 34 shows the corresponding values to the individual conditions in the zoom lens systems of Numerical Examples 1 to 11.

TABLE 34

(Values corresponding to conditions)

| | | Example | | | | | | | | | | |
|---|---|---|---|---|---|---|---|---|---|---|---|---|
| Condition | | 1 | 2 | 3 | 4 | 5 | 6 | 7 | 8 | 9 | 10 | 11 |
| (I-1) | $|f_{31}/f_{G3}|$ | 0.57 | 0.55 | 0.49 | 0.72 | 0.74 | 0.72 | 0.74 | 0.77 | 0.81 | 0.72 | 0.85 |
| (II-1) | $|f_{G3}/f_W|$ | 3.45 | 3.44 | 3.37 | 3.33 | 3.40 | 3.42 | 3.24 | 3.19 | 3.07 | 3.09 | 3.14 |
| (III-1) | $|\beta_{3W}|$ | 0.03 | 0.02 | 0.03 | 0.05 | 0.07 | 0.07 | 0.12 | 0.11 | 0.12 | 0.18 | 0.24 |
| (3A) | $|D_{G4}/f_{G4}|$ | 0.10 | 0.11 | 0.09 | 0.12 | 0.16 | 0.16 | 0.18 | 0.19 | 0.16 | 0.18 | 0.19 |
| (4A) | $f_{G4}/f_W$ | 5.39 | 5.27 | 4.83 | 4.39 | 4.53 | 4.60 | 4.17 | 4.18 | 4.58 | 4.28 | 4.31 |
| (5A) | $|\beta_{4W}|$ | 0.77 | 0.78 | 0.76 | 0.73 | 0.71 | 0.71 | 0.69 | 0.71 | 0.74 | 0.72 | 0.70 |
| (6A) | $f_{L1}/f_{G1}$ | 0.71 | 0.66 | 0.67 | 0.73 | 0.70 | 0.72 | 0.71 | 0.68 | 0.65 | 0.69 | 0.66 |
| (7A) | $|f_{L2}/f_{G1}|$ | 3.04 | 2.68 | 2.83 | 3.64 | 2.77 | 3.07 | 2.76 | 2.34 | 2.16 | 2.65 | 2.47 |
| (8A) | $|f_{L1}/f_{L2}|$ | 0.23 | 0.25 | 0.24 | 0.20 | 0.25 | 0.23 | 0.26 | 0.29 | 0.30 | 0.26 | 0.27 |

Numerical Example 13

The zoom lens system of Numerical Example 13 corresponds to Embodiment 13 shown in FIG. 35. Table 35 shows the surface data of the zoom lens system of Numerical Example 13. Table 36 shows the aspherical data. Table 37 shows various data.

TABLE 35

(Surface data)

| Surface number | r | d | nd | vd |
|---|---|---|---|---|
| Object surface | ∞ | | | |
| 1 | 250.00000 | 2.01800 | 1.68966 | 53.0 |
| 2* | 6.73400 | 5.75000 | | |
| 3* | 13.79500 | 1.59400 | 1.99537 | 20.7 |
| 4 | 19.27700 | Variable | | |
| 5* | 7.86600 | 1.57300 | 1.80470 | 41.0 |
| 6 | −45.60600 | 0.70400 | | |
| 7 | −268.86000 | 0.82900 | 1.83500 | 43.0 |
| 8 | 382.84900 | 0.44100 | 1.80518 | 25.5 |
| 9 | 6.88800 | Variable | | |
| 10 (Diaphragm) | ∞ | 0.30000 | | |
| 11* | 8.04900 | 2.65000 | 1.68863 | 52.8 |
| 12 | −12.76600 | 0.30000 | | |
| 13 | 36.01500 | 0.70000 | 1.72825 | 28.3 |
| 14 | 6.55200 | Variable | | |
| 15 | 12.08800 | 2.30000 | 1.51443 | 63.3 |
| 16* | −244.81300 | Variable | | |
| 17 | ∞ | 0.90000 | 1.51680 | 64.2 |
| 18 | ∞ | (BF) | | |
| Image surface | ∞ | | | |

TABLE 36

(Aspherical data)

Surface No. 2

K = −1.22698E+00, A4 = 1.07714E−04, A6 = 8.55227E−07,
A8 = −5.06893E−09 A10 = 5.51366E−11, A12 = 0.00000E+00

Surface No. 3

K = 0.00000E+00, A4 = −3.13513E−05, A6 = 1.08070E−07,
A8 = 0.00000E+00 A10 = 0.00000E+00, A12 = 0.00000E+00

Surface No. 5

K = −6.38079E−01, A4 = −3.99372E−06, A6 = −5.89749E−06,
A8 = 4.15242E−07 A10 = −1.77890E−08, A12 = 0.00000E+00

Surface No. 11

K = 0.00000E+00, A4 = −5.90024E−04, A6 = 1.07020E−05,
A8 = −1.90848E−06 A10 = 1.19941E−07, A12 = 0.00000E+00

TABLE 36-continued (Aspherical data)

Surface No. 16

K = 0.00000E+00, A4 = 6.48889E−05, A6 = 2.05259E−05,
A8 = −2.23740E−06 A10 = 9.49245E−08, A12 = −1.48319E−09

TABLE 37

(Various data)

Zooming ratio 2.21969

|  | Wide-angle limit | Middle position | Telephoto limit |
|---|---|---|---|
| Focal length | 4.6502 | 6.9287 | 10.3220 |
| F-number | 2.48000 | 2.87000 | 3.50000 |
| View angle | 49.1915 | 34.9745 | 24.4421 |
| Image height | 4.6250 | 4.6250 | 4.6250 |
| Overall length of lens system | 54.0153 | 43.8953 | 39.8118 |
| BF | 0.87840 | 0.88341 | 0.85876 |
| d4 | 23.3667 | 10.9098 | 3.9002 |
| d9 | 2.9646 | 2.9961 | 1.9334 |
| d14 | 4.1966 | 5.3215 | 8.5860 |
| d16 | 2.5500 | 3.7255 | 4.4744 |

Zoom lens unit data

| Lens unit | Initial surface No. | Focal length |
|---|---|---|
| 1 | 1 | −15.01969 |
| 2 | 5 | 35.17245 |
| 3 | 10 | 15.66219 |
| 4 | 15 | 22.46051 |

Numerical Example 14

The zoom lens system of Numerical Example 14 corresponds to Embodiment 14 shown in FIG. 38. Table 38 shows the surface data of the zoom lens system of Numerical Example 14. Table 39 shows the aspherical data. Table 40 shows various data.

TABLE 38

(Surface data)

| Surface number | r | d | nd | vd |
|---|---|---|---|---|
| Object surface | ∞ | | | |
| 1 | 180.00000 | 1.85000 | 1.68966 | 53.0 |
| 2* | 7.08400 | 4.51300 | | |
| 3 | 13.82400 | 2.20000 | 1.92286 | 20.9 |
| 4 | 19.67200 | Variable | | |
| 5* | 10.57800 | 1.97800 | 1.80470 | 41.0 |
| 6 | 100.00000 | 0.50000 | 1.75520 | 27.5 |
| 7 | 12.65900 | Variable | | |
| 8 (Diaphragm) | ∞ | 0.30000 | | |
| 9* | 10.49500 | 2.48400 | 1.68863 | 52.8 |
| 10 | −61.25500 | 0.65400 | | |
| 11 | 11.53900 | 1.46100 | 1.83500 | 43.0 |
| 12 | −24.34800 | 0.40000 | 1.72825 | 28.3 |
| 13 | 6.09300 | Variable | | |
| 14 | 13.01800 | 2.25000 | 1.60602 | 57.4 |
| 15* | 120.99600 | Variable | | |
| 16 | ∞ | 0.90000 | 1.51680 | 64.2 |
| 17 | ∞ | (BF) | | |
| Image surface | ∞ | | | |

TABLE 39

(Aspherical data)

Surface No. 2

K = −1.81575E+00, A4 = 4.07000E−04, A6 = −1.69323E−06,
A8 = 1.55354E−08 A10 = −6.73938E−11, A12 = 0.00000E+00

Surface No. 5

K = 2.34407E+00, A4 = −2.77129E−04, A6 = −8.78661E−06,
A8 = 1.99478E−07 A10 = −1.20026E−08, A12 = 0.00000E+00

Surface No. 9

K = 5.52606E−02, A4 = −2.18084E−04, A6 = 5.79842E−06,
A8 = −5.60474E−07 A10 = 1.65403E−08, A12 = 0.00000E+00

Surface No. 15

K = 0.00000E+00, A4 = 5.15970E−05, A6 = 9.83168E−06,
A8 = −1.34794E−06 A10 = 7.28423E−08, A12 = −1.46950E−09

TABLE 40

(Various data)

Zooming ratio 2.34657

|  | Wide-angle limit | Middle position | Telephoto limit |
|---|---|---|---|
| Focal length | 5.2710 | 8.0458 | 12.3688 |
| F-number | 2.07093 | 2.41762 | 2.90325 |
| View angle | 41.6744 | 30.6121 | 21.1415 |
| Image height | 4.1630 | 4.4870 | 4.6250 |
| Overall length of lens system | 53.8341 | 44.7346 | 40.6770 |
| BF | 0.88586 | 0.88254 | 0.87072 |
| d4 | 20.6756 | 9.1296 | 1.5000 |
| d7 | 4.5413 | 4.0383 | 3.0000 |
| d13 | 4.3151 | 5.9535 | 7.9915 |
| d15 | 3.9262 | 5.2407 | 7.8248 |

Zoom lens unit data

| Lens unit | Initial surface No. | Focal length |
|---|---|---|
| 1 | 1 | −15.39956 |
| 2 | 5 | 45.00188 |
| 3 | 8 | 17.93655 |
| 4 | 14 | 23.88315 |

Numerical Example 15

The zoom lens system of Numerical Example 15 corresponds to Embodiment 15 shown in FIG. 41. Table 41 shows the surface data of the zoom lens system of Numerical Example 15. Table 42 shows the aspherical data. Table 43 shows various data.

TABLE 41

(Surface data)

| Surface number | r | d | nd | vd |
|---|---|---|---|---|
| Object surface | ∞ | | | |
| 1 | 50.88200 | 1.85000 | 1.80470 | 41.0 |
| 2* | 7.91600 | 4.84100 | | |
| 3 | 12.74900 | 2.00000 | 1.94595 | 18.0 |
| 4 | 16.63500 | Variable | | |
| 5* | 11.92600 | 1.63200 | 1.80359 | 40.8 |
| 6 | 81.44300 | 0.00500 | 1.56732 | 42.8 |
| 7 | 81.44300 | 0.50000 | 1.80610 | 33.3 |

TABLE 41-continued (Surface data)

| Surface number | r | d | nd | vd |
|---|---|---|---|---|
| 8 | 14.07200 | Variable | | |
| 9 | ∞ | 0.30000 | | |
| (Diaphragm) | | | | |
| 10* | 10.57400 | 3.00000 | 1.68863 | 52.8 |
| 11 | −38.11600 | 0.30000 | | |
| 12 | 11.72700 | 1.62500 | 1.83481 | 42.7 |
| 13 | −17.69200 | 0.00500 | 1.56732 | 42.8 |
| 14 | −17.69200 | 0.89400 | 1.75520 | 27.5 |
| 15 | 5.84700 | Variable | | |
| 16 | 20.08500 | 1.28700 | 1.60602 | 57.4 |
| 17* | −46.85500 | Variable | | |
| 18 | ∞ | 0.90000 | 1.51680 | 64.2 |
| 19 | ∞ | (BF) | | |
| Image surface | ∞ | | | |

TABLE 42

(Aspherical data)

Surface No. 2

K = −1.96432E+00, A4 = 3.86726E−04, A6 = −1.20023E−06,
A8 = 1.44052E−08 A10 = −2.31846E−11, A12 = 2.49554E−19

Surface No. 5

K = 3.27670E+00, A4 = −2.62488E−04, A6 = −8.11789E−06,
A8 = 1.84716E−07 A10 = −1.14850E−08, A12 = −7.28049E−20

Surface No. 10

K = −1.52083E−01, A4 = −1.97624E−04, A6 = 3.78296E−06,
A8 = −3.31425E−07 A10 = 9.40208E−09, A12 = 0.00000E+00

Surface No. 17

K = 0.00000E+00, A4 = 3.29937E−05, A6 = 2.46700E−06,
A8 = −7.44412E−07 A10 = 5.43571E−08, A12 = −1.46950E−09

TABLE 43

(Various data)

Zooming ratio 2.34927

| | Wide-angle limit | Middle position | Telephoto limit |
|---|---|---|---|
| Focal length | 5.2640 | 8.0389 | 12.3667 |
| F-number | 2.07513 | 2.35485 | 2.77604 |
| View angle | 45.6219 | 31.3656 | 20.9437 |
| Image height | 4.6250 | 4.6250 | 4.6250 |
| Overall length of lens system | 56.7299 | 45.2183 | 39.4747 |
| BF | 0.88065 | 0.88038 | 0.87429 |
| d4 | 23.4665 | 9.9195 | 1.5000 |
| d8 | 4.4715 | 4.1353 | 3.0000 |
| d15 | 4.2446 | 4.9320 | 6.0621 |
| d17 | 4.5276 | 6.2121 | 8.8993 |

Zoom lens unit data

| Lens unit | Initial surface No. | Focal length |
|---|---|---|
| 1 | 1 | −16.95991 |
| 2 | 5 | 68.03082 |
| 3 | 9 | 16.53511 |
| 4 | 16 | 23.36777 |

Numerical Example 16

The zoom lens system of Numerical Example 16 corresponds to Embodiment 16 shown in FIG. 44. Table 44 shows the surface data of the zoom lens system of Numerical Example 16. Table 45 shows the aspherical data. Table 46 shows various data.

TABLE 44

(Surface data)

| Surface number | r | d | nd | vd |
|---|---|---|---|---|
| Object surface | ∞ | | | |
| 1 | 66.27800 | 2.40000 | 1.80470 | 41.0 |
| 2* | 7.49400 | 4.52400 | | |
| 3 | 12.80900 | 2.14800 | 1.94595 | 18.0 |
| 4 | 17.57500 | Variable | | |
| 5* | 12.01700 | 1.75000 | 1.80359 | 40.8 |
| 6 | 863.36900 | 0.00500 | 1.56732 | 42.8 |
| 7 | 863.36900 | 0.50000 | 1.80610 | 33.3 |
| 8 | 14.63300 | Variable | | |
| 9 | ∞ | 0.30000 | | |
| (Diaphragm) | | | | |
| 10* | 10.72100 | 3.00000 | 1.68863 | 52.8 |
| 11 | −29.13400 | 0.30300 | | |
| 12 | 13.13500 | 2.05700 | 1.83481 | 42.7 |
| 13 | −15.28700 | 0.00500 | 1.56732 | 42.8 |
| 14 | −15.28700 | 0.65800 | 1.75520 | 27.5 |
| 15 | 5.96600 | Variable | | |
| 16 | 16.54700 | 2.50000 | 1.60602 | 57.4 |
| 17* | −73.92700 | Variable | | |
| 18 | ∞ | 0.90000 | 1.51680 | 64.2 |
| 19 | ∞ | (BF) | | |
| Image surface | ∞ | | | |

TABLE 45

(Aspherical data)

Surface No. 2

K = −1.31819E+00, A4 = 2.40420E−04, A6 = 2.98275E−07,
A8 = 2.67594E−09 A10 = 1.34408E−11, A12 = −2.46367E−20

Surface No. 5

K = 3.19653E+00, A4 = −2.55826E−04, A6 = −7.46403E−06,
A8 = 1.55843E−07 A10 = −9.75799E−09, A12 = 7.77587E−20

Surface No. 10

K = −3.37760E−01, A4 = −1.98834E−04, A6 = 2.30150E−06,
A8 = −1.86669E−07 A10 = 4.76364E−09, A12 = 0.00000E+00

Surface No. 17

K = 0.00000E+00, A4 = 3.17013E−06, A6 = 4.73217E−06,
A8 = −8.64215E−07 A10 = 5.82238E−08, A12 = −1.46950E−09

TABLE 46

(Various data)

Zooming ratio 2.34785

| | Wide-angle limit | Middle position | Telephoto limit |
|---|---|---|---|
| Focal length | 5.2695 | 8.0435 | 12.3720 |
| F-number | 2.06994 | 2.39281 | 2.86402 |
| View angle | 45.6513 | 31.5157 | 21.1194 |
| Image height | 4.6250 | 4.6250 | 4.6250 |
| Overall length of lens system | 55.2256 | 45.7677 | 41.6223 |
| BF | 0.88296 | 0.87774 | 0.87958 |
| d4 | 20.6195 | 9.0131 | 1.5000 |

TABLE 46-continued (Various data)

| d8 | 4.7442 | 4.1037 | 3.0000 |
|---|---|---|---|
| d15 | 4.2983 | 5.6196 | 7.3944 |
| d17 | 3.6306 | 5.1036 | 7.7983 |

Zoom lens unit data

| Lens unit | Initial surface No. | Focal length |
|---|---|---|
| 1 | 1 | −15.45313 |
| 2 | 5 | 61.00590 |
| 3 | 9 | 16.30083 |
| 4 | 16 | 22.54570 |

Numerical Example 17

The zoom lens system of Numerical Example 17 corresponds to Embodiment 17 shown in FIG. 47. Table 47 shows the surface data of the zoom lens system of Numerical Example 17. Table 48 shows the aspherical data. Table 49 shows various data.

TABLE 47

(Surface data)

| Surface number | r | d | nd | vd |
|---|---|---|---|---|
| Object surface | ∞ | | | |
| 1 | 56.59000 | 2.30000 | 1.80470 | 41.0 |
| 2* | 7.75900 | 4.68000 | | |
| 3 | 12.81500 | 2.00000 | 1.94595 | 18.0 |
| 4 | 17.02600 | Variable | | |
| 5* | 11.64800 | 1.63300 | 1.80359 | 40.8 |
| 6 | 73.63000 | 0.00500 | 1.56732 | 42.8 |
| 7 | 73.63000 | 0.50000 | 1.80610 | 33.3 |
| 8 | 13.64600 | Variable | | |
| 9 (Diaphragm) | ∞ | 0.30000 | | |
| 10* | 10.83100 | 3.00000 | 1.68863 | 52.8 |
| 11 | −35.95700 | 0.54200 | | |
| 12 | 11.80300 | 1.64700 | 1.83481 | 42.7 |
| 13 | −16.16800 | 0.00500 | 1.56732 | 42.8 |
| 14 | −16.16800 | 0.74800 | 1.75520 | 27.5 |
| 15 | 5.96300 | Variable | | |
| 16 | 16.81400 | 1.33300 | 1.60602 | 57.4 |
| 17* | −72.79400 | Variable | | |
| 18 | ∞ | 0.90000 | 1.51680 | 64.2 |
| 19 | ∞ | (BF) | | |
| Image surface | ∞ | | | |

TABLE 48

(Aspherical data)

Surface No. 2

K = −1.78338E+00, A4 = 3.52348E−04, A6 = −7.13864E−07,
A8 = 9.88809E−09 A10 = −1.11865E−11, A12 = 2.49552E−19
Surface No. 5

K = 3.14316E+00, A4 = −2.72012E−04, A6 = −8.68100E−06,
A8 = 2.11725E−07 A10 = −1.27938E−08, A12 = −7.28067E−20
Surface No. 10

K = −1.83073E−01, A4 = −1.93865E−04, A6 = 3.83726E−06,
A8 = −3.04057E−07 A10 = 7.83423E−09, A12 = 0.00000E+00

TABLE 48-continued (Aspherical data)

Surface No. 17

K = 0.00000E+00, A4 = 2.42821E−05, A6 = 4.32043E−06,
A8 = −8.91145E−07 A10 = 5.93876E−08, A12 = −1.46950E−09

TABLE 49

(Various data)

Zooming ratio 2.34761

| | Wide-angle limit | Middle position | Telephoto limit |
|---|---|---|---|
| Focal length | 5.2702 | 8.0448 | 12.3723 |
| F-number | 2.07005 | 2.36326 | 2.79780 |
| View angle | 45.6031 | 31.4690 | 21.0569 |
| Image height | 4.6250 | 4.6250 | 4.6250 |
| Overall length of lens system | 55.9820 | 45.4446 | 40.5385 |
| BF | 0.88223 | 0.87839 | 0.86863 |
| d4 | 22.2482 | 9.5060 | 1.5000 |
| d8 | 4.4534 | 4.0835 | 3.0000 |
| d15 | 4.2945 | 5.2505 | 6.7554 |
| d17 | 4.5107 | 6.1332 | 8.8215 |

Zoom lens unit data

| Lens unit | Initial surface No. | Focal length |
|---|---|---|
| 1 | 1 | −16.30337 |
| 2 | 5 | 67.66064 |
| 3 | 9 | 16.47269 |
| 4 | 16 | 22.66614 |

Numerical Example 18

The zoom lens system of Numerical Example 18 corresponds to Embodiment 18 shown in FIG. 50. Table 50 shows the surface data of the zoom lens system of Numerical Example 18. Table 51 shows the aspherical data. Table 52 shows various data.

TABLE 50

(Surface data)

| Surface number | r | d | nd | vd |
|---|---|---|---|---|
| Object surface | ∞ | | | |
| 1 | 120.24000 | 1.70000 | 1.80470 | 41.0 |
| 2* | 7.76000 | 4.30900 | | |
| 3 | 14.85900 | 1.80000 | 1.94595 | 18.0 |
| 4 | 23.49400 | Variable | | |
| 5* | 11.62700 | 1.52000 | 1.80359 | 40.8 |
| 6 | 142.85700 | 0.00500 | 1.56732 | 42.8 |
| 7 | 142.85700 | 0.50000 | 1.80610 | 33.3 |
| 8 | 13.32300 | Variable | | |
| 9 (Diaphragm) | ∞ | 0.30000 | | |
| 10* | 12.80100 | 3.00000 | 1.68863 | 52.8 |
| 11 | −36.79400 | 1.56900 | | |
| 12 | 10.37200 | 1.76800 | 1.83481 | 42.7 |
| 13 | −13.18500 | 0.00500 | 1.56732 | 42.8 |
| 14 | −13.18500 | 0.40000 | 1.75520 | 27.5 |
| 15 | 6.10400 | Variable | | |
| 16 | 18.91900 | 1.45800 | 1.60602 | 57.4 |
| 17* | −49.23900 | Variable | | |
| 18 | ∞ | 0.90000 | 1.51680 | 64.2 |
| 19 | ∞ | (BF) | | |
| Image surface | ∞ | | | |

TABLE 51

(Aspherical data)

Surface No. 2

K = −2.28649E+00, A4 = 4.25785E−04, A6 = −2.79189E−06,
A8 = 2.37543E−08 A10 = −9.54904E−11, A12 = −1.07445E−15
Surface No. 5

K = 3.61159E+00, A4 = −3.16565E−04, A6 = −9.25957E−06,
A8 = 1.86987E−07 A10 = −1.62320E−08, A12 = −4.80450E−19
Surface No. 10

K = 7.70809E−02, A4 = −1.57049E−04, A6 = 3.10975E−06,
A8 = −3.50418E−07 A10 = 1.07860E−08, A12 = 0.00000E+00
Surface No. 17

K = 0.00000E+00, A4 = 8.39459E−06, A6 = 8.89406E−06,
A8 = −1.18450E−06 A10 = 6.69475E−08, A12 = −1.46950E−09

TABLE 52

(Various data)

Zooming ratio 2.34652

|  | Wide-angle limit | Middle position | Telephoto limit |
|---|---|---|---|
| Focal length | 5.2750 | 8.0447 | 12.3780 |
| F-number | 2.07998 | 2.40399 | 2.80753 |
| View angle | 45.1600 | 31.3231 | 20.9681 |
| Image height | 4.6250 | 4.6250 | 4.6250 |
| Overall length of lens system | 56.7415 | 46.7922 | 41.1921 |
| BF | 0.89182 | 0.87805 | 0.89672 |
| d4 | 20.5042 | 8.5076 | 1.5000 |
| d8 | 7.0596 | 5.9981 | 3.0000 |
| d15 | 4.3377 | 6.1230 | 7.5808 |
| d17 | 4.7142 | 6.0515 | 8.9806 |

Zoom lens unit data

| Lens unit | Initial surface No. | Focal length |
|---|---|---|
| 1 | 1 | −15.71457 |
| 2 | 5 | 75.06879 |
| 3 | 9 | 16.54470 |
| 4 | 16 | 22.73649 |

The following Table 53 shows the corresponding values to the individual conditions in the zoom lens systems of Numerical Examples 13 to 18.

TABLE 53

(Values corresponding to conditions)

| Condition | | Example | | | | | |
|---|---|---|---|---|---|---|---|
| | | 13 | 14 | 15 | 16 | 17 | 18 |
| (VII-1) | $(1-\beta_{2W})\beta_{3w}$ | 0.44 | 0.42 | 0.27 | 0.30 | 0.30 | 0.24 |
| (VIII-1) | $(1-\beta_{2T})\beta_{3T}$ | 0.54 | 0.64 | 0.41 | 0.47 | 0.47 | 0.38 |
| (3B) | $|D_{G4}/f_{G4}|$ | 0.09 | 0.16 | 0.19 | 0.18 | 0.18 | 0.19 |
| (4B) | $f_{G4}/f_w$ | 4.83 | 4.53 | 4.44 | 4.28 | 4.28 | 4.31 |
| (5B) | $|\beta_{4W}|$ | 0.76 | 0.71 | 0.72 | 0.72 | 0.72 | 0.70 |
| (6B) | $f_{L1}/f_{G1}$ | 0.67 | 0.70 | 0.70 | 0.69 | 0.74 | 0.66 |
| (7B) | $|f_{L2}/f_{G1}|$ | 2.83 | 2.77 | 2.72 | 2.65 | 2.88 | 2.47 |
| (8B) | $|f_{L1}/f_{L2}|$ | 0.24 | 0.25 | 0.26 | 0.26 | 0.26 | 0.27 |

INDUSTRIAL APPLICABILITY

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

DESCRIPTION OF THE REFERENCE CHARACTERS

| G1 | first lens unit |
|---|---|
| G2 | second lens unit |
| G3 | third lens unit |
| G4 | fourth lens unit |
| L1 | first lens element |
| L2 | second lens element |
| L3 | third lens element |
| L4 | fourth lens element |
| L5 | fifth lens element |
| L6 | sixth lens element |
| L7 | seventh lens element |
| L8 | eighth lens element |
| A | aperture diaphragm |
| P | plane parallel plate |
| S | image surface |
| 1 | zoom lens system |
| 2 | image sensor |
| 3 | liquid crystal display monitor |
| 4 | body |
| 5 | main barrel |
| 6 | moving barrel |
| 7 | cylindrical cam |

The invention claimed is:

1. A zoom lens system, in order from an object side to an image side, comprising a first lens unit having negative optical power, a second lens unit having positive optical power, a third lens unit having positive optical power, and a fourth lens unit having positive optical power, wherein
in zooming, the intervals between the respective lens units vary, wherein
the third lens unit comprises a plurality of lens elements, and wherein
the following condition (I-1) is satisfied:

$$0.47 < |f_{31}/f_{G3}| < 1.00 \tag{I-1}$$

(here, $f_T/f_W > 2.0$)
where,
$f_{31}$ is a focal length of a most object side lens element in the third lens unit,
$f_{G3}$ is a focal length of the third lens unit,
$f_T$ is a focal length of the entire system at a telephoto limit, and
$f_W$ is a focal length of the entire system at a wide-angle limit.

2. The zoom lens system as claimed in claim 1, wherein, in zooming, all the first lens unit, the second lens unit, the third lens unit, and the fourth lens unit move in a direction along an optical axis such that the intervals between the respective lens units vary.

3. The zoom lens system as claimed in claim 1, wherein the first lens unit comprises two lens elements including, in order from the object side to the image side, a first lens element having negative optical power and a second lens element having positive optical power.

4. An imaging device capable of outputting an optical image of an object as an electric image signal, comprising:
a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, wherein the third lens unit comprises a plurality of lens elements, and wherein the following condition (I-1) is satisfied:

$$0.47<|f_{31}/f_{G3}|<1.00 \qquad (I\text{-}1)$$

(here, $f_T/f_W>2.0$)
where,
$f_{31}$ is a focal length of a most object side lens element in the third lens unit,
$f_{G3}$ is a focal length of the third lens unit,
$f_T$ is a focal length of the entire system at a telephoto limit, and
$f_W$ is a focal length of the entire system at a wide-angle limit.

5. A camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, the intervals between the respective lens units vary, wherein the third lens unit comprises a plurality of lens elements, and wherein the following condition (I-1) is satisfied:

$$0.47<|f_{31}/f_{G3}|<1.00 \qquad (I\text{-}1)$$

(here, $f_T/f_W>2.0$)
where,
$f_{31}$ is a focal length of a most object side lens element in the third lens unit,
$f_{G3}$ is a focal length of the third lens unit,
$f_T$ is a focal length of the entire system at a telephoto limit, and
$f_W$ is a focal length of the entire system at a wide-angle limit.

6. A zoom lens system, in order from an object side to an image side, comprising a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (II-1) is satisfied:

$$2.0<|f_{G3}/f_W|<5.0 \qquad (II\text{-}1)$$

(here, $f_T/f_W>2.0$)
where,
$f_{G3}$ is a focal length of the third lens unit,
$f_T$ is a focal length of the entire system at a telephoto limit, and
$f_W$ is a focal length of the entire system at a wide-angle limit.

7. The zoom lens system as claimed in claim 6, wherein, in zooming, all the first lens unit, the second lens unit, the third lens unit, and the fourth lens unit move in a direction along an optical axis such that the intervals between the respective lens units vary.

8. The zoom lens system as claimed in claim 6, wherein the first lens unit comprises two lens elements including, in order from the object side to the image side, a first lens element having negative optical power and a second lens element having positive optical power.

9. An imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (II-1) is satisfied:

$$2.0<|f_{G3}/f_W|<5.0 \qquad (II\text{-}1)$$

(here, $f_T/f_W>2.0$)
where,
$f_{G3}$ is a focal length of the third lens unit,
$f_T$ is a focal length of the entire system at a telephoto limit, and
$f_W$ is a focal length of the entire system at a wide-angle limit.

10. A camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having negative optical power, a second lens unit having positive optical power, a third lens unit having positive optical power, and a fourth lens unit having positive optical power, wherein in zooming, at least the fourth lens unit moves in a direction along an optical axis such that the intervals between the respective lens units vary, wherein the third lens unit comprises a plurality of lens elements, and wherein the following condition (II-1) is satisfied:

$$2.0 < |f_{G3}/f_W| < 5.0 \quad (II\text{-}1)$$

(here, $f_T/f_W > 2.0$)
where,
$f_{G3}$ is a focal length of the third lens unit,
$f_T$ is a focal length of the entire system at a telephoto limit, and
$f_W$ is a focal length of the entire system at a wide-angle limit.

11. A zoom lens system, in order from an object side to an image side, comprising a first lens unit having negative optical power, a second lens unit having positive optical power, a third lens unit having positive optical power, and a fourth lens unit having positive optical power, wherein
in zooming, at least the fourth lens unit moves in a direction along an optical axis such that the intervals between the respective lens units vary, wherein
the third lens unit comprises a plurality of lens elements, and wherein
the following condition (III-1) is satisfied:

$$|\beta_{GW}| < 1.0 \quad (III\text{-}1)$$

(here, $f_T/f_W > 2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

12. The zoom lens system as claimed in claim 11, wherein, in zooming, all the first lens unit, the second lens unit, the third lens unit, and the fourth lens unit move in a direction along an optical axis such that the intervals between the respective lens units vary.

13. The zoom lens system as claimed in claim 11, wherein the first lens unit comprises two lens elements including, in order from the object side to the image side, a first lens element having negative optical power and a second lens element having positive optical power.

14. An imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system, in order from an object side to an image side, comprises a first lens unit having negative optical power, a second lens unit having positive optical power, a third lens unit having positive optical power, and a fourth lens unit having positive optical power, wherein
in zooming, at least the fourth lens unit moves in a direction along an optical axis such that the intervals between the respective lens units vary, wherein
the third lens unit comprises a plurality of lens elements, and wherein
the following condition (III-1) is satisfied:

$$|\beta_{GW}| < 1.0 \quad (III\text{-}1)$$

(here, $f_T/f_W > 2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

15. A camera for converting an optical image of an object into an electric image signal and then performing at least one of displaying and storing of the converted image signal, comprising:
an imaging device including a zoom lens system that forms the optical image of the object and an image sensor that converts the optical image formed by the zoom lens system into the electric image signal, wherein
the zoom lens system, in order from an object side to an image side, comprises a first lens unit having negative optical power, a second lens unit having positive optical power, a third lens unit having positive optical power, and a fourth lens unit having positive optical power, wherein
in zooming, at least the fourth lens unit moves in a direction along an optical axis such that the intervals between the respective lens units vary, wherein
the third lens unit comprises a plurality of lens elements, and wherein
the following condition (III-1) is satisfied:

$$|\beta_{GW}| < 1.0 \quad (III\text{-}1)$$

(here, $f_T/f_W > 2.0$)
where,
$\beta_{3W}$ is a lateral magnification of the third lens unit at a wide-angle limit,
$f_T$ is a focal length of the entire system at a telephoto limit, and
$f_W$ is a focal length of the entire system at a wide-angle limit.

16. A zoom lens system, in order from an object side to an image side, comprising a first lens unit having negative optical power, a second lens unit having positive optical power, a third lens unit having positive optical power, and a fourth lens unit having positive optical power, wherein
in zooming, all the first lens unit, the second lens unit, the third lens unit, and the fourth lens unit move in a direction along an optical axis such that the intervals between the respective lens units vary, and wherein
an aperture diaphragm is provided between the second lens unit and the third lens unit.

17. An imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system, in order from an object side to an image side, comprises a first lens unit having negative optical power, a second lens unit having positive optical power, a third lens unit having positive optical power, and a fourth lens unit having positive optical power, wherein
in zooming, all the first lens unit, the second lens unit, the third lens unit, and the fourth lens unit move in a direction along an optical axis such that the intervals between the respective lens units vary, and wherein
an aperture diaphragm is provided between the second lens unit and the third lens unit.

18. A camera for converting an optical image of an object into an electric image signal and then performing at least one of displaying and storing of the converted image signal, comprising:
- an imaging device including a zoom lens system that forms the optical image of the object and an image sensor that converts the optical image formed by the zoom lens system into the electric image signal, wherein
- the zoom lens system, in order from an object side to an image side, comprises a first lens unit having negative optical power, a second lens unit having positive optical power, a third lens unit having positive optical power, and a fourth lens unit having positive optical power, wherein
- in zooming, all the first lens unit, the second lens unit, the third lens unit, and the fourth lens unit move in a direction along an optical axis such that the intervals between the respective lens units vary, and wherein
- an aperture diaphragm is provided between the second lens unit and the third lens unit.

* * * * *